(12) United States Patent
Jones et al.

(10) Patent No.: US 9,388,325 B2
(45) Date of Patent: Jul. 12, 2016

(54) ELASTOMERIC COATINGS HAVING HYDROPHOBIC AND/OR OLEOPHOBIC PROPERTIES

(71) Applicant: Ross Technology Corporation, Leola, PA (US)

(72) Inventors: Andrew K. Jones, Lancaster, PA (US); Zenas W. Lim, Lancaster, PA (US); Andrew McLean, Coatesville, PA (US); Vinod K. Sikka, Oak Ridge, TN (US); Michael Hurley, Lancaster, PA (US)

(73) Assignee: Ross Technology Corporation, Leola, PA (US)

( * ) Notice: Subject to any disclaimer, the term of this patent is extended or adjusted under 35 U.S.C. 154(b) by 0 days.

(21) Appl. No.: 14/229,047

(22) Filed: Mar. 28, 2014

(65) Prior Publication Data

US 2014/0205804 A1 Jul. 24, 2014

Related U.S. Application Data

(63) Continuation of application No. PCT/US2013/031751, filed on Mar. 14, 2013.

(60) Provisional application No. 61/663,985, filed on Jun. 25, 2012, provisional application No. 61/708,760, filed on Oct. 2, 2012, provisional application No. 61/768,290, filed on Feb. 22, 2013.

(51) Int. Cl.
*C09D 153/00* (2006.01)
*B65D 83/14* (2006.01)
*C09D 153/02* (2006.01)
(Continued)

(52) U.S. Cl.
CPC .............. *C09D 153/00* (2013.01); *B65D 83/752* (2013.01); *C09D 153/02* (2013.01); *C08K 5/5406* (2013.01); *C09D 183/04* (2013.01);
(Continued)

(58) Field of Classification Search
CPC .. B65D 83/752; C08K 5/5406; C09D 153/00; C09D 153/02; C09D 183/04; C09D 183/16; Y10T 428/24355
USPC ........... 428/323, 141; 239/337; 523/218, 220; 524/263; 427/407.1, 141, 202
See application file for complete search history.

(56) References Cited

U.S. PATENT DOCUMENTS

| 870,439 A | 11/1907 | Kade |
| 2,191,701 A | 2/1940 | Wood |

(Continued)

FOREIGN PATENT DOCUMENTS

| CA | 1002256 | 12/1976 |
| CA | 2175848 A1 | 12/1996 |

(Continued)

OTHER PUBLICATIONS

EXPANCEL DE product list, Oct. 2010.*

(Continued)

*Primary Examiner* — Callie Shosho
*Assistant Examiner* — Michael B Nelson
(74) *Attorney, Agent, or Firm* — Perkins Coie LLP

(57) ABSTRACT

This disclosure deals with novel formulations to create highly durable hydrophobic, superhydrophobic, oleophobic and/or superoleophobic surfaces that can be nearly transparent. The formulations of this invention can be applied by -dip, spray and painting processes.

29 Claims, 8 Drawing Sheets

(51) Int. Cl.
  *C09D 183/04* (2006.01)
  *C09D 183/16* (2006.01)
  *C08K 5/54* (2006.01)

(52) U.S. Cl.
  CPC ....... *C09D 183/16* (2013.01); *Y10T 428/24355* (2015.01)

(56) References Cited

U.S. PATENT DOCUMENTS

| | | | |
|---|---|---|---|
| 2,976,386 A | 3/1961 | Salton Lewis | |
| 3,185,426 A | 5/1965 | Bjerke | |
| 3,212,106 A | 10/1965 | Noel | |
| 3,244,541 A | 4/1966 | Fain et al. | |
| 3,354,022 A | 11/1967 | Dettre et al. | |
| 3,579,540 A | 5/1971 | Ohlhausen | |
| 3,716,502 A | 2/1973 | Loew | |
| 3,931,428 A | 1/1976 | Reick | |
| 3,950,588 A | 4/1976 | McDougal | |
| 3,963,349 A | 6/1976 | Albright et al. | |
| 3,967,030 A | 6/1976 | Johnson et al. | |
| 3,975,197 A | 8/1976 | Mikelsons | |
| 3,976,572 A | 8/1976 | Reick | |
| 3,980,153 A | 9/1976 | Andrews | |
| 4,142,724 A | 3/1979 | Reick | |
| 4,151,327 A | 4/1979 | Lawton | |
| 4,199,142 A | 4/1980 | Reick | |
| 4,301,197 A | 11/1981 | Franz et al. | |
| 4,301,213 A | 11/1981 | Davies | |
| 4,308,353 A * | 12/1981 | Saito et al. | 525/74 |
| 4,311,755 A | 1/1982 | Rummel | |
| 4,377,665 A * | 3/1983 | Shiraki et al. | 525/250 |
| 4,397,988 A * | 8/1983 | Sherman | 525/98 |
| 4,415,405 A | 11/1983 | Ruddle et al. | |
| 4,451,619 A | 5/1984 | Heilmann et al. | |
| 4,453,533 A | 6/1984 | Scheidler et al. | |
| 4,474,852 A | 10/1984 | Craig | |
| 4,492,217 A | 1/1985 | Scheidler | |
| 4,536,454 A | 8/1985 | Haasl | |
| 4,581,149 A | 4/1986 | Horodysky et al. | |
| 4,591,530 A | 5/1986 | Lui | |
| 4,614,464 A | 9/1986 | Christensen | |
| 4,624,900 A | 11/1986 | Fau | |
| 4,646,948 A | 3/1987 | Jennings | |
| 4,680,173 A | 7/1987 | Burger | |
| 4,687,707 A | 8/1987 | Matsuo et al. | |
| 4,716,183 A | 12/1987 | Gamarra et al. | |
| 4,733,843 A | 3/1988 | Bessinger | |
| 4,738,426 A | 4/1988 | Bessinger | |
| D295,950 S | 5/1988 | Johnston | |
| 4,745,139 A | 5/1988 | Haasl | |
| 4,749,110 A | 6/1988 | Maeno et al. | |
| 4,753,977 A | 6/1988 | Merrill | |
| 4,782,112 A | 11/1988 | Kondo et al. | |
| 4,835,014 A | 5/1989 | Roth et al. | |
| 4,837,260 A | 6/1989 | Sato et al. | |
| 4,855,176 A | 8/1989 | Ohwaki et al. | |
| 4,870,907 A | 10/1989 | McKee | |
| 4,923,260 A | 5/1990 | Poulsen | |
| 4,971,912 A | 11/1990 | Buhl et al. | |
| 4,983,459 A | 1/1991 | Franz et al. | |
| 5,011,727 A | 4/1991 | Kido et al. | |
| 5,011,963 A | 4/1991 | Ogawa et al. | |
| 5,032,641 A | 7/1991 | Nanishi et al. | |
| 5,041,304 A | 8/1991 | Kusano et al. | |
| 5,057,050 A | 10/1991 | Hill | |
| 5,084,191 A | 1/1992 | Nagase et al. | |
| 5,104,938 A * | 4/1992 | Toyama et al. | 525/92 C |
| 5,112,911 A * | 5/1992 | Mori et al. | 525/100 |
| 5,121,134 A | 6/1992 | Albinson et al. | |
| 5,156,611 A | 10/1992 | Haynes et al. | |
| 5,192,603 A * | 3/1993 | Slater et al. | 428/217 |
| 5,202,361 A | 4/1993 | Zimmerman et al. | |
| 5,212,215 A * | 5/1993 | Nanri et al. | 523/218 |
| 5,225,274 A | 7/1993 | Ogawa et al. | |
| 5,228,764 A | 7/1993 | Cherry et al. | |
| 5,228,905 A | 7/1993 | Grunewalder et al. | |
| 5,238,746 A | 8/1993 | Soga et al. | |
| 5,240,774 A | 8/1993 | Ogawa et al. | |
| 5,274,159 A | 12/1993 | Pellerite et al. | |
| 5,284,707 A | 2/1994 | Ogawa et al. | |
| 5,294,252 A | 3/1994 | Gun | |
| 5,300,239 A | 4/1994 | Ozaki et al. | |
| 5,308,705 A | 5/1994 | Franz et al. | |
| 5,312,573 A | 5/1994 | Rosenbaum et al. | |
| 5,314,940 A | 5/1994 | Stone | |
| 5,316,799 A | 5/1994 | Brunken et al. | |
| 5,317,129 A | 5/1994 | Taplan et al. | |
| 5,324,566 A | 6/1994 | Ogawa et al. | |
| 5,328,768 A | 7/1994 | Goodwin | |
| 5,338,345 A | 8/1994 | Scarborough et al. | |
| 5,348,547 A | 9/1994 | Payne et al. | |
| 5,352,733 A | 10/1994 | Hart | |
| 5,362,145 A | 11/1994 | Bird et al. | |
| 5,364,299 A | 11/1994 | Hill et al. | |
| 5,366,810 A | 11/1994 | Merrifield et al. | |
| 5,368,892 A | 11/1994 | Berquier | |
| 5,372,888 A | 12/1994 | Ogawa et al. | |
| 5,380,585 A | 1/1995 | Ogawa et al. | |
| 5,385,966 A | 1/1995 | Hermansen et al. | |
| 5,395,657 A | 3/1995 | Strepparola et al. | |
| 5,424,130 A | 6/1995 | Nakanishi et al. | |
| 5,429,433 A | 7/1995 | Bird et al. | |
| 5,435,839 A | 7/1995 | Ogawa | |
| 5,437,894 A | 8/1995 | Ogawa et al. | |
| 5,437,900 A | 8/1995 | Kuzowski | |
| 5,441,338 A | 8/1995 | Kane et al. | |
| 5,441,809 A * | 8/1995 | Akhter | 428/354 |
| 5,458,976 A | 10/1995 | Horino et al. | |
| 5,466,770 A | 11/1995 | Audenaert et al. | |
| 5,489,328 A | 2/1996 | Ono et al. | |
| 5,500,216 A | 3/1996 | Julian et al. | |
| 5,527,536 A * | 6/1996 | Merkle et al. | 424/448 |
| 5,534,580 A * | 7/1996 | Mitsui et al. | 524/417 |
| 5,539,054 A * | 7/1996 | LaFleur | 525/125 |
| 5,540,493 A | 7/1996 | Kane et al. | |
| 5,556,667 A | 9/1996 | Teranishi et al. | |
| 5,558,940 A | 9/1996 | Michels et al. | |
| 5,564,809 A | 10/1996 | Kane et al. | |
| 5,576,096 A | 11/1996 | Ono et al. | |
| 5,578,361 A | 11/1996 | Tsujioka et al. | |
| 5,584,957 A | 12/1996 | Schultheis et al. | |
| 5,585,896 A | 12/1996 | Yamazaki et al. | |
| 5,599,893 A | 2/1997 | Asai et al. | |
| 5,612,433 A | 3/1997 | Ono et al. | |
| 5,618,627 A | 4/1997 | Merrifield et al. | |
| 5,618,883 A * | 4/1997 | Plamthottam et al. | 525/98 |
| 5,651,921 A | 7/1997 | Kaijou | |
| 5,658,969 A | 8/1997 | Gerace | |
| 5,674,967 A | 10/1997 | Goodwin | |
| 5,679,460 A | 10/1997 | Schakenraad et al. | |
| 5,688,864 A | 11/1997 | Goodwin | |
| 5,697,991 A | 12/1997 | Frazer | |
| 5,707,740 A | 1/1998 | Goodwin | |
| 5,719,226 A * | 2/1998 | Kegley | 524/505 |
| 5,725,789 A | 3/1998 | Huber et al. | |
| 5,735,589 A | 4/1998 | Herrmann et al. | |
| 5,747,561 A | 5/1998 | Smirnov et al. | |
| 5,753,734 A | 5/1998 | Maruyama | |
| 5,777,043 A * | 7/1998 | Shafer et al. | 525/339 |
| 5,798,144 A | 8/1998 | Varanasi et al. | |
| 5,800,918 A | 9/1998 | Chartier et al. | |
| 5,813,741 A | 9/1998 | Fish et al. | |
| 5,814,411 A | 9/1998 | Merrifield et al. | |
| 5,824,421 A | 10/1998 | Kobayashi et al. | |
| 5,830,529 A | 11/1998 | Ross | |
| 5,840,201 A | 11/1998 | Elledge | |
| 5,843,338 A | 12/1998 | Inoue et al. | |
| 5,853,690 A | 12/1998 | Hibino et al. | |
| 5,853,800 A | 12/1998 | Dombrowski et al. | |
| 5,856,378 A | 1/1999 | Ring et al. | |
| 5,858,551 A | 1/1999 | Salsman | |
| 5,876,806 A | 3/1999 | Ogawa | |
| 5,890,907 A | 4/1999 | Minasian | |

(56) References Cited

U.S. PATENT DOCUMENTS

| | | | |
|---|---|---|---|
| 5,910,557 A | 6/1999 | Audenaert et al. |
| 5,921,411 A | 7/1999 | Merl |
| 5,924,359 A | 7/1999 | Watanabe |
| 5,945,482 A | 8/1999 | Fukuchi et al. |
| 5,947,574 A | 9/1999 | Avendano |
| 5,948,685 A | 9/1999 | Angros |
| 5,952,053 A | 9/1999 | Colby |
| 5,958,601 A | 9/1999 | Salsman |
| 5,980,990 A | 11/1999 | Goodwin |
| 6,013,724 A | 1/2000 | Mizutani et al. |
| 6,017,609 A | 1/2000 | Akamatsu et al. |
| 6,017,831 A | 1/2000 | Beardsley et al. |
| 6,017,997 A | 1/2000 | Snow et al. |
| 6,020,419 A | 2/2000 | Bock et al. |
| 6,024,948 A | 2/2000 | Samain et al. |
| 6,025,025 A | 2/2000 | Bartrug et al. |
| 6,033,738 A | 3/2000 | Teranishi et al. |
| 6,040,382 A * | 3/2000 | Hanes ............... 525/98 |
| 6,045,650 A | 4/2000 | Mitchnick et al. |
| 6,068,911 A | 5/2000 | Shouji et al. |
| 6,090,447 A | 7/2000 | Suzuki et al. |
| 6,093,559 A | 7/2000 | Bookbinder et al. |
| 6,096,380 A | 8/2000 | Takebe et al. |
| 6,105,233 A | 8/2000 | Neal |
| 6,114,446 A | 9/2000 | Narisawa et al. |
| 6,117,555 A | 9/2000 | Fujimori et al. |
| 6,119,626 A | 9/2000 | Miyazawa et al. |
| 6,120,720 A | 9/2000 | Meier et al. |
| 6,136,210 A | 10/2000 | Biegelsen et al. |
| 6,153,304 A | 11/2000 | Smith et al. |
| 6,162,870 A * | 12/2000 | Yamada et al. ............ 525/191 |
| 6,187,143 B1 | 2/2001 | Juppo et al. |
| 6,191,122 B1 | 2/2001 | Lux et al. |
| 6,201,058 B1 | 3/2001 | Mahr et al. |
| 6,207,236 B1 | 3/2001 | Araki et al. |
| 6,214,278 B1 * | 4/2001 | Yamada et al. ............ 264/464 |
| 6,221,434 B1 | 4/2001 | Visca et al. |
| 6,224,974 B1 | 5/2001 | Wuu |
| 6,228,435 B1 | 5/2001 | Yoshikawa et al. |
| 6,228,972 B1 | 5/2001 | Hikita et al. |
| 6,235,383 B1 | 5/2001 | Hong et al. |
| 6,235,833 B1 | 5/2001 | Akamatsu et al. |
| 6,245,387 B1 | 6/2001 | Hayden |
| 6,248,850 B1 * | 6/2001 | Arai ............... 526/347 |
| 6,264,751 B1 | 7/2001 | Kamura et al. |
| 6,280,834 B1 | 8/2001 | Veerasamy et al. |
| 6,288,149 B1 * | 9/2001 | Kroll ............... 524/81 |
| 6,291,054 B1 | 9/2001 | Thomas et al. |
| 6,333,074 B1 | 12/2001 | Ogawa et al. |
| 6,333,558 B1 | 12/2001 | Hasegawa |
| 6,337,133 B1 | 1/2002 | Akamatsu et al. |
| 6,340,502 B1 | 1/2002 | Azzopardi et al. |
| 6,342,268 B1 | 1/2002 | Samain |
| 6,352,758 B1 | 3/2002 | Huang et al. |
| 6,358,569 B1 | 3/2002 | Badyal et al. |
| 6,361,868 B1 | 3/2002 | Bier et al. |
| 6,376,592 B1 | 4/2002 | Shimada et al. |
| 6,379,751 B1 | 4/2002 | Schaefer et al. |
| 6,383,642 B1 | 5/2002 | Le Bellac et al. |
| 6,403,397 B1 | 6/2002 | Katz |
| 6,410,673 B1 * | 6/2002 | Arai et al. ............... 526/347 |
| 6,419,985 B1 | 7/2002 | Ishizuka |
| 6,423,372 B1 | 7/2002 | Genzer et al. |
| 6,423,381 B1 * | 7/2002 | Colton et al. ............ 427/510 |
| 6,432,181 B1 | 8/2002 | Ludwig |
| 6,451,432 B1 | 9/2002 | Azzopardi et al. |
| 6,458,420 B1 | 10/2002 | Akamatsu et al. |
| 6,458,467 B1 * | 10/2002 | Mizuno et al. ............ 428/480 |
| 6,461,537 B1 | 10/2002 | Turcotte et al. |
| 6,461,670 B2 | 10/2002 | Akamatsu et al. |
| 6,462,115 B1 | 10/2002 | Takahashi et al. |
| 6,471,761 B2 | 10/2002 | Fan et al. |
| 6,476,095 B2 | 11/2002 | Simendinger, III |
| 6,479,612 B1 | 11/2002 | Del Pesco et al. |
| 6,482,524 B1 | 11/2002 | Yamamoto et al. |
| 6,488,347 B1 | 12/2002 | Bienick |
| 6,559,234 B1 * | 5/2003 | Arai et al. ............... 525/245 |
| 6,564,935 B1 | 5/2003 | Yamamoto et al. |
| 6,566,453 B1 * | 5/2003 | Arai et al. ............... 525/244 |
| 6,579,620 B2 | 6/2003 | Mizunno et al. |
| 6,582,825 B2 | 6/2003 | Amarasekera et al. |
| 6,584,744 B1 | 7/2003 | Schultheis et al. |
| 6,589,641 B1 | 7/2003 | Stirniman et al. |
| 6,596,060 B1 | 7/2003 | Michaud |
| 6,610,363 B2 | 8/2003 | Arora et al. |
| 6,613,860 B1 | 9/2003 | Dams et al. |
| 6,623,863 B2 | 9/2003 | Kamitani et al. |
| 6,641,654 B2 | 11/2003 | Akamatsu et al. |
| 6,649,222 B1 | 11/2003 | D'Agostino et al. |
| 6,652,640 B2 | 11/2003 | Asai et al. |
| 6,660,339 B1 | 12/2003 | Datta et al. |
| 6,660,363 B1 | 12/2003 | Barthlott |
| 6,660,686 B2 | 12/2003 | Inagaki et al. |
| 6,683,126 B2 | 1/2004 | Keller et al. |
| 6,685,992 B1 | 2/2004 | Ogawa et al. |
| 6,689,200 B2 | 2/2004 | Scarborough et al. |
| 6,692,565 B2 | 2/2004 | Johansen, Jr. et al. |
| 6,706,798 B2 | 3/2004 | Kobayashi et al. |
| 6,720,371 B2 | 4/2004 | Furuta et al. |
| 6,729,704 B2 | 5/2004 | Ames |
| 6,733,892 B1 | 5/2004 | Yoneda et al. |
| 6,743,467 B1 | 6/2004 | Jones et al. |
| 6,767,984 B2 | 7/2004 | Toui et al. |
| 6,770,323 B2 | 8/2004 | Genzer et al. |
| 6,780,497 B1 | 8/2004 | Walter |
| 6,786,562 B2 | 9/2004 | Obrock et al. |
| 6,793,821 B2 | 9/2004 | Lee et al. |
| 6,800,354 B2 | 10/2004 | Baumann et al. |
| 6,806,299 B2 | 10/2004 | Baumann et al. |
| 6,808,835 B2 | 10/2004 | Green et al. |
| 6,811,716 B1 | 11/2004 | Stengaard et al. |
| 6,811,844 B2 | 11/2004 | Trouilhet |
| 6,811,884 B2 | 11/2004 | Goodwin |
| 6,835,778 B2 * | 12/2004 | Swisher et al. ............ 525/93 |
| 6,845,788 B2 | 1/2005 | Extrand |
| 6,852,389 B2 | 2/2005 | Nun et al. |
| 6,852,390 B2 | 2/2005 | Extrand |
| 6,855,375 B2 | 2/2005 | Nakagawa et al. |
| 6,855,759 B2 | 2/2005 | Kudo et al. |
| 6,858,284 B2 | 2/2005 | Nun et al. |
| 6,871,923 B2 | 3/2005 | Dietz et al. |
| 6,872,441 B2 | 3/2005 | Baumann et al. |
| 6,890,360 B2 | 5/2005 | Cote et al. |
| 6,923,216 B2 | 8/2005 | Extrand et al. |
| 6,926,946 B2 | 8/2005 | Ogawa et al. |
| 6,931,888 B2 | 8/2005 | Shekunov et al. |
| 6,938,774 B2 | 9/2005 | Extrand |
| 6,942,746 B2 | 9/2005 | Niejelow et al. |
| 6,966,990 B2 | 11/2005 | Chattopadhyay et al. |
| 6,976,585 B2 | 12/2005 | Extrand |
| 6,976,998 B2 | 12/2005 | Rizzo et al. |
| 6,982,242 B2 | 1/2006 | Liss et al. |
| 6,994,045 B2 | 2/2006 | Paszkowski |
| 6,998,051 B2 | 2/2006 | Chattopadhyay et al. |
| 7,004,184 B2 | 2/2006 | Handique et al. |
| 7,019,069 B2 | 3/2006 | Kobayashi et al. |
| 7,022,416 B2 | 4/2006 | Teranishi |
| 7,026,018 B2 | 4/2006 | Kranovich |
| 7,037,591 B2 | 5/2006 | Henze et al. |
| 7,048,889 B2 | 5/2006 | Arney et al. |
| 7,052,244 B2 | 5/2006 | Fouillet et al. |
| 7,056,409 B2 | 6/2006 | Dubrow |
| 7,057,832 B2 | 6/2006 | Wu et al. |
| 7,057,881 B2 | 6/2006 | Chow et al. |
| 7,074,273 B2 | 7/2006 | Shimomura et al. |
| 7,074,294 B2 | 7/2006 | Dubrow |
| 7,083,748 B2 | 8/2006 | Chattopadhyay et al. |
| 7,083,828 B2 | 8/2006 | Muller et al. |
| 7,109,256 B2 | 9/2006 | Amano et al. |
| 7,112,369 B2 | 9/2006 | Wang et al. |
| 7,124,450 B2 | 10/2006 | Davidson |
| 7,141,276 B2 | 11/2006 | Lehmann et al. |
| 7,144,947 B2 * | 12/2006 | Camus et al. ............ 524/505 |
| 7,148,181 B2 | 12/2006 | Tanaka et al. |

(56) References Cited

U.S. PATENT DOCUMENTS

| | | | |
|---|---|---|---|
| 7,150,904 B2 | 12/2006 | D'Urso et al. |
| 7,153,357 B2 | 12/2006 | Baumgart et al. |
| 7,157,018 B2 | 1/2007 | Scheidler |
| 7,166,235 B2 | 1/2007 | Majeti et al. |
| 7,175,723 B2 | 2/2007 | Jones et al. |
| 7,179,758 B2 | 2/2007 | Chakrapani et al. |
| 7,179,864 B2 | 2/2007 | Wang |
| 7,188,917 B2 | 3/2007 | Bienick |
| 7,198,855 B2 | 4/2007 | Liebmann-Vinson et al. |
| 7,204,298 B2 | 4/2007 | Hodes et al. |
| 7,211,223 B2 | 5/2007 | Fouillet et al. |
| 7,211,313 B2 | 5/2007 | Nun et al. |
| 7,211,329 B2 | 5/2007 | Metz et al |
| 7,211,605 B2 | 5/2007 | Coronado et al. |
| 7,213,309 B2 | 5/2007 | Wang et al. |
| D547,640 S | 7/2007 | Remmers |
| 7,238,751 B2 | 7/2007 | Wang et al. |
| 7,253,130 B2 | 8/2007 | Chiang et al. |
| 7,258,731 B2 | 8/2007 | D'Urso et al. |
| 7,264,845 B2 | 9/2007 | Papadaki et al. |
| 7,265,180 B2 * | 9/2007 | Chang et al. ............ 525/93 |
| 7,265,468 B1 | 9/2007 | Mancl et al. |
| 7,268,179 B2 | 9/2007 | Brown |
| 7,273,658 B2 | 9/2007 | Benayoun et al. |
| 7,285,331 B1 | 10/2007 | Reihs et al. |
| 7,288,311 B2 | 10/2007 | Kawashima et al. |
| 7,288,592 B2 | 10/2007 | Stark et al. |
| 7,291,653 B2 | 11/2007 | Baumann et al. |
| 7,306,895 B2 | 12/2007 | Kano et al. |
| 7,309,278 B2 | 12/2007 | Shibata |
| 7,312,057 B2 | 12/2007 | Bookbinder et al. |
| 7,323,033 B2 | 1/2008 | Kroupenkine et al. |
| 7,338,835 B2 | 3/2008 | Bao |
| 7,342,551 B2 | 3/2008 | King |
| 7,344,619 B2 | 3/2008 | Helmeke |
| 7,344,758 B2 | 3/2008 | Franchina et al. |
| 7,344,783 B2 | 3/2008 | Shea |
| 7,354,328 B2 | 4/2008 | Lee |
| 7,354,624 B2 | 4/2008 | Millero et al. |
| 7,354,650 B2 | 4/2008 | Nakajima et al. |
| D568,344 S | 5/2008 | Baacke et al. |
| 7,368,510 B2 | 5/2008 | Lee et al. |
| 7,393,515 B2 | 7/2008 | Hoshino et al. |
| 7,396,395 B1 | 7/2008 | Chen et al. |
| 7,419,615 B2 | 9/2008 | Strauss |
| 7,449,233 B2 | 11/2008 | Arora |
| 7,468,333 B2 | 12/2008 | Kimbrell, Jr. et al. |
| 7,524,531 B2 | 4/2009 | Axtell, III et al. |
| 7,527,832 B2 | 5/2009 | Sakoske et al. |
| 7,531,598 B2 | 5/2009 | Müller et al. |
| 7,544,411 B2 | 6/2009 | Baumann et al. |
| D596,931 S | 7/2009 | Fernandez |
| D596,932 S | 7/2009 | Kleinsasser |
| 7,563,505 B2 | 7/2009 | Reihs |
| 7,568,583 B2 | 8/2009 | Wing et al. |
| 7,607,744 B2 | 10/2009 | Casoli et al. |
| D607,020 S | 12/2009 | Baacke et al. |
| D612,404 S | 3/2010 | Picken et al. |
| D612,405 S | 3/2010 | Eicher |
| D613,316 S | 4/2010 | Schmidt |
| 7,726,615 B2 | 6/2010 | Rutz |
| 7,731,316 B2 | 6/2010 | Wing |
| 7,748,806 B2 | 7/2010 | Egan |
| 7,919,180 B2 | 4/2011 | Furukawa |
| 7,989,619 B2 | 8/2011 | Guire et al. |
| 8,258,206 B2 | 9/2012 | Kanagasabapathy et al. |
| 8,286,561 B2 | 10/2012 | Driver et al. |
| 8,580,884 B2 * | 11/2013 | Ding ............... 524/505 |
| 8,596,205 B2 | 12/2013 | Driver et al. |
| 8,715,906 B2 * | 5/2014 | Blanchet et al. ........ 430/271.1 |
| 8,779,025 B1 | 7/2014 | Stone |
| 9,067,821 B2 | 6/2015 | Bleecher et al. |
| 9,096,786 B2 | 8/2015 | Sikka et al. |
| 9,139,744 B2 | 9/2015 | Sikka et al. |
| 2001/0018130 A1 | 8/2001 | Hayden |
| 2001/0019773 A1 | 9/2001 | Akamatsu et al. |
| 2001/0024728 A1 | 9/2001 | Kamitani et al. |
| 2001/0030808 A1 | 10/2001 | Komatsu et al. |
| 2001/0055677 A1 | 12/2001 | Wuu |
| 2002/0001676 A1 | 1/2002 | Hayden |
| 2002/0034627 A1 | 3/2002 | Jacquiod et al. |
| 2002/0045007 A1 | 4/2002 | Arora et al. |
| 2002/0049276 A1 * | 4/2002 | Zwick ............... 524/476 |
| 2002/0077412 A1 | 6/2002 | Kobayashi et al. |
| 2002/0111402 A1 | 8/2002 | Mizuno et al. |
| 2002/0115736 A1 | 8/2002 | Koshy |
| 2002/0161130 A1 * | 10/2002 | Arai et al. ............. 525/244 |
| 2002/0177655 A1 | 11/2002 | Pratt et al. |
| 2002/0192472 A1 | 12/2002 | Metz et al. |
| 2002/0197490 A1 | 12/2002 | Amidaiji et al. |
| 2003/0009049 A1 | 1/2003 | Smith et al. |
| 2003/0013795 A1 | 1/2003 | Nun et al. |
| 2003/0021902 A1 | 1/2003 | Yamamoto et al. |
| 2003/0026972 A1 | 2/2003 | Reihs |
| 2003/0040243 A1 | 2/2003 | Ward |
| 2003/0040568 A1 | 2/2003 | Furuta et al. |
| 2003/0065093 A1 * | 4/2003 | Custro et al. ............ 525/88 |
| 2003/0070677 A1 | 4/2003 | Handique et al. |
| 2003/0072723 A1 | 4/2003 | Gers-Barlag et al. |
| 2003/0073067 A1 | 4/2003 | Bookfinder et al. |
| 2003/0077533 A1 | 4/2003 | Murota et al. |
| 2003/0091809 A1 | 5/2003 | Scarborough et al. |
| 2003/0110976 A1 | 6/2003 | Abidh et al. |
| 2003/0117051 A1 | 6/2003 | Kweon |
| 2003/0119684 A1 | 6/2003 | Tsao |
| 2003/0125656 A1 | 7/2003 | Davankov et al. |
| 2003/0143339 A1 | 7/2003 | Kobayashi |
| 2003/0149218 A1 | 8/2003 | Cote' et al. |
| 2003/0166840 A1 | 9/2003 | Urry et al. |
| 2003/0170401 A1 | 9/2003 | Shimomura et al. |
| 2003/0176572 A1 | 9/2003 | Maekawa et al. |
| 2003/0179494 A1 | 9/2003 | Kaneko |
| 2003/0194565 A1 | 10/2003 | Schaefer |
| 2003/0203771 A1 | 10/2003 | Rosenberg et al. |
| 2004/0005469 A1 | 1/2004 | Metz et al. |
| 2004/0020104 A1 | 2/2004 | Feldhege et al. |
| 2004/0025747 A1 | 2/2004 | Kamitani et al. |
| 2004/0039128 A1 * | 2/2004 | Sasagawa et al. ........ 525/331.9 |
| 2004/0050297 A1 | 3/2004 | Kobayashi et al. |
| 2004/0053058 A1 | 3/2004 | Kamitani et al. |
| 2004/0056575 A1 | 3/2004 | Dietz et al. |
| 2004/0097616 A1 | 5/2004 | Hoppler et al. |
| 2004/0102124 A1 | 5/2004 | Suzuki |
| 2004/0102588 A1 * | 5/2004 | Arai et al. ............. 526/72 |
| 2004/0121168 A1 | 6/2004 | Goodwin et al. |
| 2004/0137814 A1 | 7/2004 | Kimbrell, Jr. et al. |
| 2004/0138083 A1 | 7/2004 | Kimbrell, Jr. et al. |
| 2004/0142557 A1 | 7/2004 | Levy et al. |
| 2004/0154106 A1 | 8/2004 | Oles et al. |
| 2004/0192844 A1 * | 9/2004 | Ikematsu et al. ............ 525/93 |
| 2004/0201048 A1 | 10/2004 | Seki et al. |
| 2004/0202872 A1 | 10/2004 | Fang et al. |
| 2004/0209203 A1 | 10/2004 | Kano et al. |
| 2004/0213904 A1 | 10/2004 | Muller et al. |
| 2004/0216227 A1 | 11/2004 | Papadaki et al. |
| 2005/0000463 A1 | 1/2005 | Mochizuki |
| 2005/0004264 A1 | 1/2005 | Tanabe |
| 2005/0008859 A1 | 1/2005 | Forgacs |
| 2005/0009953 A1 | 1/2005 | Shea |
| 2005/0020763 A1 | 1/2005 | Milic |
| 2005/0022313 A1 | 2/2005 | Scheidler |
| 2005/0053793 A1 | 3/2005 | Benay-Oun et al. |
| 2005/0075020 A1 | 4/2005 | Benayoun et al. |
| 2005/0075455 A1 * | 4/2005 | Chang et al. ............ 525/78 |
| 2005/0106762 A1 | 5/2005 | Chakrapani et al. |
| 2005/0121782 A1 | 6/2005 | Nakamura et al. |
| 2005/0143547 A1 | 6/2005 | Stark et al. |
| 2005/0165194 A1 | 7/2005 | Benayoun et al. |
| 2005/0170098 A1 | 8/2005 | Baumann et al. |
| 2005/0197447 A1 * | 9/2005 | Gu et al. ............. 524/505 |
| 2005/0221098 A1 | 10/2005 | Azzopardi et al. |
| 2005/0239211 A1 | 10/2005 | Uchihara et al. |
| 2005/0245395 A1 | 11/2005 | Tanaka et al. |
| 2006/0013983 A1 | 1/2006 | Sebastian et al. |

(56) References Cited

U.S. PATENT DOCUMENTS

| | | |
|---|---|---|
| 2006/0029808 A1 | 2/2006 | Zhai et al. |
| 2006/0040164 A1 | 2/2006 | Vyas et al. |
| 2006/0051561 A1 | 3/2006 | Badyal |
| 2006/0052556 A1 | 3/2006 | Franchina et al. |
| 2006/0057390 A1 | 3/2006 | Kittle et al. |
| 2006/0058458 A1 | 3/2006 | Hasskerl et al. |
| 2006/0062695 A1 | 3/2006 | Haab et al. |
| 2006/0062929 A1 | 3/2006 | Kittle et al. |
| 2006/0081394 A1 | 4/2006 | Li et al. |
| 2006/0089466 A1 | 4/2006 | Shimomura et al. |
| 2006/0110541 A1 | 5/2006 | Russell et al. |
| 2006/0110542 A1 | 5/2006 | Dietz et al. |
| 2006/0113443 A1 | 6/2006 | Remmers |
| 2006/0147634 A1 | 7/2006 | Strauss |
| 2006/0147705 A1 | 7/2006 | Huang et al. |
| 2006/0151739 A1 | 7/2006 | Sandner et al. |
| 2006/0154048 A1 | 7/2006 | Teranishi et al. |
| 2006/0162373 A1 | 7/2006 | McMillin et al. |
| 2006/0172641 A1 | 8/2006 | Hennige et al. |
| 2006/0185555 A1 | 8/2006 | Giessler et al. |
| 2006/0205874 A1* | 9/2006 | Uzee et al. ................. 525/88 |
| 2006/0207032 A1 | 9/2006 | Reiners et al. |
| 2006/0213791 A1 | 9/2006 | Holden |
| 2006/0213792 A1 | 9/2006 | Nguyen et al. |
| 2006/0213849 A1 | 9/2006 | Bienick |
| 2006/0222865 A1 | 10/2006 | Hoshino et al. |
| 2006/0240218 A1 | 10/2006 | Parce |
| 2006/0263516 A1 | 11/2006 | Jones et al. |
| 2006/0266258 A1 | 11/2006 | Asakura et al. |
| 2006/0269758 A1 | 11/2006 | Helmeke |
| 2006/0281889 A1 | 12/2006 | Kobayashi et al. |
| 2006/0286305 A1 | 12/2006 | Thies et al. |
| 2006/0292345 A1 | 12/2006 | Dave et al. |
| 2007/0003705 A1 | 1/2007 | Strauss |
| 2007/0005024 A1 | 1/2007 | Weber et al. |
| 2007/0009657 A1 | 1/2007 | Zhang et al. |
| 2007/0014970 A1 | 1/2007 | Nun et al. |
| 2007/0026193 A1 | 2/2007 | Luzinov et al. |
| 2007/0036906 A1 | 2/2007 | Reeve |
| 2007/0046160 A1 | 3/2007 | Egan |
| 2007/0065668 A1 | 3/2007 | Idei |
| 2007/0075199 A1 | 4/2007 | Stewart et al. |
| 2007/0141114 A1 | 6/2007 | Muisener et al. |
| 2007/0141306 A1 | 6/2007 | Kasai et al. |
| 2007/0148407 A1 | 6/2007 | Chen et al. |
| 2007/0166513 A1 | 7/2007 | Sheng et al. |
| 2007/0172650 A1 | 7/2007 | O'Rear, III et al. |
| 2007/0172658 A1 | 7/2007 | Deruelle et al. |
| 2007/0172661 A1 | 7/2007 | Fechner et al. |
| 2007/0176379 A1 | 8/2007 | Sonnendorfer et al. |
| 2007/0196656 A1 | 8/2007 | Rowell |
| 2007/0202342 A1 | 8/2007 | Whiteford et al. |
| 2007/0213230 A1 | 9/2007 | Pfeiffer et al. |
| 2007/0215004 A1 | 9/2007 | Kuroda et al. |
| 2007/0218265 A1 | 9/2007 | Harris et al. |
| 2007/0224898 A1 | 9/2007 | Deangelis et al. |
| 2007/0231517 A1 | 10/2007 | Golownia |
| 2007/0238807 A1 | 10/2007 | Safir et al. |
| 2007/0259156 A1 | 11/2007 | Kempers et al. |
| 2007/0274871 A1 | 11/2007 | Jiang |
| 2007/0275245 A1 | 11/2007 | Persson et al. |
| 2007/0298216 A1 | 12/2007 | Jing et al. |
| 2008/0008838 A1 | 1/2008 | Arpac et al. |
| 2008/0012459 A1 | 1/2008 | Picken et al. |
| 2008/0015306 A1* | 1/2008 | Wright et al. .................. 524/572 |
| 2008/0018709 A1 | 1/2008 | Takenaka et al. |
| 2008/0020127 A1 | 1/2008 | Whiteford et al. |
| 2008/0021212 A1 | 1/2008 | Whiteford et al. |
| 2008/0032403 A1 | 2/2008 | Saito et al. |
| 2008/0039558 A1 | 2/2008 | Lazzari et al. |
| 2008/0039576 A1* | 2/2008 | Griswold et al. ............. 524/502 |
| 2008/0044635 A1 | 2/2008 | O'Neill et al. |
| 2008/0050567 A1 | 2/2008 | Kawashima et al. |
| 2008/0063870 A1 | 3/2008 | O'Rear et al. |
| 2008/0066648 A1 | 3/2008 | Asakura et al. |
| 2008/0070146 A1 | 3/2008 | Fomitchev et al. |
| 2008/0081858 A1 | 4/2008 | Okazaki |
| 2008/0088192 A1 | 4/2008 | Hsu |
| 2008/0090004 A1 | 4/2008 | Zhang et al. |
| 2008/0101041 A1 | 5/2008 | Chang et al. |
| 2008/0102347 A1 | 5/2008 | Blunk |
| 2008/0107864 A1 | 5/2008 | Zhang et al. |
| 2008/0131653 A1 | 6/2008 | Lyons et al. |
| 2008/0160257 A1 | 7/2008 | Takada et al. |
| 2008/0166549 A1 | 7/2008 | Shieh et al. |
| 2008/0171805 A1 | 7/2008 | Mingarelli |
| 2008/0172937 A1 | 7/2008 | Palmer et al. |
| 2008/0176991 A1 | 7/2008 | Osawa et al. |
| 2008/0193740 A1 | 8/2008 | Nesbitt |
| 2008/0197760 A1 | 8/2008 | Leconte et al. |
| 2008/0199657 A1 | 8/2008 | Capron et al. |
| 2008/0199659 A1 | 8/2008 | Zhao |
| 2008/0205950 A1 | 8/2008 | Moorlag et al. |
| 2008/0206550 A1 | 8/2008 | Borlner |
| 2008/0207581 A1 | 8/2008 | Whiteford et al. |
| 2008/0213601 A1 | 9/2008 | Yamamoto et al. |
| 2008/0220170 A1 | 9/2008 | Van Der Flaas |
| 2008/0220676 A1 | 9/2008 | Marin et al. |
| 2008/0221009 A1 | 9/2008 | Kanagasabapathy et al. |
| 2008/0221263 A1 | 9/2008 | Kanagasabapathy et al. |
| 2008/0226694 A1 | 9/2008 | Gelbert et al. |
| 2008/0237126 A1 | 10/2008 | Hoek et al. |
| 2008/0241512 A1 | 10/2008 | Boris et al. |
| 2008/0241523 A1 | 10/2008 | Huignard et al. |
| 2008/0245273 A1 | 10/2008 | Vyorkka et al. |
| 2008/0246804 A1 | 10/2008 | Kawase et al. |
| 2008/0248263 A1 | 10/2008 | Kobrin |
| 2008/0250978 A1 | 10/2008 | Baumgart et al. |
| 2008/0261024 A1 | 10/2008 | Xenopoulos et al. |
| 2008/0268233 A1 | 10/2008 | Lawin et al. |
| 2008/0269358 A1 | 10/2008 | Inoue et al. |
| 2008/0280699 A1 | 11/2008 | Jarvholm |
| 2008/0286556 A1 | 11/2008 | D'Urso et al. |
| 2008/0295347 A1 | 12/2008 | Braham |
| 2008/0296252 A1 | 12/2008 | D'Urso et al. |
| 2008/0306202 A1 | 12/2008 | Lin et al. |
| 2008/0310660 A1 | 12/2008 | Lin |
| 2009/0010870 A1 | 1/2009 | Greiner et al. |
| 2009/0011222 A1 | 1/2009 | Xiu et al. |
| 2009/0011227 A1 | 1/2009 | Furukawa |
| 2009/0011960 A1 | 1/2009 | Wu |
| 2009/0018249 A1 | 1/2009 | Kanagasabapathy et al. |
| 2009/0025508 A1 | 1/2009 | Liao et al. |
| 2009/0025609 A1 | 1/2009 | Egami et al. |
| 2009/0032088 A1 | 2/2009 | Rabinowitz |
| 2009/0035519 A1* | 2/2009 | Gaeta et al. ................... 428/143 |
| 2009/0036978 A1 | 2/2009 | Kleiner et al. |
| 2009/0042469 A1 | 2/2009 | Simpson |
| 2009/0058247 A1 | 3/2009 | Collins et al. |
| 2009/0064894 A1 | 3/2009 | Baumgart et al. |
| 2009/0076430 A1 | 3/2009 | Simpson et al. |
| 2009/0084574 A1 | 4/2009 | Balfour et al. |
| 2009/0084914 A1 | 4/2009 | Picken et al. |
| 2009/0085453 A1 | 4/2009 | Daley et al. |
| 2009/0087670 A1 | 4/2009 | Peng et al. |
| 2009/0095941 A1 | 4/2009 | Nakata et al. |
| 2009/0099301 A1 | 4/2009 | Naraghi et al. |
| 2009/0105409 A1 | 4/2009 | Munzmay et al. |
| 2009/0105679 A1 | 4/2009 | Joubert et al. |
| 2009/0111344 A1 | 4/2009 | Murphy et al. |
| 2009/0115302 A1 | 5/2009 | Benz et al. |
| 2009/0123728 A1 | 5/2009 | Cheung et al. |
| 2009/0134758 A1 | 5/2009 | Vardon |
| 2009/0136737 A1 | 5/2009 | Ring et al. |
| 2009/0142604 A1 | 6/2009 | Imai et al. |
| 2009/0155566 A1 | 6/2009 | Gentleman et al. |
| 2009/0162592 A1 | 6/2009 | Baikerikar et al. |
| 2009/0163637 A1 | 6/2009 | Li et al. |
| 2009/0182085 A1 | 7/2009 | Escobar Barrios et al. |
| 2009/0186070 A1 | 7/2009 | Guire et al. |
| 2009/0188877 A1 | 7/2009 | Stewart |
| 2009/0193743 A1* | 8/2009 | Wiercinski ...................... 52/408 |
| 2009/0195136 A1 | 8/2009 | Wing et al. |
| 2009/0208739 A1* | 8/2009 | Husemann et al. ............ 428/354 |

(56) References Cited

U.S. PATENT DOCUMENTS

| | | | |
|---|---|---|---|
| 2009/0212505 A1 | 8/2009 | McMillin et al. | |
| 2009/0240004 A1 | 9/2009 | Maier et al. | |
| 2009/0263604 A1* | 10/2009 | Arai et al. | 428/36.9 |
| 2009/0286023 A1* | 11/2009 | Dobreski et al. | 428/34.8 |
| 2009/0298369 A1 | 12/2009 | Koene et al. | |
| 2009/0324910 A1 | 12/2009 | Gemici et al. | |
| 2010/0001625 A1 | 1/2010 | Eckartsberg et al. | |
| 2010/0003493 A1 | 1/2010 | Cheng et al. | |
| 2010/0004373 A1 | 1/2010 | Zhu et al. | |
| 2010/0006223 A1* | 1/2010 | Krawinkel et al. | 156/327 |
| 2010/0026156 A1 | 2/2010 | Leconte et al. | |
| 2010/0052491 A1 | 3/2010 | Vardon | |
| 2010/0102693 A1 | 4/2010 | Driver et al. | |
| 2010/0109498 A1 | 5/2010 | Ramm et al. | |
| 2010/0117502 A1 | 5/2010 | Kang et al. | |
| 2010/0133970 A1 | 6/2010 | Shin et al. | |
| 2010/0176703 A1 | 7/2010 | Kim | |
| 2010/0181884 A1 | 7/2010 | De La Garza et al. | |
| 2010/0196702 A9 | 8/2010 | Furukawa | |
| 2010/0213334 A1 | 8/2010 | Davenport | |
| 2010/0272913 A1 | 10/2010 | Russell et al. | |
| 2010/0314575 A1* | 12/2010 | Gao et al. | 252/70 |
| 2010/0330347 A1 | 12/2010 | Badyal et al. | |
| 2011/0020637 A1* | 1/2011 | Ikishima et al. | 428/336 |
| 2011/0027531 A1* | 2/2011 | Uchida et al. | 428/141 |
| 2011/0033662 A1* | 2/2011 | Ikishima et al. | 428/141 |
| 2011/0111656 A1 | 5/2011 | Gao et al. | |
| 2011/0184082 A1* | 7/2011 | Wright et al. | 521/148 |
| 2011/0217544 A1 | 9/2011 | Young et al. | |
| 2011/0243985 A1* | 10/2011 | Pagani et al. | 424/195.17 |
| 2011/0251318 A1 | 10/2011 | Ishizaki et al. | |
| 2011/0303156 A1* | 12/2011 | Sikka et al. | 119/165 |
| 2011/0313082 A1 | 12/2011 | Popp | |
| 2012/0009396 A1* | 1/2012 | Sikka et al. | 428/195.1 |
| 2012/0040577 A1 | 2/2012 | Kissel et al. | |
| 2012/0045954 A1* | 2/2012 | Bleecher et al. | 442/80 |
| 2013/0139309 A1* | 6/2013 | Bleecher et al. | 4/255.11 |
| 2013/0216820 A1 | 8/2013 | Riddle et al. | |
| 2014/0087134 A1* | 3/2014 | Gesford et al. | 428/141 |
| 2014/0296409 A1* | 10/2014 | Sikka et al. | 524/365 |
| 2014/0349061 A1* | 11/2014 | Sikka et al. | 428/98 |
| 2015/0005424 A1 | 1/2015 | Jones et al. | |
| 2015/0030779 A1 | 1/2015 | Bleecher et al. | |
| 2015/0097475 A1 | 4/2015 | Sikka et al. | |

FOREIGN PATENT DOCUMENTS

| | | | |
|---|---|---|---|
| CA | 2796305 | * | 12/2011 |
| DE | 10306891 | * | 8/2004 |
| DE | 10 2010 022 265 A | | 5/2010 |
| EP | 0 166 363 A2 | | 1/1986 |
| EP | 0 207 282 A2 | | 7/1987 |
| EP | 0 307 915 A2 | | 3/1989 |
| EP | 0 317 057 A2 | | 5/1989 |
| EP | 0 332 141 A2 | | 9/1989 |
| EP | 0 386 991 A1 | | 9/1990 |
| EP | 0 399 568 A2 | | 11/1990 |
| EP | 0 446 391 A1 | | 9/1991 |
| EP | 0 452 723 A1 | | 10/1991 |
| EP | 0 472 215 A2 | | 2/1992 |
| EP | 0 476 510 A1 | | 3/1992 |
| EP | 0 493 270 A2 | | 7/1992 |
| EP | 0 545 201 A2 | | 6/1993 |
| EP | 0 623 656 A2 | | 11/1994 |
| EP | 0 649 887 A2 | | 4/1995 |
| EP | 0 657 393 A1 | | 6/1995 |
| EP | 0 714 870 A1 | | 6/1996 |
| EP | 0 714 921 A1 | | 6/1996 |
| EP | 0 719 743 A1 | | 7/1996 |
| EP | 0 719 821 A1 | | 7/1996 |
| EP | 0 739 714 A2 | | 10/1996 |
| EP | 0 745 567 A1 | | 12/1996 |
| EP | 0 745 568 A1 | | 12/1996 |
| EP | 0 752 459 A2 | | 1/1997 |
| EP | 0 770 706 A1 | | 5/1997 |
| EP | 0 904 343 A1 | | 5/1997 |
| EP | 0 799 791 A1 | | 10/1997 |
| EP | 0 811 430 A1 | | 12/1997 |
| EP | 0 863 191 A2 | | 9/1998 |
| EP | 0 969 718 B1 | | 9/1998 |
| EP | 0 903 389 A1 | | 3/1999 |
| EP | 0 914 873 A1 | | 5/1999 |
| EP | 0 915 103 A1 | | 5/1999 |
| EP | 0 930 351 A1 | | 7/1999 |
| EP | 1 047 735 A2 | | 11/2000 |
| EP | 1 048 696 A2 | | 11/2000 |
| EP | 1 097 979 A1 | | 5/2001 |
| EP | 1 108 735 A1 | | 6/2001 |
| EP | 1 113 064 A1 | | 7/2001 |
| EP | 1 136 539 A1 | | 9/2001 |
| EP | 1 180 533 A1 | | 2/2002 |
| EP | 1 187 872 A1 | | 3/2002 |
| EP | 1 193 289 A1 | | 4/2002 |
| EP | 1 215 252 A2 | | 6/2002 |
| EP | 1 401 903 A2 | | 9/2002 |
| EP | 1 261 559 A1 | | 12/2002 |
| EP | 1 392 619 A1 | | 12/2002 |
| EP | 1 392 772 A1 | | 12/2002 |
| EP | 1 429 919 A1 | | 2/2003 |
| EP | 1 492 837 A1 | | 10/2003 |
| EP | 1 360 253 A2 | | 11/2003 |
| EP | 1 362 904 A1 | | 11/2003 |
| EP | 1 503 813 A1 | | 11/2003 |
| EP | 1 387 011 A1 | | 2/2004 |
| EP | 1 387 169 A1 | | 2/2004 |
| EP | 1 407 792 A1 | | 4/2004 |
| EP | 1 433 821 A1 | | 6/2004 |
| EP | 1 583 615 A1 | | 7/2004 |
| EP | 1 473 355 A1 | | 11/2004 |
| EP | 1 475 234 A1 | | 11/2004 |
| EP | 1 479 738 A1 | | 11/2004 |
| EP | 1 524 290 A1 | | 4/2005 |
| EP | 1 875 279 A1 | | 11/2006 |
| EP | 1 883 669 A1 | | 11/2006 |
| EP | 1 902 091 A2 | | 1/2007 |
| EP | 1 752 284 A1 | | 2/2007 |
| EP | 1 857 497 A2 | | 11/2007 |
| EP | 1 873 218 A1 | | 1/2008 |
| EP | 1 908 804 A1 | | 4/2008 |
| EP | 1 988 129 A2 | | 11/2008 |
| EP | 1 997 619 A1 | | 12/2008 |
| EP | 2 346 678 | | 7/2011 |
| EP | 2 678 400 | | 8/2012 |
| EP | 2 547 832 A0 | | 1/2013 |
| EP | 1 902 091 | | 5/2013 |
| EP | 2 791 255 | | 6/2013 |
| EP | 2 864 430 A0 | | 4/2015 |
| GB | 1 341 605 A | | 12/1973 |
| GB | 1 465 495 | | 2/1977 |
| GB | 2 484 751 A | | 4/2012 |
| JP | 62-246960 A | | 10/1987 |
| JP | H05-186738 A | | 7/1993 |
| JP | H07-090691 A | | 4/1995 |
| JP | H10-309768 A | | 11/1998 |
| JP | 2002-020575 | * | 10/2002 |
| JP | 2004162133 | | 6/2004 |
| JP | 2004-143352 | * | 11/2004 |
| JP | 2004308984 A | | 11/2004 |
| JP | 2005082616 A | | 3/2005 |
| JP | 2006131938 A | | 5/2006 |
| JP | 2006-176559 | * | 9/2006 |
| JP | 2007144917 A | | 6/2007 |
| JP | 2007182491 A | | 7/2007 |
| JP | 2008228958 A | | 10/2008 |
| JP | 2009071672 A | | 4/2009 |
| JP | 2009-120792 | * | 9/2009 |
| KR | 10-2003-052853 | | 6/2003 |
| KR | 10-2009-90240 | | 10/2010 |
| MX | 175646 | | 8/1994 |
| MX | 183533 | | 12/1996 |
| MX | 192053 | | 5/1999 |
| MX | 195031 | | 1/2000 |
| MX | 199899 | | 11/2000 |

(56) References Cited

FOREIGN PATENT DOCUMENTS

| | | |
|---|---|---|
| MX | 201072 | 3/2001 |
| MX | 203880 | 8/2001 |
| MX | 205074 | 11/2001 |
| MX | PA01011653 A | 12/2002 |
| MX | 215752 | 8/2003 |
| MX | PA02006399 A | 9/2003 |
| MX | PA04010165 A | 2/2005 |
| MX | PA05006898 A | 8/2005 |
| MX | PA02012841 A | 1/2006 |
| MX | 234477 | 2/2006 |
| MX | PA06003323 A | 3/2006 |
| WO | WO 86/05389 A1 | 9/1986 |
| WO | WO 91-04305 A1 | 4/1991 |
| WO | WO 93-16131 A1 | 8/1993 |
| WO | WO 94-13734 A1 | 6/1994 |
| WO | WO 96-04123 A1 | 2/1996 |
| WO | WO 96-07621 A1 | 3/1996 |
| WO | WO 97-07993 A1 | 3/1997 |
| WO | WO 98-20960 A1 | 5/1998 |
| WO | WO 99-23137 A1 | 5/1999 |
| WO | WO 99-23437 A1 | 5/1999 |
| WO | WO 99-40431 A1 | 8/1999 |
| WO | WO 99-47578 A1 | 9/1999 |
| WO | WO 99-48339 A1 | 9/1999 |
| WO | WO 99-57185 A1 | 11/1999 |
| WO | WO 99-64363 A1 | 12/1999 |
| WO | WO 00-05321 A1 | 2/2000 |
| WO | WO 00-14297 A1 | 3/2000 |
| WO | WO 00-25938 A1 | 5/2000 |
| WO | WO 00-34361 A1 | 6/2000 |
| WO | WO 00-39240 A1 | 7/2000 |
| WO | WO 00-46464 A1 | 8/2000 |
| WO | WO 00-66241 A1 | 11/2000 |
| WO | WO 01-19745 A1 | 3/2001 |
| WO | WO 01-62682 A1 | 8/2001 |
| WO | WO 01-74739 A1 | 10/2001 |
| WO | WO 01-79142 A1 | 10/2001 |
| WO | WO 01-79371 A2 | 10/2001 |
| WO | WO 01-98399 A1 | 12/2001 |
| WO | WO 02-14417 A1 | 2/2002 |
| WO | WO 02-28951 A1 | 4/2002 |
| WO | WO 02-062910 A2 | 8/2002 |
| WO | WO 02-074869 A1 | 9/2002 |
| WO | WO 02-098983 A1 | 12/2002 |
| WO | WO 03-010255 A2 | 2/2003 |
| WO | WO 03-012004 A1 | 2/2003 |
| WO | WO 03-030879 A1 | 4/2003 |
| WO | WO 03-037702 A1 | 5/2003 |
| WO | WO 03-045693 A1 | 6/2003 |
| WO | WO 03-063646 A2 | 8/2003 |
| WO | WO 03-080258 A2 | 10/2003 |
| WO | WO 03-082998 A1 | 10/2003 |
| WO | WO 03-093568 A1 | 11/2003 |
| WO | WO 2004-012625 A2 | 2/2004 |
| WO | WO 2004-043319 A2 | 5/2004 |
| WO | WO 2004-058418 A1 | 7/2004 |
| WO | WO 2004-104116 A1 | 12/2004 |
| WO | WO 2004-110132 A2 | 12/2004 |
| WO | WO 2005-021843 A1 | 3/2005 |
| WO | WO 2005-023935 A1 | 3/2005 |
| WO | WO 2005-028562 A1 | 3/2005 |
| WO | WO 2005-068399 A1 | 7/2005 |
| WO | WO 2005-077429 A1 | 8/2005 |
| WO | WO 2006/044641 A2 | 4/2006 |
| WO | WO 2006-044642 A2 | 4/2006 |
| WO | WO 2006-081891 A1 | 8/2006 |
| WO | WO 2006-083600 A1 | 8/2006 |
| WO | WO 2006-101934 A1 | 9/2006 |
| WO | WO 2006-135755 A2 | 12/2006 |
| WO | WO 2007-011731 A2 | 1/2007 |
| WO | WO 2007-027276 A1 | 3/2007 |
| WO | WO 2007-052260 A2 | 5/2007 |
| WO | WO 2007-053266 A1 | 5/2007 |
| WO | WO 2007-056427 A2 | 5/2007 |
| WO | WO 2007-070801 A2 | 6/2007 |
| WO | WO 2007-075407 A1 | 7/2007 |
| WO | WO 2007-092746 A2 | 8/2007 |
| WO | WO 2007-102960 A2 | 9/2007 |
| WO | WO 2007-104494 A1 | 9/2007 |
| WO | WO 2007-126432 A1 | 11/2007 |
| WO | WO 2007-126743 A1 | 11/2007 |
| WO | WO 2007-130294 A2 | 11/2007 |
| WO | WO 2007-149617 A1 | 12/2007 |
| WO | WO 2008-004827 A1 | 1/2008 |
| WO | WO 2008-004828 A1 | 1/2008 |
| WO | WO 2008-006078 A2 | 1/2008 |
| WO | WO 2008-021791 A2 | 2/2008 |
| WO | WO 2008-035347 A2 | 3/2008 |
| WO | WO 2008-035917 A1 | 3/2008 |
| WO | WO 2008-050895 A1 | 5/2008 |
| WO | WO 2008-051221 A2 | 5/2008 |
| WO | WO 2008-066828 A2 | 6/2008 |
| WO | WO 2008-078346 A1 | 7/2008 |
| WO | WO 2008-106494 A1 | 9/2008 |
| WO | WO 2008-112158 A1 | 9/2008 |
| WO | WO 2008-123650 A1 | 10/2008 |
| WO | WO 2008-123955 A1 | 10/2008 |
| WO | WO 2008-123961 A1 | 10/2008 |
| WO | WO 2008-134243 A1 | 11/2008 |
| WO | WO 2008-137973 A1 | 11/2008 |
| WO | WO 2008-151991 A1 | 12/2008 |
| WO | WO 2008-153687 A2 | 12/2008 |
| WO | WO 2009-003847 A1 | 1/2009 |
| WO | WO 2009-005465 A1 | 1/2009 |
| WO | WO 2009-012116 A2 | 1/2009 |
| WO | WO 2009-018327 A2 | 2/2009 |
| WO | WO 2009-032988 A1 | 3/2009 |
| WO | WO 2009-037717 A2 | 3/2009 |
| WO | WO 2009-041752 A1 | 4/2009 |
| WO | WO 2009-061199 A1 | 5/2009 |
| WO | WO 2009-148611 A1 | 12/2009 |
| WO | WO 2009-158567 A1 | 12/2009 |
| WO | WO 2010/033288 A2 | 3/2010 |
| WO | WO 2010/042191 | * 4/2010 |
| WO | WO2010/042191 | * 4/2010 |
| WO | WO 2010-042668 A1 | 4/2010 |
| WO | WO 2011-116005 A1 | 9/2011 |
| WO | WO 2011/116005 | * 12/2011 |
| WO | WO 2011-151151 A1 | 12/2011 |
| WO | WO 2012-115986 A1 | 8/2012 |
| WO | WO 2013-090939 A1 | 6/2013 |
| WO | WO 2014-003852 A9 | 1/2014 |
| WO | WO 2015-048539 A1 | 4/2015 |

OTHER PUBLICATIONS

Yield strength, elastic limit, and ultimate strength NPL document, retrieved Mar. 20, 2015.*
Machine translation of JP 2004-143352, retrieved Aug. 6, 2015.*
Machine translation of DE 10306891, retrieved Aug. 6, 2015.*
Machine translation of JP 2006-176559, retrieved Aug. 6, 2015.*
Machine translation of JP 2009-120792, retrieved Aug. 6, 2015.*
Machine translation of JP 2002-020575, retrieved Aug. 6, 2015.*
Prosecution History U.S. Appl. No. 14/323,660 Aug. 2015.
Prosecution History EP Patent Application No. 13 809 987.4 Aug. 2015.
Kraton$^{TM}$ FG1901 Data Document Jun. 17, 2014.
Kraton$^{TM}$ Polymers for Modification of Thermoplastics—available on the world wide web at http://docs.kraton.com/kraton/attachments/downloads/81311AM.pdf, last accessed Aug. 3, 2015.
U.S. Appl. No. 60/699,200, filed Jul. 14, 2005, Guire et al. (Innovative Surface Technologies, Inc.).
U.S. Appl. No. 60/807,143, filed Jul. 12, 2006, Guire et al. (Innovative Surface Technologies, Inc.).
U.S. Appl. No. 60/891,876, filed Feb. 27, 2007, Lawin et al. (Innovative Surface Technology, Inc.).
U.S. Appl. No. 61/058,902, filed Jun. 4, 2008, Driver et al.
U.S. Appl. No. 61/090,002, filed Aug. 19, 2008, Driver et al.
U.S. Appl. No. 61/133,273, filed Jun. 27, 2008, Driver et al.
U.S. Appl. No. 61/198,414, filed Jun. 16, 2009, Gao.
U.S. Appl. No. 61/216,540, filed May 18, 2009, Driver et al.
U.S. Appl. No. 61/252,229, filed Oct. 16, 2009, Gao.

(56) References Cited

OTHER PUBLICATIONS

U.S. Appl. No. 12/037,520 file history, now U.S. Pat. No. 7,943,234, filed Feb. 26, 2008, Lawin et al.
"Composition," in *Collins English Dictionary*, found at http://www.credoreference.com/entry/hcengdict/composition, 2000 (viewed Aug. 26, 2013).
"NeverWet—product characteristics," found at http://www.neverwet.com/product-characteristics.php, NeverWet LLC (viewed Mar. 7, 2013).
"Yield strength, elastic limit, and ultimate strength," found at http://inventor.grantadesign.com/en/notes/science/material/S04%20strength.htm, Granta Design Ltd. (viewed Feb. 10, 2015).
2009 R&D 100 Award Entry Form (p. 5 excerpt from another document) showing Fig. 1 Schematic of NICE ("no ice nanocoating") (2009).
Bae et al., "Superhydrophobicity of cotton fabrics treated with silica nanoparticles and water-repellent agent," *J Colloid Interface Sci*, abstract only (May 3, 2009; epublication ahead of print).
Bayer Materials Science product information on Bayhydrol® 110 polyurethane dispersion (two first pages of this brochure) (Aug. 2002).
Bayer Materials Science product information on Bayhydrol® 122 polyurethane dispersion (Jan. 2004).
Bayer Materials Science product information on Bayhydrol® 124 polyurethane dispersion (Jan. 2004).
Bayer Materials Science product information on Bayhydrol® 140AQ, polyurethane dispersion (Aug. 2002).
Bayer Materials Science product information on Bayhydrol® A145, aqueous hydroxyl-functional polyurethane dispersion (Jan. 2010).
Beyler et al, "Thermal Decomposition of Polymers," Chapter 7 of *The SFPE Handbook of Fire Protection Engineering* ($3^{rd}$ ed.), pp. 1-110-1-131 (2002).
Bliznakov et al., "Double-scale roughness and superhydrophobicity on metalized Toray carbon fiber paper," *Langmuir*, 25(8):4760-4766, abstract only (Apr. 21, 2009).
Boinovich et al., "Principles of design of superhydrophobic coatings by deposition from dispersions," *Langmuir*, 25(5):2907-2912, abstract only (Mar. 3, 2009).
Boinovich et al., "Principles of Design of Superhydrophobic Coatings by Deposition from Dispersions," *Langmuir*, abstract only (Feb. 10, 2009; epublication ahead of print).
Bravo et al., "Transparent superhydrophobic films based on silica nanoparticles," *Langmuir*, 23(13):7293-7298, abstract only (Jun. 19, 2007; epublished May 25, 2007).
Choi et al., "Large slip of aqueous liquid flow over a nanoengineered superhydrophobic surface," *Phys Rev Lett*, 96(6):066001, abstract only (Feb. 17, 2006; epublished Feb. 16, 2006).
Clark, M.D.T. et al. "Paints and Pigments" available at nzic.org.nz/ChemProcesses/polymers/10D.pdf (copyright 2005-2008 at http://nzic.org.nz/ChemProcesses/polymers/).
de Givenchy et al., "Fabrication of Superhydrophobic PDMS Surfaces by Combining Acidic Treatment and Perfluorinated Monolayers," *Langmuir*, 25(11):6448-6453, abstract only (Jun. 2, 2009).
Du, "Surfactants, Dispersants, and Defoamers for the Coatings, Inks, and Adhesives Industries," in *Coatings Technology Handbook, Third Edition*, Tracton (ed.), CRC Press (2005).
EPO Communication dated Dec. 5, 2011, regarding third-party observations filed in European Application No. 09771098.2.
Extended European search report for European Application No. 920119918, dated Jul. 22, 1997.
Extended European search report for European Application No. 09771098.2, dated Dec. 27, 2011.
Extended European search report for European Application No. 09819518, dated Jul. 22, 2014.
Fürstner et al., "Wetting and self-cleaning properties of artificial superhydrophobic surfaces," *Langmuir*, 21(3):956-961, abstract only (Feb. 1, 2005).
García et al., "Use of p-toluenesulfonic acid for the controlled grafting of alkoxysilanes onto silanol containing surfaces; preparation of tunable hydrophilic, hydrophobic, and super-hydrophobic silica," *J Am Chem Soc*, 129(16):5052-5060, abstract only (Apr. 25, 2007; epublished Mar. 31, 2007).
Gonçalves et al., "Superhydrophobic cellulose nanocomposites," *J. Colloid Interface Sci*, 324(1-2):42-46, abstract only (Aug. 2008; epublished May 7, 2008).
Guo et al., "A novel approach to stable superhydrophobic surfaces," *Chemphyschem*, 7(8):1674-1677, abstract only (Aug. 11, 2006; epublished Jul. 17, 2006).
International Preliminary Report on Patentability for International Application No. PCT/US2009/048775, dated Jan. 13, 2011.
International Preliminary Report on Patentability for International Application No. PCT/US2010/059909, dated Apr. 21, 2011.
International Search Report and Written Opinion for International Application No. PCT/US2009/005512, dated Dec. 8, 2009.
International Search Report and Written Opinion for International Application No. PCT/US2009/048775, dated Nov. 19, 2009.
International Search Report and Written Opinion for International Application No. PCT/US2009/059909, dated Dec. 4, 2009.
International Search Report and Written Opinion for International Application No. PCT/US2010/048711, dated Mar. 17, 2011.
International Search Report and Written Opinion for International Application No. PCT/US2010/054936, dated Feb. 16, 2011.
International Search Report and Written Opinion for International Application No. PCT/US2010/070200, dated Feb. 27, 2013.
International Search Report and Written Opinion for International Application No. PCT/US2012/025982, dated Jun. 13, 2012.
International Search Report and Written Opinion for International Application No. PCT/US2013/031751, dated Dec. 23, 2013.
International Search Report and Written Opinion for International Application No. PCT/US2014/057848, dated Dec. 29, 2014.
Jauregui-Beloqui et al., "Thermoplastic polyurethane-fumed silica composites: influence of the specific surface area of fumed silica on the viscoelastic and adhesion properties," *Journal of Adhesive Science and Technology*, 13(6):695-711, abstract only (1999).
Kietzig et al., "Patterned superhydrophobic metallic surfaces," *Langmuir*, 25(8):4821-4827, abstract only (Apr. 21, 2009).
Kim et al., "A simple fabrication route to a highly transparent superhydrophobic surface with a poly(dimethylsiloxane) coated flexible mold," *Chem Commun (Camb)*, 22:2237-2239, abstract only (Jun. 14, 2007; epublished Mar. 6, 2007).
Kraton® FG1924 G Polymer, Data Document, Identifier K123DDe09U, the KRATON Polymers Group of Companies (Aug. 10, 2009).
Le Marechal et al., "Textile Finishing Industry as an Important Source of Organic Pollutants," in *Organic Pollutants Ten Years After the Stockholm Convention—Environmental and Analytical Update*, Puzyn (ed.), Chapter 2, pp. 29-54, InTech (2012).
Lee et al., "Impact of a superhydrophobic sphere onto water," *Langmuir*, 24(1):142-145, abstract only (Jan. 1, 2008; epublished Nov. 14, 2007).
Li et al., "Conversion of a metastable superhydrophobic surface to an ultraphobic surface," *Langmuir*, 24(15):8008-8012, abstract only (Aug. 5, 2008; epublished Jul. 8, 2008).
Ling et al., "Stable and transparent superhydrophobic nanoparticle films," *Langmuir*, 25(5):3260-3263, abstract only (Mar. 3, 2009).
Litvinov et al., "Structure of a PDMS Layer Grafted onto a Silica Surface Studied by Means of DSC and Solid-State NMR," *Macromolecules*, 35(11):4356-4364 (2002).
Manca et al., "Durable superhydrophobic and antireflective surfaces by trimethylsilanized silica nanoparticles-based sol-gel processing," *Langmuir*, 25(11):6357-6362, abstract only (Jun. 2, 2009).
Marmur, "Super-hydrophobicity fundamentals: implications to biofouling prevention," *Biofouling*, 22(1-2):107-115, abstract only (2006).
Ming et al., "Toward Superlyophobic Surfaces," *Contact Angle, Wettability and Adhesion* (ed. Mittal), vol. 6, pp. 191-205, Koninklijke Brill NV, Leiden (2009).
Nosonovsky et al., "Patterned nonadhesive surfaces: superhydrophobicity and wetting regime transitions," *Langmuir*, 24(4):1525-1533, abstract only (Feb. 19, 2008; epublished Dec. 12, 2007).

(56) References Cited

OTHER PUBLICATIONS

Park et al., "Wetting transition and optimal design for microstructured surfaces with hydrophobic and hydrophilic materials," *J. Colloid Interface Sci*, 336(1):298-303, abstract only (Aug. 1, 2009; epublished Apr. 15, 2009).
Perez, Jr., et al., "Performance and Processing Enhancements of Aromatic Polyurea Elastomer Systems Prepared from High 2,4'-MDI Isocyanates," in *Polyurethanes Conference 2000: Defining the Future Through Technology*, Boston, Massachusetts, pp. 219-232 (Oct. 8-11, 2000).
Piret et al., "Biomolecule and nanoparticle transfer on patterned and heterogeneously wetted superhydrophobic silicon nanowire surfaces," *Langmuir*, 24(5):1670-1672, abstract only (Mar. 4, 2008; epublished Feb. 6, 2008).
Puukilainen et al., "Superhydrophobic polyolefin surfaces: controlled micro- and nanostructures," *Langmuir*, 23(13):7263-7268, abstract only (Jun. 19, 2007; epublished May 23, 2007).
Sakai et al., "Direct observation of internal fluidity in a water droplet during sliding on hydrophobic surfaces," *Langmuir*, 22(11):4906-4909, abstract only (May 23, 2006).
Sherwin Williams Chemical Coatings product information for CC-D14, POLANE® 2.8T, plus polyurethane enamel (Oct. 19, 2006).
Sherwin Williams Chemical Coatings product information for CC-D5, POLANE® T, polyurethane enamel (Sep. 2001).
Sherwin Williams Chemical Coatings product information for CC-E14, POLANE® 700T, water reducible enamel (May 2010).
Shirtcliffe et al., "Wetting and wetting transitions on copper-based super-hydrophobic surfaces," *Langmuir*, 21(3):937-943, abstract only (Feb. 1, 2005).
Smith et al., "Modeling of PDMS—Silica Nanocomposites," *NSTI-Nanotech*, 3:115-118 (2004).
*SSW Holding Company, Inc. v. Schott Gemtron Corporation*, Civil Docket, Civil Action No. 3:12-cv-00661-CRS (as of Dec. 6, 2013).
*SSW Holding Company, Inc. v. Schott Gemtron Corporation*, Complaint for Patent Infringement, Demand for Jury Trial, Civil Action No. 3:12-cv-00661-CRS (Oct. 16, 2012).
Su et al., "From Suerhydrophophilic to Superhydrophobic: Controlling Wettability of Hydroxide Zinc Carbonate Film on Zinc Plates," *Langmuir*, abstract only (Feb. 10, 2009; epublication ahead of print).
Synytska et al., "Wetting on Fractal Superhydrophobic Surfaces from 'Core-Shell' Particles: a Comparison of Theory and Experiment," *Langmuir*, abstract only (Feb. 10, 2009; epublication ahead of print).
Torró-Palau et al., "Characterization of polyurethanes containing different silicas," *International Journal of Adhesion and Adhesives*, 21(1):1-9, abstract only (2001).
Two webpages re pigment particle size: http://www.specialchem4coatings.com/tc/color-handbook/index.aspx?id=size and http://www.specialchem4coatings.com/tc/tio2/index.aspx?id=whiteness, SpecialChem, S.A. (printed Jul. 19, 2013).
Venkateswara et al., "Preparation of MTMS based transparent superhydrophobic silica films by sol-gel method," *J Colloid Interface Sci*, 332(2):484-490, abstract only (Apr. 15, 2009; epublished Jan. 14, 2009).
Wang et al., "One-step coating of fluoro-containing silica nanoparticles for universal generation of surface superhydrophobicity," *Chem Commun (Camb)*,7:877-879, abstract only (Feb. 21, 2008; epublished Dec. 18, 2007).
Yang et al., "Influence of surface roughness on superhydrophobicity," *Phys Rev Lett*, 97(11):116103, abstract only (Sep. 15, 2006; epublished September 14, 2006).
Zhang et al., "Application of superhydrophobic edge effects in solving the liquid outflow phenomena," *Langmuir*, 23(6):3230-3235, abstract only (Mar. 13, 2007; epublished Jan. 25, 2007).
Zhou et al., "Study on the morphology and tribological properties of acrylic based polyurethane/fumed silica composite coatings," *Journal of Materials Science*, 39:1593-1594, abstract only (2004).
Prosecution History of U.S. Appl. No. 13/082,327, "Highly Durable Superhydrophobic, Oleophobic and Anti-Icing Coatings and Methods and Compositions for Their Preparation," filed Apr. 7, 2011.
Prosecution History of U.S. Appl. No. 14/320,358, "Highly Durable Superhydrophobic, Oleophobic and Anti-Icing Coatings and Methods and Compositions for Their Preparation," filed Jun. 30, 2014.
Prosecution History of U.S. Appl. No. 14/323,660, "Elastomeric Coatings Having Hydrophobic and/or Oleophobic Properties," filed Jul. 3, 2014.
"Surfactant," found at https://en.wikipedia.org/wiki/Surrfactant, Wikipedia (viewed Dec. 28, 2015).
"Taber® Test Method Reference," found at http://www.taberindustries.com/documents/TaberTestReferencebyMethod.pdf (Jun. 2014, viewed Oct. 6, 2015) (2 pages).
Courbin et al., "Your wetting day," *Physics Today*, 60(2):84 (Feb. 2007).
Extended European search report for European Application No. 12749985.3, dated Apr. 7, 2015.
Extended European search report for European Application No. 12857248.4, dated Apr. 7, 2015.
Kim et al., "A simple fabrication route to a highly transparent superhydrophobic surface with a poly(dimethylsiloxane) coated flexible mold," *Chem Commun(Camb)*, 22:2237-2239, abstract only (Jun. 14, 2007; epublished Mar. 6, 2007).
Kobayashi et al., Surface Tension of Poly[(3,3,4,4,5,5,6,6,6-nonafluorohexyl)-methylsiloxane], *Macromolecules*, 23:4929-4933 (1990).
Kovalchuk et al., "Fluoro- vs hydrocarbon surfactants: Why do they differ in wetting performance?," *Advances in Colloid and Interface Science*, 210:65-71 (available online Apr. 13, 2014).
Kraton® FG1901 G Polymer, Data Document, Identifier K127DDh14U, the Kraton Polymers Group of Companies (Jun. 17, 2014).
Mohammadi et al., "Effect of Surfactants on Wetting of Super-Hydrophobic Surfaces," *Langmuir*, 20:9657-9662 (available online Oct. 2, 2004).
Prosecution History of U.S. Appl. No. 13/082,319, filed Apr. 7, 2011, as downloaded on Jan. 5, 2016.
Prosecution History of U.S. Appl. No. 13/618,779, filed Sep. 14, 2012, as downloaded on Jan. 5, 2016.
Prosecution History of U.S. Appl. No. 13/972,034, filed Aug. 21, 2013, as downloaded on Jan. 5, 2016.
Prosecution History of U.S. Appl. No. 14/305,425, filed Jun. 16, 2014, as downloaded on Jan. 5, 2016.
Prosecution History of U.S. Appl. No. 14/320,315, filed Jun. 30, 2014, as downloaded on Jan. 5, 2016.
International Search Report and Written Opinion for International Application No. PCT/US2011/028541 (published as WO Publication No. 2011/116005), dated May 17, 2011.
Prosecution History of U.S. Appl. No. 14/837,253, filed Aug. 27, 2015.
Extended European search report for European Application No. 13809987.4, dated Feb. 22, 2016.
Shang, et al. Facile fabrication of superhydrophobic surface via SiO2/fluro-containing polymer composite particles, CAPlus Accession No. 2013:1045604, 2 pages (Jul. 5, 2013).

\* cited by examiner

ELASTOMERIC COATINGS HAVING HYDROPHOBIC AND/OR OLEOPHOBIC PROPERTIES

CROSS REFERENCE TO RELATED APPLICATIONS

This application claims the benefit of U.S. Provisional Application No. 61/663,985, filed Jun. 25, 2012; U.S. Provisional Application No. 61/708,760, filed Oct. 2, 2012; and U.S. Provisional Application No. 61/768,290, filed Feb. 22, 2013, the entirety of each of which application is incorporated herein by reference.

BACKGROUND

The surfaces of objects that are exposed to the environment come into contact with a variety of agents, including dust, moisture, water, and oils. In industrial applications, surfaces may be exposed to a variety of agents in addition to water, such as aqueous salt solutions, solutions of aqueous acid or base, and chemical components that may be dissolved or suspended in aqueous compositions or other liquids, including those used in manufacturing processes. Not only are the surfaces of objects exposed to a variety of chemical agents, but the temperatures to which the surfaces are exposed can also affect their interaction with those agents and the performance of the coated surfaces of objects. For example, freezing liquids, such as water, can result in frozen deposits tightly attached to the surfaces that prevent access to the surfaces and in some instances prevent proper operation of equipment bound by the frozen liquid. In addition, elevated temperatures can accelerate processes such as corrosion or leaching.

SUMMARY

Embodiments of coatings and surface treatments are provided herein that can provide advantageous surface properties including, but not limited to, hydrophobicity or superhydrophobicity (collectively HP), oleophobicity or superoleophobicity (collectively OP), and resistance to ice formation, adherence and/or accumulation. Embodiments of the coatings described herein that are HP and OP, and which may also display anti-icing behavior, may be applied to a surface using two or more steps. Embodiments of methods of applying such coatings and surface treatments also are provided, together with embodiments of compositions for applying such coatings and surface treatments, and surfaces and/or objects so treated and coated are provided as well.

DETAILED DESCRIPTION

Figure 1:
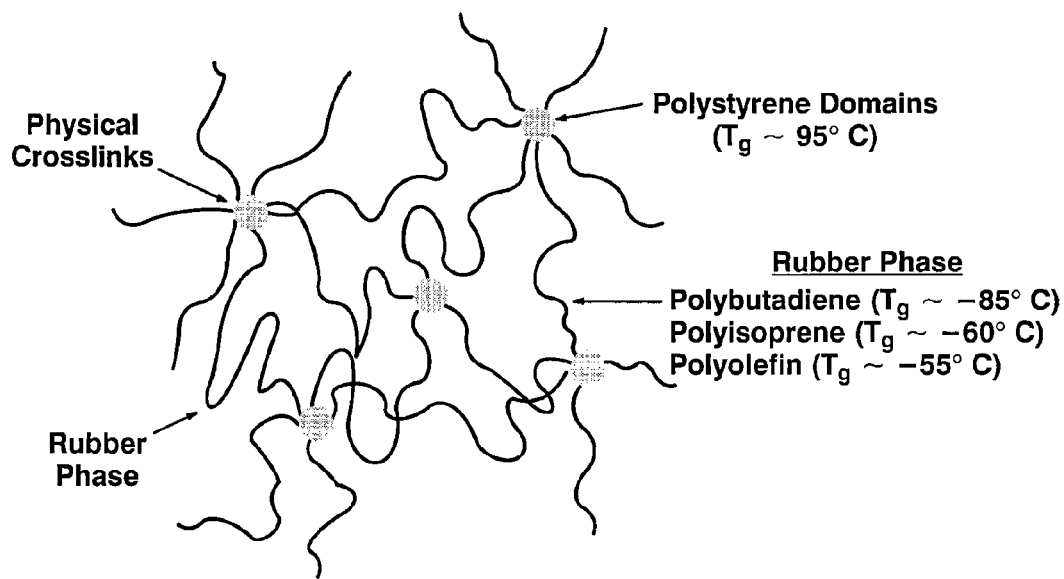
FIG. 1 is a schematic showing an embodiment of a polystyrene and rubber elastomeric copolymer.

Embodiments of elastomeric coating methods, compositions, and treatments are provided that impart a variety of desirable characteristics to objects and their surfaces, including hydrophobicity (including superhydrophobicity), oleophobicity (including superoleophobicity), and/or anti-icing. As used herein, the term "hydrophobicity" and the abbreviation HP includes superhydrophobicity, and the term "oleophobicity" and the abbreviation OP includes superoleophobicity. The abbreviation "HP/OP" is used collectively herein to mean HP and/or OP and may also include anti-icing properties (including ice formation, adherence and/or accumulation). Treating surfaces with coatings having HP/OP characteristics can result in objects and surfaces with a variety of advantageous properties including, but not limited to, resistance to wetting, corrosion, swelling, rotting, cracking or warping, exfoliation, fouling, dust and/or dirt accumulation on surfaces (self cleaning), and resistance to surface ice formation, adherence and/or accumulation. Not only do embodiments of the coating compositions and treatments described herein provide properties including HP/OP, but the coatings also are durable in that they substantially retain those properties despite some amount of mechanical abrasion. In addition to providing durable HP/OP behavior, embodiments of the elastomeric coatings can also remain flexible and provide substantial resistance to cracking, peeling, and delamination from the coated surface over a wide range of temperatures. Further, embodiments of the coatings can readily be repaired where the surface has been abraded sufficiently to compromise the coating's properties including HP/OP behavior.

Embodiments of the HP/OP elastomeric coatings described herein may be applied in a process comprising two or more steps in which the first component applied comprises an elastomeric binding agent and optionally comprises first particles. Once applied, the coating formed by the first component is termed a "substrate coating," a "base coating," or a "base coat" particularly when dried. Following the application of the elastomer base coat, an amount of second component is applied to the base coat. The second component comprises second particles that are treated to cause the second particles, and the coatings into which they are suitably incorporated, to display advantageous properties including HP/OP and/or anti-icing behavior. The second component may be applied to an elastomeric base coat after the base coat is applied, but before it is dried and/or set. Alternatively, depending on the carrier/solvent used with the second component, the second component may be applied to the elastomer after the base coat is dried and/or set.

The use of second component coating compositions comprising solvents that can be applied to the elastomeric base coat after it has dried and set permits repair of coatings that have been abraded or otherwise damaged to the point where the desired HP/OP properties is/are no longer observed. Provided the base coat is intact, or the base coat has not been damaged to the point that material underlying the base coat is exposed, repair is accomplished by the reapplication of the second component which comprises second particles.

Where the HP/OP elastomeric coatings have been abraded so as to compromise the elastomer binder coating or its properties (e.g., abraded, worn too thin, or damaged to the point where the surface of the coated object or underlying material such as a primer is exposed), the coating may be reapplied to the abraded area (i.e., it may be repaired) by repeating the application of both the first and second components. Suitable repair/preparation of exposed/damaged surfaces and/or underlying primers may be required prior to the reapplication of the elastomeric coating. In contrast, other HP or OP coatings using non-elastomeric binder systems (e.g., polyurethane systems) may not be as readily repaired because the HP/OP behavior of the original coating that remains in place can prevent newly applied coating compositions from binding to the surface.

In one embodiment, a method of applying a HP/OP coating to a substrate comprises the steps of:
  a) applying to the substrate a first component comprising:
    i) an elastomeric binder comprising one or more styrenic block copolymers, and optionally comprising ii) first particles having a size of about 1 micron to about 300 microns (e.g., 10 microns to about 100 microns), to provide a base coating; and
  b) applying to the base coating a second component comprising second particles having a size of about 1 nanometer to 25 microns, where the second particles are associated with one or more siloxanes and/or have one or more independently selected alkyl, haloalkyl, or perfluoroalkyl groups covalently bound, either directly or indirectly, to the second particles, and wherein the second component optionally comprises an agent to suspend or assist in suspending the particles (e.g., a solvent such as hexane or tert-butyl acetate).

To assist in the application process, embodiments of the first and second components may include any necessary solvents, liquids or propellants.

In some embodiments of the application method, the base coating is treated with the second component after drying and curing the base coating at room temperature (e.g., about 18 to about 23° C.) or at an elevated temperature (e.g., about 30° to about 100° C., about 30° to about 60° C., about 50° to about 100° C., or about 40° to about 90° C.). In other embodiments, the solvent used to apply the base coat is allowed to evaporate until the coating is no longer liquid and cannot be removed by contact (i.e., dry to the touch); however, the base coating is not fully dried and cured when treated with the second component containing second particles. In still other embodiments, the composition comprising second particles may be applied directly to the base coat before solvents used in the application of the base coating have fully, substantially, or partly evaporated.

Diverse elastomeric binders, first particles, and second particles may be employed in the methods and compositions described herein. In some embodiments, first particles may be filler particles. In some embodiments second particles may be considered nanoparticles. In some embodiments described herein, the coating formed by the application of the first and second components will be nearly transparent to visible light. In other embodiments, the coatings may be colored but nearly transparent to visible light that is not absorbed by the coating components and/or colorants. In still other embodiments, the coatings will have colorants (e.g., insoluble pigments or colored first and/or second particles) that will render them opaque or block the transmission of light. Embodiments of such coating components, materials, and compositions are described more fully below.

A skilled artisan will readily understand that the selection of first particles and second particles needs to include consideration of not only the desired properties of the coating and the ultimate conditions to which the coating will be subject in use, but also the process used to prepare the coating. Where, for example, particles must withstand elevated temperatures or specific solvents in the coating process, they should be selected so as to be suitable for use in the required temperature ranges or in the required solvents. For example, in those embodiments where coatings or the first and/or second particles are intended for use at elevated temperatures (e.g., above room temperature), the particles need to be compatible with the elevated temperatures that the coatings will be subjected to when in use and/or in processes employed to prepare the coatings. Similarly, the particles should be selected to be compatible with solvents used in the application process and with solvents the coatings will become exposed to in use.

In methods described herein, where second particles are applied to a base coat on a substrate, which may be coated with a primer, the methods can produce coatings having (i) a surface in contact with said substrate (or primer) and (ii) an exposed surface that is not in contact with the substrate (or primer) where these surfaces bear different amounts of first particles, second particles, or both first and second particles. In some embodiments the exposed surface can have a greater amount of first and/or second particles on, at, or adjacent to the exposed surface, compared to the amount of first and/or second particles at or adjacent to the surface of the coating that is in contact with the substrate (or primer). In one embodiment the coatings have a greater amount of second particles on, at, or adjacent to the exposed surface than the surface of the coating that is in contact with the substrate (or primer). In embodiments where a greater amount of first and/or second particles may be present at the exposed surface, the coatings may be considered composite coatings.

The amount of particles in any portion of a coating may be assessed by any means known in the art including, but not limited to, microscopy or electron microscopy. Using those techniques on cross or oblique sections of coatings, the amount (e.g., the number) of particles can be determined. In addition, where it is possible to remove coatings, or where the substrate permits (e.g., it is transparent), the surfaces can be examined directly using microscopy or electron microscopy to determine the amount of particles present at the exposed surface or adjacent to the substrate.

Embodiments of the coatings described herein are durable in that they can withstand some amount of abrasion without a substantial loss of HP/OP properties. To provide an endpoint for the loss of superhydrophobic (SH) behavior as a result of abrasion testing, substantially planar abraded surfaces are tested for their propensity to shed water droplets at an indicated angle of incline (5 degrees unless indicated otherwise). Typically, twenty droplets are placed on the surface to be assessed, which is inclined at the desired angle. The end of SH behavior is indicated when more than half (ten or more drops) stay in place. While such measurements provide a consistent endpoint, a skilled artisan will understand that, even when the endpoint is reached, the abraded surfaces may still be quite hydrophobic, e.g., having water contact angles greater than 130° or 140° in many instances.

Resistance to abrasion may be measured using any method known in the art including, but not limited to, mechanized or manual assessment with a Taber abrasion-testing instrument (e.g., a Taber "Abraser") or a Crockmeter. Alternatively, a manual measure used to assess the durability of surfaces is a glove rub (GR) test. Each of those tests is described in more detail below.

For the purpose of this application, wherever Taber testing results are recited, the tests are conducted on a Taber Model 503 instrument using CS-0 or CS10 wheels with 250 g or 1,000 g loads as indicated. Unless indicated otherwise, a load of 1,000 g was employed, and tests were conducted at room temperature at a speed of 95 rpm.

Where resistance to the loss of HP is measured with a Crockmeter, a motorized American Association of Textile Chemists and Colorists (AATCC) CM-5 Crockmeter is employed. The finger of the Crockmeter is fitted with a 14/20 white rubber septum having an outside diameter of 13 mm and an inside diameter of 7 mm with a contact surface area of 94 mm² (Ace Glass, Inc., Vineland, N.J., Catalog No. 9096-244). The septum is brought into contact with the coating with a force of 9N (Newtons). The end of superhydrophobic behavior is judged by the failure of more than half of the water droplets applied to the tested surface (typically 20 droplets) to run (roll) off when the surface is inclined at 5 degrees from horizontal. Abrasion resistance may also be measured using a manually operated AATCC Crockmeter.

Although an absolute correlation between Taber Abraser Testing, Crockmeter testing, and glove-rub testing is not provided, the manual glove-rub test is useful as an indication of the durability of the coated surface and its ability to be handled. Coatings applied to primed surfaces incorporating rigid particles (e.g., EXTENDO SPHERES) typically give a ratio of about 4.5 glove rubs/Taber Abraser cycles (250 g load) with CS-0 wheels and a ratio of about 7.5 glove rubs/Taber cycles with CS-10 wheels. Coatings incorporating flexible first particles (e.g., black rubber particles) typically give a ratio of about 7.6 glove rubs/Taber Abraser cycles (250 g load) with CS-0 wheels and a ratio of about 12.9 with CS-10 wheels. Results are given below for coatings of several thicknesses, where the thickness measurement includes the thickness of the primer layer. The number of strokes observed in Crockmeter testing is generally about one fourth of the number of "glove rubs" observed in the manual glove rub testing. Nearly Transparent Coating with Clear Hollow Rigid Thermoplastic First Particles

| | | CS-0 Wheel | | | CS-10 Wheel | |
|---|---|---|---|---|---|---|
| Approximate Glove Rubs to loss of SH | Thickness (mils) | Taber Cycles | Ratio GR/ Taber cycle | Thickness (mils) | Taber Cycles | Ratio GR/ Taber cycle |
| 500 | 1.1 | 130 | 3.8 | 1 | 60 | 8.3 |
| 500 | 2.1 | 100 | 5.0 | 2 | 70 | 7.1 |
| 500 | 3.5 | 110 | 4.5 | 3.5 | 60 | 8.3 |
| 500 | 4 | 110 | 4.5 | 4.5 | 80 | 6.3 |

Nontransparent Coating with Flexible Black Rubber First Particles

| | | CS-0 Wheel | | | CS-10 Wheel | |
|---|---|---|---|---|---|---|
| Approximate Glove Rubs to loss of SH | Thickness (mils) | Taber Cycles | Ratio GR/ Taber cycle | Thickness (mils) | Taber cycles | Ratio GR/ Taber cycle |
| 700 | 2.7 | 100 | 7.0 | 2.6 | 60 | 11.7 |
| 700 | 4.9 | 90 | 7.8 | 4.8 | 50 | 14 |
| 700 | 7.5 | 90 | 7.8 | 7.2 | 50 | 14 |
| 700 | 9.5 | 90 | 7.8 | 8.5 | 60 | 11.7 |

In addition to resisting the loss of HP/OP properties from abrasion, the compositions provided herein also provide durability in the form of resistance to other conditions. The coatings also resist loss of those properties when subject to:

Submersion in water (the duration a coating resists wetting at different depths in water);

Flowing water (the ability of a coating or surface treatment to resist the impact of flowing water such as a shower of water);

Exposure to liquids other than water (chemical durability and resistance to acids, alkalis, salts, and certain organic solvents such as alcohols);

Ultraviolet (UV) radiation;

Boiling water; and

Salt water, in the form of immersion, spray, or fog.

The elastomer-based coatings described herein have a variety of properties in addition to resisting the loss of HP/OP from abrasion including, but not limited to, resisting ice formation and/or adherence on the coating and flexibility over a wide range of temperatures (e.g., −35° C. to 205° C.).

In one embodiment, the HP/OP elastomeric coatings comprising plastic, glass or rubber first particles (e.g., EXPANCEL spheres or micronized rubber) have a relative electrical permittivity at 100 MHz from about 0.2 to about 4 at about 22° C. (e.g., a permittivity from about 0.2 to about 1, from about 1 to about 2, from about 2 to about 3, or from about 3 to about 4) as measured by ASTM D150 using a single 0.11 mm thick film, or three layers of 0.11 mm film to achieve a 0.33 mm thickness.

In addition to their other properties, the HP/OP coatings described herein can be described by their characteristic roughness that may be measured by any means known in the art. In some embodiments, the surface roughness is measured using a Mahr Pocket Surf PS1 (Mahr Federal Inc., Providence, R.I.). The roughness of a surface can be expressed using a variety of mathematical expressions including, but not limited to, its Arithmetical Mean Roughness and its Ten-Point Mean Roughness.

The coatings resulting from the application of the compositions provided for herein have in some embodiments a surface with an arithmetical mean roughness in a range selected from: greater than about 3 microns to about 4 microns; from about 4 microns to about 6 microns; from about 4 microns to about 8 microns; from about 4 microns to about 12 microns; from about 4 microns to about 20 microns; from about 5 microns to about 10 microns; from about 5 microns to about 12 microns; from about 5 microns to about 20 microns; from about 6 microns to about 10 microns; or from about 6 microns to about 14 microns.

In other embodiments, the coatings, resulting from the application of the compositions provided for herein, have in some embodiments a surface with a ten point mean roughness selected from: from about 7 microns to about 60 microns; from about 7 microns to about 70 microns; from about 7 microns to about 80 microns; from about 7 microns to about 100 microns; from about 8 microns to about 60 microns; from about 8 microns to about 80 microns; from about 8 microns to about 100 microns; from about 12 microns to about 60 microns; from about 12 microns to about 100 microns; from about 15 microns to about 60 microns; or from about 15 microns to about 100 microns.

A more complete discussion of the coating compositions, their methods of preparation and application, and their properties follows. A skilled artisan will understand that the description and examples set forth herein are provided as guidance, and are not limiting to the scope of the methods and compositions described herein.

1.0 Definitions

For the purposes of this disclosure, a HP material or surface is one that results in a water droplet forming a surface contact angle exceeding about 90° at room temperature (which is about 18° C. to about 23° C. for purposes of this disclosure). Similarly, for the purposes of this disclosure, a SH material or surface is one that results in a water droplet forming a surface contact angle exceeding 150° but less than the theoretical maximum contact angle of 180° at room temperature. As SH surface behavior encompasses water contact angles from about 150° to about 180°, SH behavior is considered to include what is sometimes referred to as "ultrahydrophobic" behavior. For the purpose of this disclosure the term hydrophobic (HP) shall include superhydrophobic (SH) behavior unless stated otherwise, and any and all embodiments, claims, and aspects of this disclosure reciting hydrophobic behavior may be limited to either hydrophobic behavior that is not superhydrophobic (contact angles from 90°-150°) or superhydrophobic behavior (contact angles of 150° or greater).

For the purposes of this disclosure an OP material or surface is one that results in a droplet of light mineral oil forming a surface contact angle exceeding about 90°. Similarly, for the purposes of this disclosure a SOP material or surface is one that results in a droplet of light mineral oil forming a surface contact angle exceeding 150° but less than the theoretical maximum contact angle of 180° at room temperature. For the purpose of this disclosure the term oleophobic (OP) shall include superoleophobic (SOP) behavior unless stated otherwise, and any and all embodiments, claims, and aspects of this disclosure reciting oleophobic behavior may be limited to either oleophobic behavior that is not superoleophobic (contact angles from) 90°-150° or superoleophobic behavior (contact angles of 150° or greater).

Anti-icing (AI) surfaces are surfaces that are resistant to ice formation and/or accretion in dynamic testing, or that prevent ice that forms from adhering to the surface (i.e., ice that forms can be removed with less force than from untreated metal surfaces).

For the purpose of this disclosure, HP/OP denotes hydrophobic behavior (including superhydrophobic behavior) or properties and/or oleophobic (including superoleophobic behavior) behavior or properties. HP/OP behavior may be understood to include anti-icing properties and any embodiment recited as having HP/OP behavior may be recited as having anti-icing properties, unless stated otherwise in this disclosure.

Durability, unless stated otherwise, refers to the resistance to loss of superhydrophobic or superoleophobic properties due to mechanical abrasion.

Alkyl as used herein denotes a linear or branched alkyl radical or group. Alkyl groups may be independently selected from $C_1$ to $C_{20}$ alkyl, $C_2$ to $C_{20}$ alkyl, $C_4$ to $C_{20}$ alkyl, $C_6$ to $C_{18}$ alkyl, $C_6$ to $C_{16}$ alkyl, or $C_6$ to $C_{20}$ alkyl. Unless otherwise indicated, alkyl does not include cycloalkyl.

Cycloalkyl as used herein denotes a cyclic alkyl radical or group. Cycloalkyl groups may be independently selected from: $C_4$ to $C_{20}$ alkyl comprising one, two, or more $C_4$ to $C_8$ cycloalkyl functionalities; $C_6$ to $C_{20}$ alkyl comprising one, two, or more $C_4$ to $C_8$ cycloalkyl functionalities; $C_6$ to $C_{20}$ alkyl comprising one, two, or more $C_4$ to $C_8$ cycloalkyl functionalities; $C_5$ to $C_{18}$ alkyl comprising one, two, or more $C_4$ to $C_8$ cycloalkyl functionalities; $C_6$ to $C_{18}$ alkyl comprising one, two, or more $C_4$ to $C_8$ cycloalkyl functionalities; or $C_6$ to $C_{16}$ alkyl comprising one, two or more $C_4$ to $C_8$ cycloalkyl functionalities. Where two or more cycloalkyl groups are present they may be present as fused rings or in a spiro configuration. One or more hydrogen atoms of the cycloalkyl groups may be replaced by fluorine atoms.

Haloalkyl as used herein denotes an alkyl group in which some or all of the hydrogen atoms present in an alkyl group have been replaced by halogen atoms. Halogen atoms may be limited to chlorine or fluorine atoms in haloalkyl groups.

Fluoroalkyl as used herein denotes an alkyl group in which some or all of the hydrogen atoms present in an alkyl group have been replaced by fluorine atoms.

Perfluoroalkyl as used herein denotes an alkyl group in which fluorine atoms have been substituted for each hydrogen atom present in the alkyl group.

Rubber phase as used herein denotes a portion of styrene block copolymers having synthetic rubber attributes. In SBCs rubber phases are typically flanked or joined by polystyrene units that may function as end blocks. Typical synthetic rubbers include an isoprenoid or a polyolefin such as polybutadiene, polyisoprene, or ethylene/butylene.

For the purpose of this disclosure, unless stated otherwise, when content is indicated as being present on a "weight basis," the content is measured as the percentage of the weight of the components indicated to the total weight of the composition (including recited/required solvents). Optional solvents are not included in the weight of the composition.

"Colorant" as used herein is a material added to the coating composition to cause a change in color, i.e., become colored. Colorants can be dyes which bind at least a portion of the material to be colored, insoluble pigments that are dispersed in at least a portion of the material to be colored, colored chemicals that are dispersed or dissolved in at least a portion of the material to be colored, or inks, which may be any combination of dyes, pigments and colored chemicals. In some embodiments, first or second particles may comprise colorants or may be prepared from materials that are colored.

2.0 Elastomeric Binders

Elastomers are polymers that are elastic (i.e., have viscoelasticity), and which generally have a low Young's modulus and high yield strain compared with other materials. Elastomers may be thermoset materials, which require vulcanization (e.g., covalent crosslinking) during curing, or thermoplastic materials (thermoplastic elastomers), in which the crosslinks are weaker dipole or hydrogen bonds.

Figure 2:
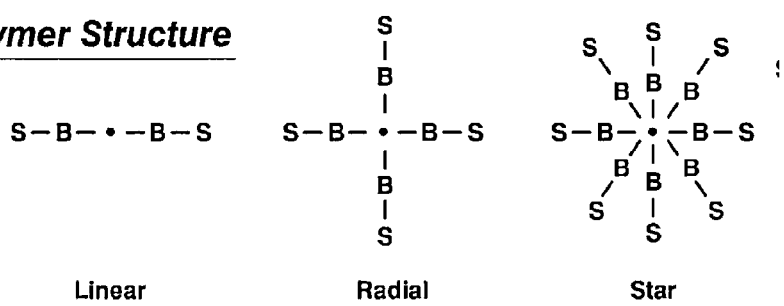
FIG. 2 is a schematic showing various spatial orientations of embodiments of polystyrene and rubber copolymers. S is styrene and B is a rubber phase (i.e. butylene).

Elastomeric binder systems employed to make elastomeric coatings (elastomer based coatings) having HP/OP properties are typically comprised of copolymers of polystyrene and a rubber (a rubber phase) known as Styrenic Block Copolymers (SBCs). SBCs are a class of thermoplastic elastomers consisting of a two-phase structure of hard polystyrene end blocks and soft rubber midblocks. The polystyrene end blocks associate to form domains that lock the molecules into place without vulcanization. Since this is a reversible process, the material can be processed on conventional thermoplastic equipment or dissolved in a suitable solvent for application as a coating. Polystyrene end blocks impart strength and the rubber phase midblocks impart elasticity. FIG. 1 shows a schematic of a typical SBC copolymer, where the rubber phase is linked to the polystyrene phase. In SBCs the rubber phase can be a synthetic rubber such as, for example, ethylene/butylene (EB e.g., —[$CH_2CH_2CH_2CH_2CH(CH_2CH_3)CH_2$]$_n$—) ethylene/propylene (EP, e.g., —[$CH_2CH_2CH(CH_3)CH_2$]$_n$—), polybutadiene, polyisoprene, or polyolefin (see FIG. 1). FIG. 2 shows that the copolymers can have various spatial orientations such as linear, radial, or star like.

SBC compositions, when used as a base coating, produce highly durable HP/OP coatings as measured by a variety of different methods, including those described herein. Moreover, the coatings are compatible with and adhere tightly to a broad range of materials, permitting a large number and type of objects and substrates to be coated.

SBC elastomers offer a variety of advantages and properties for the preparation of base coats used to prepare HP/OP coatings. As they can be dissolved/suspended in a number of solvents, they may be formulated into compositions that are amenable to application using standard equipment including conventional spray guns and aerosol canisters (e.g., an aerosol spray container comprises a valve assembly, a dip tube, and an actuator). As a base coating composition for use in a multi-step (e.g., two-step, three-step, four-step . . . ) HP/OP coating process, SBC elastomer formulations offer flexibility during application and in the application of the second component of the HP/OP coating process. The elastomeric first component can be applied to form a base coating and the second component, which comprises second particles whose application renders the coating HP/OP, can be applied to the base coating when it is wet, tacky, dry to touch, or even completely dried and cured.

A variety of SBCs may be employed to prepare the HP/OP coatings described herein. In an embodiment the SBC-containing binder compositions comprise a rubber phase comprising ethylene/butylene (EB e.g., —[$CH_2CH_2CH_2CH_2CH(CH_2CH_3)CH_2$]$_n$—). In another embodiment, the SBC-containing binder compositions comprise a rubber phase comprising (poly)butadiene (e.g., styrene-butadiene-styrene (SBS) elastomeric polymers. In other embodiments, the rubber phases of suitable SBC polymer compositions comprise ethylene/propylene (EP e.g., —[$CH_2CH_2CH(CH_3)CH_2$]$_n$—), polybutadiene, polyisoprene or polyolefin. In another embodiment, binder compositions used for the preparation of durable HP/OP coatings comprise a mixture of any two, three, or four SBC elastomers having rubber phases comprising: ethylene/butylene butadiene, ethylene/propylene polybutadiene, polyisoprene or polyolefin.

Elastomeric coatings with an elongation at break that is greater than about 500%, 600%, 700%, 750%, or about 800% are generally desirable as binders for preparing the durable HP/OP coatings (e.g., coatings prepared with "Kraton G" elastomers), although elastomeric coating compositions with lower elongation at break values can be employed. The rubber component in the SBC copolymers of such elastomer compositions typically varies from about 69% to about 87%, but the rubber component may be about 65% to about 90%, about 67% to about 75%, about 75% to about 87%, or about 70% to about 80% (based on the weight of the SBC copolymer(s)). Among the commercially available SBC elastomer compositions that can be employed as binders for the HP/OP coating compositions described herein are those developed by KRATON® Polymers U.S. LLC. (Houston, Tex.). Various elastomeric polymers, compositions, and their properties are described, for example, in the KRATON® Polymers' Fact Sheet K0151 Americas available on the world wide web at: docs.kraton.com/kraton/attachments/downloads/82021AM.pdf.

In one embodiment the elastomers employed as binders may be ethylene butylene (EB) elastomeric polymers which have styrene domains (endblocks) and ethylene/butylene rubber phase midblocks. Such EB elastomers may comprise about 65% to 75% rubber phase midblocks, (e.g., about 65%, about 70% or about 75% rubber phase midblocks) and have an elongation at break of 500 to 800% using ASTM D412 on films cast from toluene solution with the grip separation speed set at 10 inches per minute. Some properties of KRATON® EB elastomers are detailed in Table 1.

In one embodiment the elastomers employed as binders may be styrene-butadiene-styrene (SBS) elastomeric polymers. Such SBS elastomers comprise about 60% to 74% butadiene by weight, and have an elongation at break of from 800 to 900% using ASTM D412 on films cast from toluene solution with the grip separation speed set at 10 inches per minute. Some properties of KRATON® styrene-butadiene-styrene (SBS) elastomeric polymers (KRATON® D SBS) are detailed in Table 2.

TABLE 1

| | EB Based Polymers* | | | | | | | |
|---|---|---|---|---|---|---|---|---|
| Property | G1633 (SEBS) Linear | G1650 (SEBS) Linear | G1651 (SEBS) Linear | G1652 (SEBS) Linear | G1654 (SEBS) Linear | G1657 (SEBS) Linear | G1660 (SEBS) Linear | G1726 (SEBS) Linear |
| Tensile Strength, MPa[1,2] | — | 35 | >28 | 31 | >28 | 23 | 32 | 2 |
| 300% Modulus MPa[1,2] | — | 5.6 | — | 4.8 | | 2.4 | 5.5 | — |
| Elongation at Break, %[1,2] | — | 500 | >800 | 500 | 800 | 750 | 800 | 200 |
| | — | 70 | 70 | 70 | 70 | 47 | 68 | 70 |

TABLE 1-continued

| | EB Based Polymers* | | | | | | | |
|---|---|---|---|---|---|---|---|---|
| Property | G1633 (SEBS) Linear | G1650 (SEBS) Linear | G1651 (SEBS) Linear | G1652 (SEBS) Linear | G1654 (SEBS) Linear | G1657 (SEBS) Linear | G1660 (SEBS) Linear | G1726 (SEBS) Linear |
| Specific Gravity | 0.91 | 0.91 | 0.91 | 0.91 | 0.91 | 0.89 | 0.91 | 0.91 |
| Brookfield Viscosity, cps at 25° C. | | | | | | | | |
| 25% w4 | — | 8,000 | >50,000 | 1,800 | >50,000 | 4,200 | 8,000 | 200 |
| 10% w4 | — | 50 | 1,800 | 30 | 410 | 65 | 50 | 10 |
| —Melt Index g/10 min. (5 kg) 200° C. | <1 | <1 | <1 | <1 | <1 | <8 | <1 | 65 |
| 230° C. | <1 | <1 | <1 | 5 | <1 | 22 | <1 | <100 |
| Styrene/Rubber Ratio | 30/70 | 30/70 | 30/70 | 30/70 | 33/67 | 13/87 | 31/69 | 30/70 |
| Physical Form | Fluffy Crumb | Powder/ Fluffy Crumb | Powder/ Fluffy Crumb | Powder/ Fluffy Crumb | Powder/ Fluffy Crumb | Dense Pellet | Powder | Dense Pellet |
| Diblock, % | — | <1 | <1 | <1 | <1 | 29 | — | 70 |
| Comments | FDA | FDA | FDA | FDA | FDA | FDA | FDA | FDA |

*polymers recited in this table supplied by KRATON ®
[1]ASTM method D412 tensile tester grip separation speed 10 in./min.
[2]Typical properties determined on film cast from toluene solution.
(3) Typical values on polymer compression molded at 177° C.
(4) Neat Polymer concentration in toluene

TABLE 2

| | SBS Elastomeric Polymers* | | | | | | | |
|---|---|---|---|---|---|---|---|---|
| Property | D0243 (SBS) Di-block | D1101 (SBS) Linear | D1102 (SBS) Linear | D1116 (SBS) Radial | D1118 (SBS) Diblock | D1133 (SBS) Linear | D1152 (SBS) Linear | D1153 (SBS) Linear |
| Tensile Strength, MPa[1,2] | 2 | 32 | 32 | 32 | 2 | 21 | 32 | 28 |
| 300% Modulus, MPa[1,2] | 1.0 | 2.8 | 2.8 | 2.4 | 1.2 | 2.1 | 2.8 | 2.9 |
| Elongation at Break, %[1,2] | — | 880 | 880 | 900 | 600 | 800 | 900 | 800 |
| Set at Break, %[1,2] | — | 10 | 10 | 10 | 40 | 20 | 10 | — |
| Hardness, Shore A (10 sec.)[3] | 70 | 69 | 66 | 63 | 64 | 74 | 66 | 70 |
| Specific Gravity | 0.94 | 0.94 | 0.94 | 0.94 | 0.94 | 0.94 | 0.94 | 0.96 |
| Brookfield Viscosity, cps at 25° C. (25% w) | 315 | 4,000 | 1,100 | 9,000 | 630 | 4,800 | 1,000 | 1,650 |
| Brookfield Viscosity, cps at 25° C. (15% w) | — | — | — | 2,500 | — | 420 | — | — |
| Melt Index g/10 min. (200° C./5 kg) | 20 | <1 | 14 | <1 | 10 | <1 | 8 | 3 |
| Styrene/Rubber Ratio | 33/67 | 31/69 | 28/72 | 23/77 | 33/67 | 36/64 | | 29/71 |
| Physical Form | Porous Pellet | Porous Pellet Powder | Porous Pellet | Porous Pellet Powder | Porous Pellet Powder | Porous Pellet Powder | Porous Pellet | Porous Pellet |
| Diblock, % | 75 | 16 | 17 | 16 | 78 | 34 | 15 | <1 |

| Property | D1155 (SBS) Linear | D1184 (SBS) Radial | D1186 (SBS) Radial | D1189 (SBS) Radial | D1191 (SBS) Radial | D1192 (SBS) Linear | DX405 (SBS) Linear |
|---|---|---|---|---|---|---|---|
| Tensile Strength, MPa[1,2] | 28 | 28 | 25 | — | — | — | — |
| 300% Modulus, MPa[1,2] | 2.9 | 5.5 | 3 | — | — | — | — |
| Elongation at Break, %[1,2] | 800 | 820 | 800 | — | — | — | — |

TABLE 2-continued

| | SBS Elastomeric Polymers* | | | | | | |
|---|---|---|---|---|---|---|---|
| Set at Break, %[1,2] | — | 10 | 10 | — | — | — | — |
| Hardness, Shore A (10 sec.)[3] | 87 | 68 | 74 | 68 | 68 | 66 | 53 |
| Specific Gravity | 0.94 | 0.94 | 0.94 | 0.94 | 0.94 | 0.94 | 0.94 |
| Brookfield Viscosity, cps at 25° C. (25% w) | 600 | >20,000 | — | TBD[5] | >20,000 | 1,500 v | |
| Brookfield Viscosity, cps at 25° C. (15% w) | — | 1,100 | 1,200 | TBD | 1,100 | — | 2,000 |
| Melt Index g/10 min. (200° C./5 kg) | 14 | <1 | <1 | <1 | <1 | <1 | 3 |
| Styrene/Rubber Ratio | 40/60 | 31/69 | 30/70 | 31/69 | 33/69 | 30/70 | 24/76 |
| Physical Form | Porous Pellet | Porous Pellet Powder | Porous Pellet Powder | Porous Pellet Powder | Porous Pellet Powder | Porous Pellet Powder | Porous Pellet |
| Diblock, % | <1 | 16 | 10 | 16 | 18 | <1 | <1 |

*polymers recited in this table supplied by KRATON ®
[1]ASTM method D412 grip separation speed 10 in./min.
[2]Typical properties determined on film cast from toluene solution
[3]Typical values on polymer compression molded at 177° C.
[4]Neat polymer concentration in toluene
[5]TBD—To Be Determined In another embodiment the elastomers employed as binders may be maleated styrene-ethylene/butylene-styrene (SEBS) elastomeric polymers. Such maleated SEBS elastomers comprise about 65% to about 90% (e.g., about 70% or about 87%) rubber midblocks by weight, and have an elongation at break of 500 to 750% using ASTM D412 on films cast from toluene solution with the grip separation speed set at 10 inches per minute. Maleated SEBS polymers typically have from about 0.8% to about 2.2% (e.g., 0.9% to 2.1% or 1% to 1.7%) of substitution. Some properties of KRATON® styrene-ethylene/butylene-styrene (SEBS) elastomeric polymers (KRATON® FG Polymers) are detailed in Table 3.

TABLE 3

| | Maleated SEBS Polymers FG Polymer Grades* | |
|---|---|---|
| Property | FG1901 (SEBS) Linear | FG1924 (SEBS) Linear |
| Tensile Strength, MPa[1] | 34 | 23 |
| 300% Modulus, MPa[1] | — | — |
| Elongation at Break, %[1] | 500 | 750 |
| Hardness, Shore A (10 sec)[2] | 71 | 49 |
| Specific Gravity | 0.91 | 0.89 |
| Brookfield Viscosity, 25% w (toluene solutions) cps at 25° C. | 5,000 | 19,000 |
| 10% w | 110 | 270 |
| Melt Index g/10 min (5 kg) | | |
| 200° C. | 5 | 11 |
| 230° C. | 22 | 40 |
| Styrene/Rubber Ratio | 30/70 | 13/87 |
| Physical Form | Dense Pellet | Dense Pellet |
| Comments | FDA[3] 1.7% bound functionality | 1.0% bound functionality |

*polymers recited in this table supplied by KRATON ®
[1]ASTM method D412-tensile tester grip separation speed 10 in./min.
[2]Typical values on polymer compression molded at 177° C.

In one embodiment the elastomeric binder comprises triblock copolymers of styrene and ethylene/butylene with a polystyrene content of: about 8% to about 14%, about 12% to about 20%, about 18% to about 28%, about 22% to about 32%, about 26% to about 36%, about 8%, about 9%, about 10%, about 11%, about 12%, about 13%, about 14%, about 16%, about 18%, about 19%, about 20%, about 22%, about 24%, about 26%, about 28%, about 30%, about 32%, about 34%, about 36% or mixtures of any two or more, three or more, or four or more of such triblock copolymers. Any one or more of such triblock copolymers may optionally comprise 1% to 3%, 1.4% to 2.0%, 1% to 1.4%, 1.6% to 3%, or 2% to 3% of bound maleic anhydride (maleated copolymers) and may be linear triblock copolymers. In one such embodiment the binder comprises two different maleated triblock copolymers of styrene and ethylene/butylene with a polystyrene: a first triblock copolymer of styrene and ethylene/butylene with a polystyrene having 0.4% to 1.6% (e.g., 0.5% to 1.5%, 0.6% to 1.4,% or 0.7% to 1.3%) substitution by maleic anhydride by weight of the first triblock copolymer (and optionally less than 0.3% maleic anhydride free); and a second triblock copolymer of styrene and ethylene/butylene with a polystyrene having 1.1% to 2.5% (e.g., 1.3 to 2.3 or 1.4 to 2.4%) substitution by maleic anhydride by weight of the second triblock copolymer. In such an embodiment the first and/or second triblock copolymers may be linear or branched copolymers (e.g., arborols or dendrimers), and the second triblock copolymers may be present in a weight ratio from about 4:1 to about 6.5:1 (e.g., the first copolymer to second copolymer ratio is about 4:1 to about 5.5:1, about 5:1 to about 6:1, or about 5.5:1 to about 6.5:1).

Persons skilled in the art will also recognize other elastomeric binders that may be used in place of or in addition to the elastomeric binders described in this disclosure.

In addition to comprising elastomeric polymers (e.g., SBCs), first particles and solvents, elastomeric binder systems that serve as first components optionally comprise a tackifier. Tackifiers may be present in any suitable amount, including in a range selected from about or from about 0.5% to about 30%; 1% to about 5%, from about 2% to about 8%, from about 3% to about 7%, from about 5% to about 10%, from about 10% to about 15%, from about 15% to about 20%, from about 20% to about 25%, or from about 25% to about 30%. Some suitable tackifiers, including totally synthetic (e.g., members of the Regalrez® family from Eastman Chemical) or modified resins or rosins are set forth in the section describing primers that follows.

First components, and primers discussed below, may further comprise light stabilizers and UV absorbers (UV stabilizers), fire retardants, and/or antioxidants. For example, Tinuvin® light stabilizing products (e.g., Tinuvin 328 and/or Tinuvin 770DF) produced by BASF®, and/or IRGANOX® antioxidant products (e.g., phenolic or hindered phenolic antioxidants such as IRGANOX® 1520 or IRGANOX® 150L) produced by BASF® may be included in the first component binder composition used to set down the base coat or in a primer. Where light/UV stabilizers, UV absorbers, fire retardants, and/or antioxidants are added to either or both of the first component or the primer, they are generally added in an amount less than 2% by weight (e.g., about 1%, 0.75%, 0.5%, 0.4%, 0.3%, 0.2% 0.1%, 0.075%, 0.06%, or 0.05%, or in a range selected from about 0.01% to about 2%, from about 0.05% to about 1.0%, or from about 0.75% to about 0.5% by weight), and take the place of a corresponding weight of any solvents that may be present.

In addition to the ease of application, elastomer based coatings that do not contain a colorant or significant amounts of opaque particles are nearly transparent to visible light. Typical light transmission (Total Luminous Transmittance or "TLT") of an elastomeric binder coating prepared using SBCs having 15 micron thickness is approximately 90% (about 85% to about 92%) with a haze of about 61% (about 55% to about 65%). HP/OP coatings without added colorants that are about 25 microns thick prepared with clear first particles (e.g., EXPANCEL particles or other plastic or glass particles or hollow spheres) and fumed silica second particles treated with a silane (silanizing agent) can be nearly transparent. Such HP/OP coatings typically have a TLT of about 80% (about 75% to about 85%) with a haze of about 90% (about 85% to about 90%) as measure by ASTM D1003-11. For the measurements the instrument was calibrated against air and glass sample blanks and given a TLT of about 90% to about 91% and a haze of about 0.2%. Excluding or removing fine particulate materials such as talc used to increase the properties of commercially available elastomer compositions (e.g., flowability of bulk particulates) may increase TLT and haze values. Such fine particulates used in bulk elastomers may be removed by washing with a suitable solvent or by omitting the material from the elastomer compositions when they are prepared.

Figure 3:
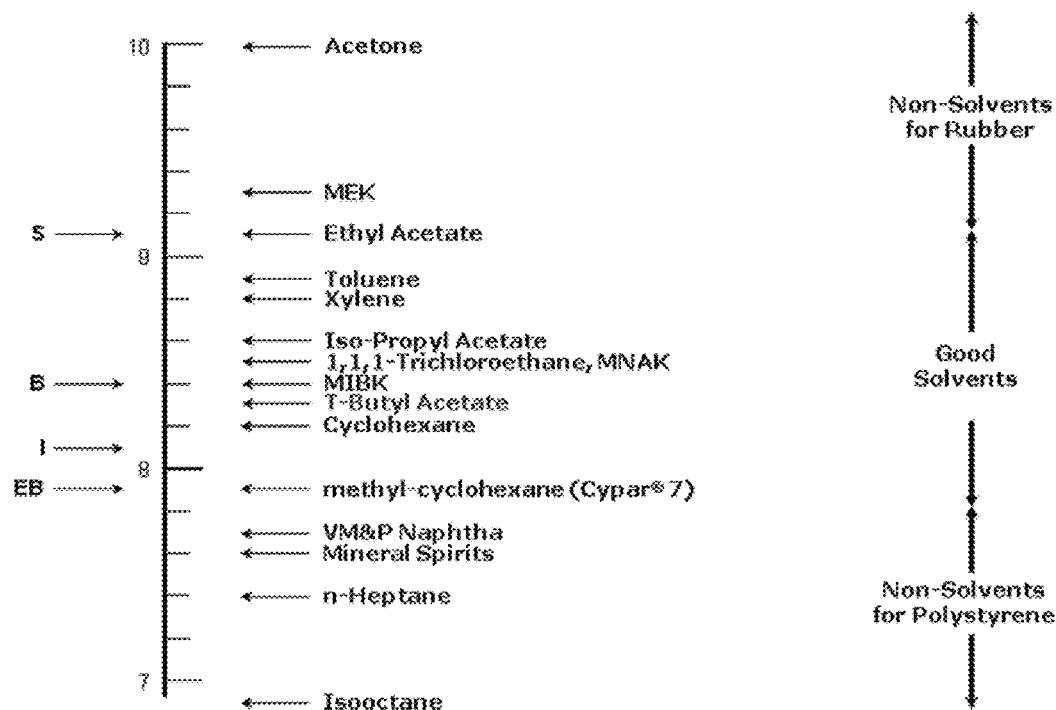
FIG. 3 shows some solvents suitable for dissolving styrene (styrenic) block copolymers (SBCs). The scale represents suitable solvents that can be used as SBC copolymers. Letters to the left axis are indicators of: S (styrene), B butylene (polybutadiene), I (polyisoprene), and EB (ethylene/butylene). Those solvents indicated as "Good Solvents" are solvents that tend to dissolve or suspend SBC polymers.

A variety of solvents may be employed to dissolve elastomeric binders for the preparation of coating compositions used to prepare the base coat of HP/OP coatings described herein. In some embodiments, the copolymers are dissolved in solvents selected from: methyl ethyl ketone (MEK), ethyl acetate, toluene, 1-chloro-4-(trifluoromethyl)-benzene, xylene or mixed xylenes (including technical grade xylenes), isopropyl acetate, 1,1,1,-trichloroethane, methyl isobutyl ketone (MIBK), tertbutyl acetate (t-butyl acetate), cyclohexane, methyl-cyclohexane, or mixtures comprising any two, three, four or more thereof. In one embodiment the solvent(s) are selected from those found in the solubility chart shown in FIG. 3, or mixtures of any two, three, four or more thereof. In another embodiment, the solvent comprises greater than 50%, 60%, 70%, 80%, 90%, 95%, 98% or 99% of a xylene (1,2-xylene, 1,3-xylene, or 1,4-xylene) or a mixture of any two or all three xylenes and optionally ethyl benzene (e.g., a technical grade of xylene comprising 34%-47% 1,3-xylene, 9%-21% 1,4-xylene, 4%-16% 1,2-xylene, 9%-10% ethylbenzene, 0%-1% toluene, and 0%-1% benzene).

In any of the foregoing embodiments, particularly where coatings are to be nearly transparent, the elastomeric binder components comprise at most insubstantial amounts (e.g., less than about 0.5% by weight of the polymers present in the binder) of colorants or particulates that are insoluble in solvents that dissolve the elastomeric polymers and/or that would block the transmission of visible light. One source of such particulates is materials added for the flowability of bulk polymers in the form of powders, pellets, or flakes (e.g., talc added to bulk SBCs).

3.0 Particles Employed In Hp/Op Oleophobic Coatings

3.1 First Particles

Embodiments of the coatings disclosed herein may comprise particles that are added to the binder compositions to improve the mechanical properties of the coating, e.g., the durability of the HP/OP coatings. A wide variety of such particles, which are also known as extenders or fillers, may be added to the binders. Those particles are denoted herein as "first particles" because the coatings described herein may have one or more additional types of particles. Such first particles that can be employed in the HP/OP coatings described herein include, but are not limited to, particles comprising: wood (e.g., wood dust), glass, metals (e.g., iron, titanium, nickel, zinc, tin), alloys of metals, metal oxides, metalloid oxides (e.g., silica), plastics (e.g., thermoplastics), carbides, nitrides, borides, spinels, diamonds, and fibers (e.g., glass fibers).

Numerous variables may be considered in the selection of first particles. These variables include, but are not limited to, the effect the first particles have on the resulting coatings, their size, their hardness, their compatibility with the binder, the resistance of the first particles to the environment in which the coatings will be employed, and the environment the first particles must endure in the coating and/or curing process, including resistance to temperature and solvent conditions. In addition, if light is used for curing the coatings or they are intended for extended exposure to sunlight, the particles must be resistant to the required light exposure conditions (e.g., resistant to UV light employed in curing or sunlight).

In embodiments described herein, first particles have an average size in a range selected from about 1 micron ($\mu m$) to about 300 $\mu m$ or from about 30 $\mu m$ to about 225 $\mu m$. Within the broader ranges, embodiments include ranges of first particles having an average size of from about 1 $\mu m$ to about 5 $\mu m$, from about 5 $\mu m$ to about 10 $\mu m$, from about 10 $\mu m$ to about 15 $\mu m$, from about 15 $\mu m$ to about 20 $\mu m$, from about 20 $\mu m$ to about 25 $\mu m$, from about 1 $\mu m$ to about 25 $\mu m$, from about 5 $\mu m$ to about 25 $\mu m$, from about 25 $\mu m$ to about 50 $\mu m$, from about 50 $\mu m$ to about 75 $\mu m$, from about 75 $\mu m$ to about 100 $\mu m$, from about 100 $\mu m$ to about 125 $\mu m$, from about 125 $\mu m$ to about 150 $\mu m$, from about 150 $\mu m$ to about 175 $\mu m$, from about 175 $\mu m$ to about 200 $\mu m$, from about 200 $\mu m$ to about 225 $\mu m$, and from about 225 $\mu m$ to about 250 $\mu m$. Also included within this broad range are embodiments employing particles in ranges from about 10 $\mu m$ to about 100 $\mu m$, from about 10 $\mu m$ to about 200 $\mu m$, from about 20 $\mu m$ to about 200 $\mu m$, from about 30 $\mu m$ to about 50 $\mu m$, from about 30 $\mu m$ to about 100 $\mu m$, from about 30 $\mu m$ to about 200 $\mu m$, from about 30 $\mu m$ to about 225 $\mu m$, from about 50 $\mu m$ to about 100 $\mu m$, from about 50 $\mu m$ to about 200 $\mu m$, from about 75 $\mu m$ to about 150 $\mu m$, from about 75 $\mu m$ to about 200 $\mu m$, from about 100 $\mu m$ to about 225 $\mu m$, from about 100 $\mu m$ to about 250 $\mu m$, from about 125 µm to about 225 µm, from about 125 µm to about 250 µm, from about 150 µm to about 200 µm, from about 150 µm to about 250 µm, from about 175 µm to about 250 µm, from about 200 µm to about 250 µm, from about 225 µm to about 275 µm, or from about 250 µm to about 300 µm.

First particles may be incorporated into the elastomer binders at various ratios depending on the binder composition and the first particle's properties. In some embodiments, the first particles may have a content range selected from about 0.01% to about 60% or more by weight. Included within this broad range are embodiments in which the first particles are present, by weight, in ranges from about 0.02% to about 0.2%, from about 0.05% to about 0.5%, from about 0.075% to about 0.75%, from about 0.1% to about 1%, from about 0.5% to about 2.5%, from about 2% to about 5%, from about 5% to about 10%, from about 10% to about 15%, from about 15% to about 20%, from about 20% to about 25%, from about 25% to about 30%, from about 30% to about 35%, from about 35% to about 40%, from about 40% to about 45%, from about 45% to about 50%, from about 50% to about 55%, from about 55% to about 60%, and greater than 60%. Also included within this broad range are embodiments in which the first particles are present, by weight, in ranges from about 4% to about 30%, from about 5% to about 25%, from about 5% to about 35%, from about 10% to about 25%, from about 10% to about 30%, from about 10% to about 40%, from about 10% to about 45%, from about 15% to about 25%, from about 15% to about 35%, from about 15% to about 45%, from about 20% to about 30%, from about 20% to about 35%, from about 20% to about 40%, from about 20% to about 45%, from about 20% to about 55%, from about 25% to about 40%, from about 25% to about 45%, from about 25% to about 55%, from about 30% to about 40%, from about 30% to about 45%, from about 30% to about 55%, from about 30% to about 60%, from about 35% to about 45%, from about 35% to about 50%, from about 35% to about 60%, from about 40% to about 60%, from about 0.01% to about 5%, from about 0.03% to about 1%, from about 0.05% to about 0.15%, from about 0.1% to about 2.5%, from about 0.2% to about 5%, from about 0.05% to about 10%, from about 0.1% to about 10%, from about 0.05% to about 15%, or from about 0.05% to about 20%, on a weight basis.

In those embodiments where it is desirable to have coatings that are transparent, substantially transparent, or colored but transparent, it is generally desirable to employ particles that are transparent. In one set of embodiments, plastic (e.g., thermoplastic) microspheres are employed in the binder systems to develop surface texture. In another set of embodiments, glass microspheres are employed in the binder systems to develop surface texture.

In one embodiment, substantially spherical thermoplastic particles are added to the elastomeric binder composition to develop surface texture (e.g., EXPANCEL microspheres or EXPANCEL particles). Such microspheres consist of a polymer shell encapsulating a gas. The average diameter of these hollow spheres typically ranges from 6 to 45 µm and have a density of 1000 to 1300 kg/m$^3$ (8.3-10.8 lbs/US Gallon).

Upon heating, the microspheres expand and the volume of the microspheres can increase more than 40 times (with the diameter changing, for example, from 10 to 40 µm), resulting in a density below 30 kg/m$^3$ (0.25 lbs/US Gallon). Typical expansion temperatures range from 80 to 190° C. (176-374° F.). When heating the microspheres the pressure of the gas inside the shell increases and the thermoplastic shell softens, resulting in a dramatic increase of the volume of the microspheres. Cooling the microspheres results in the shell stiffening again and produces lighter (lower density) expanded microspheres. Some thermoplastic microspheres produced under the EXPANCEL brand (AkzoNobel, distributed by Eka Chemicals, Inc., 2240 Northmont Parkway, Duluth, Ga. 30096, USA) are suitable for use in preparing HP/OP, particularly those that are substantially transparent. See Table 4.

TABLE 4

EXPANCEL particles and properties

| Main types | Varieties | Description | Solid content [%] | Density of EXPANCEL [kg/m$^3$] |
|---|---|---|---|---|
| Unexpanded microspheres | EXPANCEL WU | Wet, unexpanded microspheres | 60-80 | 1000-1300 |
| | EXPANCEL WUF | Wet, unexpanded microspheres | 60-80 | 1000-1300 |
| | EXPANCEL DU | Dry, unexpanded microspheres | >99 | ~1000 |
| | EXPANCEL OUT | Dry, treated, unexpanded microspheres | >99 | ~1000 |
| | EXPANCEL SL | Wet, salted, unexpanded microspheres | 40 | 1200 |
| | EXPANCEL SLU | Wet, unexpanded microspheres | 44 | 1200 |
| | EXPANCEL MB | Dry, unexpanded microspheres mixed with a matrix, e.g. EVA | 65 (EXPANCEL) | 1000 |
| Expanded microspheres | EXPANCEL WE | Wet, expanded microspheres | 15 | ~30 |
| | EXPANCEL DE | Dry, expanded microspheres | >89 | 25-70 |
| | EXPANCEL DET | Dry, treated, expanded microspheres | >99 | 25 |

Where HP/OP coatings capable of withstanding higher temperatures are desired, and particularly coatings that are substantially transparent, glass microspheres may be employed in place of thermoplastic microspheres. Such glass microspheres include those produced by 3M™ (St. Paul, Minn.) or Sphere One, Inc. (Chattanooga, Tenn.).

3.1.1 Exemplary Sources of First Particles

First particles may be prepared from the diverse materials described above. Alternatively, first particles may be purchased from a variety of suppliers. Some commercially available first particles that may be employed in the formation of the HP/OP coatings described herein include those in Table 5.

TABLE 5

First Particles

| First particle No. | First Particle (Filler) ID | First Particle Type | First Particle Details | (g/cc) | Particle Size Range (µm) | Color | Crush Strength (psi) | Source Location |
|---|---|---|---|---|---|---|---|---|
| 1 | K1 | Glass Bubbles | GPS$^a$ | 0.125 | 30-120 | White | 250 | 3M ™$^j$ |
| 2 | K15 | Glass Bubbles | GPS$^a$ | 0.15 | 30-115 | White | 300 | 3M ™$^j$ |

TABLE 5-continued

| First particle No. | First Particle (Filler) ID | First Particle Type | First Particle Details | (g/cc) | Particle Size Range (μm) | Color | Crush Strength (psi) | Source Location |
|---|---|---|---|---|---|---|---|---|
| 3 | S15 | Glass Bubbles | GPS$^a$ | 0.15 | 25-95 | White | 300 | 3M ™$^j$ |
| 4 | S22 | Glass Bubbles | GPS$^a$ | 0.22 | 20-75 | White | 400 | 3M ™$^j$ |
| 5 | K20 | Glass Bubbles | GPS$^a$ | 0.2 | 20-125 | White | 500 | 3M ™$^j$ |
| 6 | K25 | Glass Bubbles | GPS$^a$ | 0.25 | 25-105 | White | 750 | 3M ™$^j$ |
| 7 | S32 | Glass Bubbles | GPS$^a$ | 0.32 | 20-80 | White | 2000 | 3M ™$^j$ |
| 8 | S35 | Glass Bubbles | GPS$^a$ | 0.35 | 10-85 | White | 3000 | 3M ™$^j$ |
| 9 | K37 | Glass Bubbles | GPS$^a$ | 0.37 | 20-85 | White | 3000 | 3M ™$^j$ |
| 10 | S38 | Glass Bubbles | GPS$^a$ | 0.38 | 15-85 | White | 4000 | 3M ™$^j$ |
| 11 | S38HS | Glass Bubbles | GPS$^a$ | 0.38 | 15-85 | White | 5500 | 3M ™$^j$ |
| 12 | K46 | Glass Bubbles | GPS$^a$ | 0.46 | 15-80 | White | 6000 | 3M ™$^j$ |
| 13 | S60 | Glass Bubbles | GPS$^a$ | 0.6 | 15-65 | White | 10000 | 3M ™$^j$ |
| 14 | S60/HS | Glass Bubbles | GPS$^a$ | 0.6 | 11-60 | White | 18000 | 3M ™$^j$ |
| 15 | A16/500 | Glass Bubbles | Floated Series | 0.16 | 35-135 | White | 500 | 3M ™$^j$ |
| 16 | A20/1000 | Glass Bubbles | Floated Series | 0.2 | 30-120 | White | 1000 | 3M ™$^j$ |
| 17 | H20/1000 | Glass Bubbles | Floated Series | 0.2 | 25-110 | White | 1000 | 3M ™$^j$ |
| 18 | D32/4500 | Glass Bubbles | Floated Series | 0.32 | 20-85 | White | 4500 | 3M ™$^j$ |
| 19 | Expancel 551 DE 40 d42 | Plastic Microspheres | Dry Expanded | 0.042 ± 0.004 | 30-50 | | | AkzoNobel$^i$ |
| 20 | Expancel 551 DE 40 d42 ± 2 | Plastic Microspheres | Dry Expanded | 0.042 ± 0.002 | 30-50 | | | AkzoNobel$^i$ |
| 21 | Expancel 461 DE 20 d70 | Plastic Microspheres | Dry Expanded | 0.07 ± 0.006 | 15-25 | | | AkzoNobel$^i$ |
| 22 | Expancel 461 DE 40 d60 | Plastic Microspheres | Dry Expanded | 0.06 ± 0.005 | 20-40 | | | AkzoNobel$^i$ |
| 23 | Expancel 461 DET 40 d25 | Plastic Microspheres | Dry Expanded | 0.025 ± 0.003 | 35-55 | | | AkzoNobel$^i$ |
| 24 | Expancel 461 DET 80 d25 | Plastic Microspheres | Dry Expanded | 0.025 ± 0.003 | 60-90 | | | AkzoNobel$^i$ |
| 25 | Expancel 920 DE 40 d30 | Plastic Microspheres | Dry Expanded | 0.030 ± 0.003 | 35-55 | | | AkzoNobel$^i$ |
| 26 | Expancel 920 DET 40 d25 | Plastic Microspheres | Dry Expanded | 0.025 ± 0.003 | 35-55 | | | AkzoNobel$^i$ |
| 27 | Expancel 920 DE 80 d30 | Plastic Microspheres | Dry Expanded | 0.030 ± 0.003 | 55-85 | | | AkzoNobel$^i$ |
| 28 | H50/10000 EPX | Glass Bubbles | Floated Series | 0.5 | 20-60 | White | 10000 | 3M ™$^j$ |
| 29 | iMK | Glass Bubbles | Floated Series | 0.6 | 8.6-26.7 | White | 28000 | 3M ™$^j$ |
| 30 | G-3125 | Z-Light Spheres ™ | CM$^b$ | 0.7 | 50-125 | Gray | 2000 | 3M ™$^j$ |
| 31 | G-3150 | Z-Light Spheres ™ | CM$^b$ | 0.7 | 55-145 | Gray | 2000 | 3M ™$^j$ |
| 32 | G-3500 | Z-Light Spheres ™ | CM$^b$ | 0.7 | 55-220 | Gray | 2000 | 3M ™$^j$ |
| 33 | G-600 | Zeeo-Spheres ™ | CM$^b$ | 2.3 | 1-40 | Gray | >60000 | 3M ™$^j$ |
| 34 | G-800 | Zeeo-Spheres ™ | CM$^b$ | 2.2 | 2-200 | Gray | >60000 | 3M ™$^j$ |
| 35 | G-850 | Zeeo-Spheres ™ | CM$^b$ | 2.1 | 12-200 | Gray | >60000 | 3M ™$^j$ |
| 36 | W-610 | Zeeo-Spheres ™ | CM$^b$ | 2.4 | 1-40 | White | >60000 | 3M ™$^j$ |
| 37 | SG | Extendosphere ™ | HS$^c$ | 0.72 | 30-140 | Gray | 2500 | Sphere One$^f$ |
| 38 | DSG | Extendosphere ™ | HS$^c$ | 0.72 | 30-140 | Gray | 2500 | Sphere One$^f$ |
| 39 | SGT | Extendosphere ™ | HS$^c$ | 0.72 | 30-160 | Gray | 2500 | Sphere One$^f$ |
| 40 | TG | Extendosphere ™ | HS$^c$ | 0.72 | 8-75 | Gray | 2500 | Sphere One$^f$ |
| 41 | SLG | Extendosphere ™ | HS$^c$ | 0.7 | 10-149 | Off White | 3000 | Sphere One$^f$ |
| 42 | SLT | Extendosphere ™ | HS$^c$ | 0.4 | 10-90 | Off White | 3000 | Sphere One$^f$ |
| 43 | SL-150 | Extendosphere ™ | HS$^c$ | 0.62 | 70 | Cream | 3000 | Sphere One$^f$ |
| 44 | SLW-150 | Extendosphere ™ | HS$^c$ | 0.68 | 8-80 | White | 3000 | Sphere One$^f$ |

TABLE 5-continued

First Particles

| First particle No. | First Particle (Filler) ID | First Particle Type | First Particle Details | (g/cc) | Particle Size Range (μm) | Color | Crush Strength (psi) | Source Location |
|---|---|---|---|---|---|---|---|---|
| 45 | HAT | Extendo-sphere ™ | HS[c] | 0.68 | 10-165 | Gray | 2500 | Sphere One[f] |
| 46 | HT-150 | Extendo-sphere ™ | HS[c] | 0.68 | 8-85 | Gray | 3000 | Sphere One[f] |
| 47 | KLS-90 | Extendo-sphere ™ | HS[c] | 0.56 | 4-05 | Light Gray | 1200 | Sphere One[f] |
| 48 | KLS-125 | Extendo-sphere ™ | HS[c] | 0.56 | 4-55 | Light Gray | 1200 | Sphere One[f] |
| 49 | KLS-150 | Extendo-sphere ™ | HS[c] | 0.56 | 4-55 | Light Gray | 1200 | Sphere One[f] |
| 50 | KLS-300 | Extendo-sphere ™ | HS[c] | 0.56 | 4-55 | Light Gray | 1200 | Sphere One[f] |
| 51 | HA-300 | Extendo-sphere ™ | HS[c] | 0.68 | 10-146 | Gray | 2500 | Sphere One[f] |
| 52 | XIOM 512 | Thermoplastic | MPR[d] | 0.96 | 10-100 | White | 508 | XIOM Corp.[k] |
| 53 | XIOM 512 | Thermoplastic | MPR[d] | 0.96 | 10-100 | Black | 508 | XIOM Corp.[k] |
| 54 | CORVEL ™ Black 78-7001 | Thermoplastic | Nylon Powder Coating | 1.09 | 44-74 | Black | | ROHM & HASS[g] |
| 55 | Micro-glass 3082 | Fibers | MMEGF[e] | 1.05 | 16X120 | White | | Fibertec[h] |
| 56 | Micro-glass 9007D | Fibers Silane-Treated | MMEGF[e] | 0.53 | 10X150 | White | | Fibertec[h] |
| 57 | Tiger Drylac Series 49 | Polyester crosslinked with TGIC (triglycidyl isocyanurate) | | | | | | Tiger Drylac USA, Inc.[i] |
| 58 | Soft-Sand ® | Rubber based | | | 90, 180, or 300 | Various colors | | SoftPoint Indust. Copley, OH |

[a]GPS—general purpose series
[b]ceramic microspheres
[c]hollow spheres
[d]modified polyethylene resins
[e]microglass milled E-glass filaments
[f]Chattanooga, TN
[g]Philadelphia, PA
[h]Bridgewater, MA
[i]Distributed by Eka Chem., Inc., Duluth, GA
[j]St. Paul, MN
[k]West Babylon, NY
[l]St. Charles, IL

3.2 Second Particles

The coatings disclosed herein employ second particles (e.g., nanoparticles), which are particles that bear, or are associated with, hydrophobic and/or oleophobic compounds or moieties (i.e., moieties that are covalently or non-covalently bound). The hydrophobic moieties can be introduced by treating the particles to include moieties such as siloxanes, fluorinated hydrocarbons (e.g., partly or fully fluorinated hydrocarbons) or nonfluorinated hydrocarbons. In an embodiment, second particles suitable for the preparation of elastomer-based HP/OP coatings have a size from about 1 nanometer (nm) to about 25 μm and are capable of binding covalently to one or more chemical moieties (groups or components) that provide the second particles, and the coatings into which they are incorporated, hydrophobicity, and when selected to include fluoroalkyl groups, hydrophobicity and oleophobicity.

In one embodiment the second particles have a surface area over 100, 150, 200, 250, or 300 square meters per gram ($m^2/g$) of particulate. In another embodiment, where the particles are fumed silica, the surface area can be about or greater than 150, 175, 200, 225 or 250 $m^2/g$.

Second particles having a wide variety of compositions may be employed in the durable HP/OP coatings described and employed herein. In some embodiments the second particles will be particles comprising metal oxides (e.g., aluminum oxides such as alumina, zinc oxides, nickel oxides, zirconium oxides, iron oxides, or titanium dioxides), or oxides of metalloids (e.g., metalloid oxides such as oxides of B, Si, Sb, Te and Ge) such as glass, silica (e.g., fumed silica), silicates, aluminosilicates, or particles comprising combinations thereof.

In some embodiments, the second particles may have an average size in a range selected from about 1 nm up to about 25 μm or more. Included within this broad range are embodiments in which the second particles have an average size in a range selected from: about 1 nm to about 10 nm, from about 10 nm to about 25 nm, from about 25 nm to about 50 nm, from about 50 nm to about 100 nm, from about 100 nm to about 250 nm, from about 250 nm to about 500 nm, from about 500 nm to about 750 nm, from about 750 nm to about 1 µm, from about 1 µm to about 5 µm, from about 5 µm to about 10 µm, from about 10 µm to about 15 µm, from about 15 µm to about 20 µm, from about 20 µm to about 25 µm, from about 1 nm to about 100 nm, from about 2 nm to about 200 nm, from about 10 nm to about 200 nm, from about 20 nm to about 400 nm, from about 10 nm to about 500 nm; from about 40 nm to about 800 nm, from about 100 nm to about 1 µm, from about 200 nm to about 1.5 µm, from about 500 nm to about 2 µm, from about 500 nm to about 2.5 µm, from about 1 µm to about 10 µm, from about 2 µm to about 20 µm, from about 2.5 µm to about 25 µm, from about 500 nm to about 25 µm, from about 400 nm to about 20 µm, from about 100 nm to about 15 µm, from about 1 nm to about 50 nm, from about 1 nm to about 400 nm, from about 1 nm to about 500 nm, from about 2 nm to about 120 nm, from about 5 nm to about 100 nm, from about 5 nm to about 200 nm; from about 5 nm to about 400 nm; from about 10 nm to about 300 nm; or from about 20 nm to about 400 nm.

In the above-mentioned embodiments, the lower size of second particles may be limited to particles greater than about 20 nm, about 25 nm, about 30 nm, about 35 nm, about 40 nm, about 45 nm, about 50 nm, or about 60 nm; and the upper size of second particles may be limited to particles less than about 20 µm, about 10 µm, about 5 µm, about 1 µm, about 0.8 µm, about 0.6 µm, about 0.5 µm, about 0.4 µm, about 0.3 µm, about 0.2 µm, or about 100 nm.

Any combination of particle size, particle composition, surface area, and/or percent composition in the coatings recited herein may be employed in preparing elastomer-based HP/OP coatings. Limitations on the upper and lower size of second particles may be used alone or in combination with any of the above-recited size limits on particle composition, surface area, percent composition in the coatings, and the like.

In some embodiments, the coatings may contain first particles in any of the above-mentioned ranges subject to either the proviso that the coatings do not contain only particles (e.g., first or second particles) with a size of 25 µm or less, or the proviso that the coatings do not contain more than an insubstantial amount of second particles with a size of 25 µm or less (recognizing that separation processes for particles greater than 25 µm may ultimately provide an unintended, insubstantial amount of particles that are 25 µm or less). An insubstantial amount of particles is less than 3% by weight or number of those particles, but it can also be less than 0.5%, 1%, or 2% wherever recited.

In other embodiments, second particles have an average size greater than 30 µm and less than 250 µm, and coatings comprising those particles do not contain more than insubstantial amounts of particles (e.g., first and second particles) with a size of 30 µm or less. In yet other embodiments, the coatings do not contain only particles (e.g., first and second particles) with a size of 40 µm or less, or particles with a size of 40 µm or less in substantial amounts. In addition, in still other embodiments, the coatings do not contain only particles (e.g., first and second particles) with a size of 50 µm or less, or particles with a size of 50 µm or less in substantial amounts.

In other embodiments, such as where the second particles are prepared by fuming (e.g., fumed silica or fumed zinc oxide), the second particles may have an average size in a range selected from about 1 nm to about 50 nm, from about 1 nm to about 100 nm, from about 1 nm to about 400 nm, from about 1 nm to about 500 nm, from about 2 nm to about 120 nm, from about 5 nm to about 100 nm, from about 5 nm to about 200 nm, from about 25 nm to about 100 nm, from about 30 nm to about 200 nm, from about 5 nm to about 400 nm, from about 10 nm to about 300 nm, from about 20 nm to about 400 nm, or from about 50 nm to about 400 nm.

As indicated above, second particles are treated to introduce one or more moieties (e.g., groups or components) that impart HP/OP properties to the particles, either prior to incorporation into the compositions that will be used to apply coatings or after incorporation into the coatings. In some embodiments, the second particles are treated with a silanizing agent, a silane, a siloxane or a silazane, to introduce hydrophobic/superhydrophobic and/or oleophobic/superoleophobic properties to the particles (in addition to any such properties already possessed by the particles).

In one embodiment, second particles are silica, silicates, alumina (e.g., $Al_2O_3$), titanium oxide, or zinc oxide that are treated with one or more silanizing agents, e.g., compounds of formula (I) (below). In other embodiments, second particles are comprised of silica, silicates, alumina (e.g., $Al_2O_3$), titanium oxide, or zinc oxide that are treated with a siloxane. In another embodiment, the second particles are silica, silicates, glass, alumina (e.g., $Al_2O_3$), titanium oxide, or zinc oxide, treated with a silanizing agent, a siloxane or a silazane. In another embodiment, the second particles may be a fumed metal or metalloid (e.g., particles of fumed silica or fumed zinc oxide).

In embodiments where a silanizing agent is employed, the silanizing agent may be a compound of the formula (I):

$$R_{4-n}Si-X_n \qquad (I)$$

where n is an integer from 1 to 3;
each R is independently selected from
  (i) alkyl or cycloalkyl group optionally substituted with one or more fluorine atoms,
  (ii) $C_{1\ to\ 20}$ alkyl optionally substituted with one or more substituents independently selected from fluorine atoms and $C_{6\ to\ 14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents,
  (iii) $C_{2\ to\ 8}$ or $C_{6\ to\ 20}$ alkyl ether optionally substituted with one or more substituents independently selected from fluorine and $C_{6\ to\ 14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents,
  (iv) $C_{6\ to\ 14}$ aryl, optionally substituted with one or more substituents independently selected from halo or alkoxy, and haloalkoxy substituents,
  (v) $C_{4\ to\ 20}$ alkenyl or $C_{4\ to\ 20}$ alkynyl, optionally substituted with one or more substituents independently selected from halo, alkoxy, or haloalkoxy, and
  (vi) $-Z-((CF_2)_q(CF_3))_r$, wherein Z is a $C_{1\ to\ 12}$ or a $C_{2\ to\ 8}$ divalent alkane radical or a $C_{2\ to\ 12}$ divalent alkene or alkyne radical, q is an integer from 1 to 12, and r is an integer from 1 to 4;
each X is independently selected from $-H$, $-Cl$, $-I$, $-Br$, $-OH$, $-OR^2$, $-NHR^3$, or $-N(R^3)_2$ group;
each $R^2$ is an independently selected $C_{1\ to\ 4}$ alkyl or haloalkyl group; and
each $R^3$ is an independently selected H, $C_{1\ to\ 4}$ alkyl, or haloalkyl group.

In some embodiments, R is an alkyl or fluoroalkyl group having from 6 to 20 carbon atoms.

In other embodiments, R is an alkyl or fluoroalkyl group having from 8 to 20 carbon atoms.

In other embodiments, R is an alkyl or fluoroalkyl group having from 10 to 20 carbon atoms.

In other embodiments, R is an alkyl or fluoroalkyl group having from 6 to 20 carbon atoms and n is 3.

In other embodiments, R is an alkyl or fluoroalkyl group having from 8 to 20 carbon atoms and n is 3.

In other embodiments, R is an alkyl or fluoroalkyl group having from 10 to 20 carbon atoms and n is 3.

In other embodiments, R has the form —Z—$((CF_2)_q(CF_3))_r$, wherein Z is a $C_{1\ to\ 12}$ divalent alkane radical or a $C_{2\ to\ 12}$ divalent alkene or alkyne radical, q is an integer from 1 to 12, and r is an integer from 1 to 4.

In any of the previously mentioned embodiments of compounds of formula (I), the value of n may be varied such that 1, 2 or 3 independently selected terminal functionalities are present. Thus, in some embodiments, n is 3. In other embodiments, n is 2. In still other embodiments, n is 1.

In any of the previously mentioned embodiments of compounds of formula (I), all halogen atoms present in any one or more R groups may be fluorine.

In any of the previously mentioned embodiments of compounds of formula (I), X may be independently selected from H, Cl, —$OR^2$, —$NHR^3$, —$N(R^3)_2$, or combinations thereof. In other embodiments, X may be selected from Cl, —$OR^2$, —$NHR^3$, —$N(R^3)_2$, or combinations thereof. In still other embodiments, X may be selected from —Cl, —$NHR^3$, —$N(R^3)_2$ or combinations thereof.

Any coating described herein may be prepared with one, two, three, four or more compounds of formula (I) employed alone or in combination to modify the nano-particles, and/or other components of the coating including filler-particles. The use of silanizing agents of formula (I) to modify nano-particles, or any of the other components of the coatings, will introduce one or more $R_{3-n}X_nSi$—groups (e.g., $R_3Si$—, $R_2X_1Si$-, or $RX_2Si$—groups) where R and X are as defined for a compound of formula (I). The value of n is 0, 1, or 2, due to the displacement of at least one "X" substituent and formation of at least one bond between a nano-particle and the Si atom (the bond between the nano-particle and the silicon atom is indicated by a dash "-" (e.g., $R_3Si$—, $R_2X_1Si$—, or $RX_2Si$—groups).

In other embodiments, suitable silanizing agents for modifying the nano-particles used in the coating compositions generally comprise those with fluorinated or polyfluorinated alkyl groups (e.g., fluoroalkyl groups) or alkyl groups (hydrocarbon containing groups) including, but not limited to:

(tridecafluoro-1,1,2,2-tetrahydrooctyl)silane (SIT8173.0);
(tridecafluoro-1,1,2,2-tetrahydrooctyl)trichlorosilane (SIT8174.0);
(tridecafluoro-1,1,2,2-tetrahydrooctyl)triethoxysilane (SIT8175.0);
(tridecafluoro-1,1,2,2-tetrahydrooctyl)trimethoxysilane (SIT8176.0);
(heptadecafluoro-1,1,2,2-tetrahydrodecyl)dimethyl(dimethylamino)silane (SIH5840.5);
(heptadecafluoro-1,1,2,2-tetrahydrodecyl)tris(dimethylamino)silane (SIH5841.7);
n-octadecyltrimethoxysilane (SIO6645.0); n-octyltriethoxysilane (SIO6715.0); and
3,3,4,4,5,5,6,6,6-nonafluorohexyldimethyl(dimethylamino)silane (SIN6597.4) where the designations given in parentheses are the product numbers from Gelest, Inc., Morrisville, Pa.

Another group of reagents that can be employed to prepare first or second particles with hydrophobic and/or oleophobic properties include (tridecafluoro-1,1,2,2-tetrahydrooctyl)trichlorosilane:
(tridecafluoro-1,1,2,2-tetrahydrooctyl)triethoxysilane;
nonafluorohexyldimethylchlorosilane
(tridecafluoro-1,1,2,2-tetrahydrooctyl)trimethoxysilane;
3,3,4,4,5,5,6,6,6-nonafluorohexyldimethyl(dimethylamino)-silane:
nonafluorohexylmethyldichlorosilane;
nonafluorohexyltrichlorosilane;
nonafluorohexyltriethoxysilane; and
nonafluorohexyltrimethoxysilane.

In one embodiment, the coating compositions set forth herein comprise silica second particles treated with nonafluorohexyltrichlorosilane.

In addition to the silanizing agents recited above, a variety of other silanizing agents can be used to alter the properties of second particles and to provide hydrophobic and/or oleophobic properties. In some embodiments, second particles may be treated with an agent selected from dimethyldichlorosilane, hexamethyldisilazane, octyltrimethoxysilane, or tridecafluoro-1,1,2,2-tetrahydrooctyl trichlorosilane. In such embodiments, the second particles may be silica. Silica second particles treated with such agents may have an average size in a range selected from about 1 nm to about 50 nm, from about 1 nm to about 100 nm, from about 1 nm to about 400 nm, from about 1 nm to about 500 nm, from about 2 nm to about 120 nm, from about 5 nm to about 150 nm, from about 5 nm to about 400 nm, from about 10 nm to about 300 nm, from about 20 nm to about 400 nm, or from about 50 nm to about 250 nm.

Other agents can be used to modify second particles, including, but not limited to, one or more of: polydimethylsiloxane, gamma-aminopropyltriethoxysilane, Dynasylan® A (tetraethylorthosilicate), hexamethyldisilazane, and Dynasylan® F 8263 (fluoroalkylsilane), any one or more of which may be used alone or in combination with the silanizing agents recited herein.

Two attributes of silanizing agents that may be considered for the purposes of their reaction with second particles and the introduction of hydrophobic or oleophobic moieties are the leaving group (e.g., X groups of compounds of the formula (I)) and the terminal functionality (e.g., R groups of compounds of the formula (I)). A silanizing agent's leaving group(s) can determine the reactivity of the agent with the first or second particle(s), or other components of the coating, if applied after a coating has been applied. Where the first or second particles are a silicate or silica (e.g., fumed silica) the leaving group can be displaced to form Si—O—Si bonds. Leaving group effectiveness is ranked in the decreasing order as chloro>methoxy>hydro (H)>ethoxy (measured as trichloro>trimethoxy>trihydro>triethoxy). This ranking of the leaving groups is consistent with their bond dissociation energy. The terminal functionality determines the level of hydrophobicity that results from application of the silane to the surface.

3.2.1 Some Sources of Second Particles

Second particles such as those comprising fumed silica may be purchased from a variety of suppliers including, but not limited to, Cabot Corp., Billerica, Mass. (e.g., Nanogel TLD201, CAB-O-SIL® TS-720 (silica, pretreated with polydimethylsiloxane), and M5 (untreated silica)) and Evonik Industries, Essen, Germany (e.g., ACEMATT® silica such as untreated HK400, AEROXIDE® silica, AEROXIDE® $TiO_2$ titanium dioxide, and AEROXIDE® Alu alumina).

Some commercially available second particles are set forth in Table 6 along with their surface treatment by a silanizing agent or polydimethyl siloxane.

TABLE 6

Some commercially available second particles

| Product Name | Surface Treatment | Level of Treatment | Nominal BET Surface Area of Base Product (m²/g) | Particle Size (nm) | Product Source |
|---|---|---|---|---|---|
| M-5 | None | None | 200 | — | Cab-O-Sil |
| Aerosil ® 200 | None | None | 200 | 12 | Evonik |
| Aerosil ® 255 | None | None | 255 | — | Evonik |
| Aerosil ® 300 | None | None | 300 | 7 | Evonik |
| Aerosil ® 380 | None | None | 380 | 7 | Evonik |
| HP-60 | None | None | 200 | — | Cab-O-Sil |
| PTG | None | None | 200 | — | Cab-O-Sil |
| H-5 | None | None | 300 | — | Cab-O-Sil |
| HS-5 | None | None | 325 | — | Cab-O-Sil |
| EH-5 | None | None | 385 | — | Cab-O-Sil |
| TS-610 | Dimethyldichlorosilane | Intermediate | 130 | — | Cab-O-Sil |
| TS-530 | Hexamethyldisilazane | High | 320 | — | Cab-O-Sil |
| TS-382 | Octyltrimethoxysilane | High | 200 | — | Cab-O-Sil |
| TS-720 | Polydimethylsiloxane | High | 200 | — | Cab-O-Sil |
| Aerosil ® R202 | Polydimethylsiloxane | — | 100 | 14 | Evonik |
| Aerosil ® R504 | Hexamethyldisilazane (HMDS) and aminosilane | — | 125-175 | — | Evonik |
| Aerosil ® R812S | HMDS based on Aerosil ® 300 | — | 220 | — | Evonik |

BET Surface Area is Brunauer, Emmett and Teller surface area

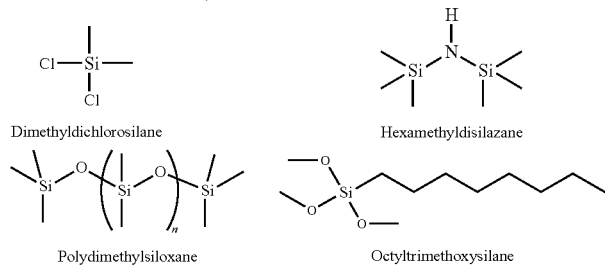

Dimethyldichlorosilane        Hexamethyldisilazane

Polydimethylsiloxane          Octyltrimethoxysilane

As purchased, the particles may be untreated (e.g., M5 silica) and may not possess any HP/OP properties. Such untreated particles can be treated to covalently attach one or more groups or moieties to the particles that give them HP/OP properties, for example, by treatment with the silanizing agents discussed above.

3.2.2 Dispersants for Second Particles

Second particles can be applied to a base coating of elastomeric binder after it has been applied to the surface of an object (or a part thereof) in the form of a second component having a composition comprising one or more independently selected second particles as described above (e.g., second particles having a size of about 1 nanometer (nm) to about 25 microns (μm) wherein said particles comprise one or more independently selected alkyl, haloalkyl, or perfluoroalkyl moieties bound, either directly or indirectly, to said second particles; wherein said second component optionally comprises one or more solvents (liquid dispersants).

If the elastomeric coating has not dried, or has been subjected to a solvent that dissolves at least the outermost portion of the binder (e.g., renders it sufficiently tacky), second particles may be applied directly to the elastomeric binder by contacting the second particles with the binder. Second particles may be contacted with the surface by any suitable means, including spraying them on the surface using a stream of gas (e.g., air, nitrogen, or an inert gas), exposing the binder coating to particles suspended in a gas, or contacting the base coat of elastomeric binder with a fluidized bed of second particles.

Second particles can also be applied to a base coating of elastomeric binder in a second coating component that, in addition to the second particles, contains a solvent (dispersant) that dissolves, expands or swells the outermost portion of the binder sufficiently (e.g., renders it tacky) to permit the second particles to become bound in at least the outermost portion of the binder base coat. Where second components of the coating composition comprise a solvent, the second particles are dispersed in the solvent for application. Second particles, and particularly smaller second particles (e.g., 1-50 nm or 1-100 nm), may form aggregates in solvents used as dispersants.

Suitable solvents include those with a surface energy lower than water including, but not limited to: alcohols, ketones, acetone, methyl ethyl ketone (MEK), ethyl acetate, toluene, xylene, isopropyl acetate, 1,1,1,-trichloroethane, methyl isobutyl ketone (MIBK), tertbutyl acetate (t-butyl acetate), cyclohexane, methyl-cyclohexane, or mixtures comprising any two, three, four or more thereof. In an embodiment, the solvents are non-aqueous (e.g., they contain less than 10%, 5%, 4%, 3%, 2%, 1%, or 0.5% of water by weight or they contain only insubstantial amounts of water). Solvents that are miscible with water are employed in the second coating component in another embodiment. In another embodiment, the solvent comprises a non-aqueous water miscible solvent. In one embodiment, the solvent employed in the second coating component is acetone or is comprised of acetone. In another embodiment the solvent employed in the second coating component is NMP (N-methylpyrrolidone) or is comprised of NMP. In other embodiments, the solvent employed in the second coating composition comprises a mixture of acetone or NMP with water, particularly a minor proportion of water (e.g., less than about 5%, less than about 4%, less than about 2%, less than about 1%, or less than about 0.5% water).

In one embodiment, the second component of the coating composition (i.e., the top coat) comprises:

i) one or more independently selected second particles having a size of about 1 nanometer to about 25 microns, wherein said second particles comprise one or more independently selected alkyl, haloalkyl, or perfluoroalkyl moieties bound, either directly or indirectly, to said second particles; and ii) optionally, one or more independently selected solvents, wherein when said one or more solvents are present, said second particles may be present in a weight percent range selected from (0.1-1, 1.0-2.0, 0.2-2.0, 0.5-1.5, 0.5-2.0, 0.75-2.5, 1.5-2.0, 1.5-2.5, 2.0-3.0, 2.0-3.5, or 2.5-3.5) based on the weight of the one or more solvents and second particles.

In another embodiment, the second component of the coating composition (i.e., the top coat) comprises:

(i) 0.1 to 3.5 parts by weight (e.g., 0.1-1, 1.0-2.0, 0.2-2.0, 0.5-1.5, 0.5-2.0, 0.75-2.5, 1.5-2.0, 1.5-2.5, 2.0-3.0, 2.0-3.5, or 2.5-3.5) of second particles that comprise one or more independently selected alkyl, haloalkyl, or perfluoroalkyl moieties bound, either directly or indirectly, to said second particles, or one or more siloxanes or silazanes associated with the second particles;

(ii) a fluorinated polyolefin, (e.g., a polymer of tetrafluoroethylene, hexafluoropropylene and vinylidene fluoride, such as Dyneon™ THV); and/or a Fluoroethylene-Alkyl Vinyl Ether (FEVE) copolymer; and (iii) a solvent for a the remainder of a total of 100 parts by weight.

In another embodiment, the fluorinated polyolefin (e.g., a polymer of tetrafluoroethylene, hexafluoropropylene and vinylidene fluoride, such as Dyneon™ THV), if present, comprises from 0.1 to 1.0 parts by weight (e.g., 0.1-0.5, 0.5-1.0, or 0.3-0.7 parts) of the composition.

In another embodiment, the Fluoroethylene-Alkyl Vinyl Ether (e.g., the constituent polymer found in Lumiflon™), if present, comprises 0.06 to 0.6 parts by weight (e.g., 0.06-0.0.1, 0.1-0.2, 0.2-0.4, or 0.4-0.6 parts) of the composition. In such an embodiment the FEVE may have an average molecular weight of about 1,000 to 3,000 (e.g., about 1,000-2,000, 2,000-3,000, 1,500-2,500, or about 1,000, about 1,500, about 2,000, about 2,500, or about 3,000 Dalton). Accordingly, one embodiment of the second component comprises per 100 parts by weight:

i) 0.1 to 3.5 parts by weight (e.g., 0.1-1, 1.0-2.0, 0.2-2.0, 0.5-1.5, 0.5-2.0, 0.75-2.5, 1.5-2.0, 1.5-2.5, 2.0-3.0, 2.0-3.5, or 2.5-3.5) of one or more independently selected second particles having a size of about 1 nanometer to about 25 microns, wherein said second particles comprise one or more independently selected alkyl, haloalkyl, or perfluoroalkyl moieties bound, either directly or indirectly, to said second particles, or one or more siloxanes or silazanes associated with said second particles;

ii) 0.1 to 1.0 parts by weight (e.g., 0.1-0.5, 0.5-1.0, or 0.3-0.7 parts) of a fluorinated polyolefin, (e.g., a polymer of tetrafluoroethylene, hexafluoropropylene and vinylidene fluoride, such as Dyneon™ THV); and/or 0.06 to 0.6 parts by weight (e.g., 0.06-0.0.1, 0.1-0.2, 0.2-0.4, or 0.4-0.6 parts) of a Fluoroethylene-Alkyl Vinyl Ether (FEVE) copolymer, having an average molecular weight of about 1,000 to 3,000 (e.g., about 1,000-2,000, 2,000-3,000, 1,500-2,500, or about 1,000, 1,500, 2,000, 2,500, or 3,000 Da); and (iii) one or more solvent for a the remainder of a total of 100 parts by weight.

Where the solvent employed in second coating compositions dissolves or renders at least the outermost layer of the elastomeric binder "tacky," second particles can be introduced into completely dried and cured base coats of elastomeric binder. That permits the repair of worn or abraded coatings that have lost HP/OP behavior over all or part of their surface.

4.0 Surface Preparation and Priming

To improve the adherence and performance of the coatings described herein the surface to be coated, in whole or in part, should be clean, free of contaminants and capable of supporting the coatings (e.g., not friable).

Performance of the coatings in terms of their durability can be significantly improved by the application of a primer. Any primer compatible with both the surface of the object and the elastomeric coating can be employed.

A variety of primer compositions may be employed. In one embodiment the primers comprise one or more polymers that are elastic (i.e., have viscoelasticity), such as those that comprise the binder used in the first component of the coating compositions described herein (e.g., SBCs). In one embodiment, the primer comprises one or more polymers that are elastic (i.e., have viscoelasticity, e.g., SBCs) and a tackifier. In one embodiment, the primer is a PLASTI DIP™ metal primer f938hp.

In one embodiment, when a tackifier is employed, it may be selected from resins (e.g. rosins and their derivates; terpenes and modified terpenes; aliphatic, cycloaliphatic and aromatic resins (C5 aliphatic resins, C9 aromatic resins, and C5/C9 aliphatic/aromatic resins); hydrogenated hydrocarbon resins (e.g., Regalrez™ 1094, Eastman Chemical Co., Kingsport Tenn.), and mixtures thereof and/or terpene-phenol resins). In one embodiment the tackifier is an ester of hydrogenated rosin (e.g., FORAL™ 105-E ester of hydrogenated rosin).

In other embodiments the primer is an elastomeric primer comprising triblock copolymers of styrene and ethylene/butylene and an ester of a hydrogenated thermoplastic rosin (e.g., FORAL™ 105-E, Eastman Chemical). The polystyrene content of the triblock copolymers will typically be from about 8% to about 14%, from about 12% to about 20%, from about 18% to about 28%, from about 22% to about 32%, from about 26% to about 36%, about 8%, about 9%, about 10%, about 11%, about 12%, about 13%, about 14%, about 16%, about 18%, about 19%, about 20%, about 22%, about 24%, about 26%, about 28%, about 30%, about 32%, about 34%, or about 36%. Mixtures of any two or more, three or more, or four or more of such triblock copolymers may also be employed in the primer composition, and any one or more of such triblock copolymers may optionally comprise 1% to 3%, 1.4% to 2.0%, 1% to 1.4%, 1.6% to 3%, or 2% to 3% bound maleic anhydride (maleated copolymers). Any of the foregoing triblock copolymers may be linear or branched (e.g., dendrimers or arborols).

In one embodiment wherein the elastomeric primer comprises triblock copolymers of styrene and ethylene/butylene and an ester of a hydrogenated thermoplastic rosin, the primer comprises two different maleated triblock copolymers of styrene and ethylene/butylene with a polystyrene: a first triblock copolymer of styrene and ethylene/butylene with a polystyrene having 0.4% to 1.6% (e.g., 0.5% to 1.5%, 0.6% to 1.4,% or 0.7% to 1.3%) substitution of maleic anhydride by weight of the first triblock copolymer (and optionally less than 0.3% free maleic anhydride); and a second triblock copolymer of styrene and ethylene/butylene with a polystyrene having 1.1% to 2.5% (e.g., 1.3 to 2.3 or 1.4 to 2.4%) substitution of maleic anhydride by weight of the second triblock copolymer. In such an embodiment the first and/or second triblock copolymers may be linear or branched copolymers (e.g., arborols or dendrimers), and the second triblock copolymers may be present in a weight ratio from about 4:1 to about 6.5:1 (e.g., the first copolymer to second copolymer ratio is about 4:1 to about 5.5:1, about 5:1 to about 6:1, or about 5.5:1 to about 6.5:1). The ratio of the total triblock copolymer (first and second) to the ester of a hydrogenated thermoplastic rosin is typically 1:5 to 2.5:5 (triblock copolymers: ester(s) of hydrogenated thermoplastic rosin). Ratios for all three components include 7:1:25, 7.2:1.3:25, 7.6:1.6:25, and 8:1.8:25 (first triblock copolymer: second triblock copolymer: ester of a hydrogenated thermoplastic rosin).

In any of the foregoing embodiments the primers may also comprise insubstantial amounts (e.g., less than about 2% by weight of the polymers present in the binder, such as less than 1.0%, 0.75%, 0.5%, 0.25%, or 0.1%) of colorants or particulates that are insoluble in the solvents that dissolve the elastomeric polymers and/or that would block the transmission of visible light in the dried cured coating (e.g., talc added for the flowability of particles of the polymers as produced).

In any of the foregoing embodiments the primers may also comprise first particles for texture development in the primer and/or the base coat (i.e., a base coat of elastomeric binder with or without first particles).

In another embodiment, when a tackifier is employed it may be a hydrocarbon resin. In one embodiment where hydrocarbon resins are employed, they may be selected from resins such as those prepared from petroleum based feedstocks (e.g., aliphatic (C5), aromatic (C9), DCPD (dicyclopentadiene) resins, or mixtures of these).

Elastomeric primers not only promote bonding to substrate surfaces such as metals, but also provide for improved adhesion to the base coat. In addition, such primers compensate for differences in the coefficient of thermal expansion between the HP/OP coating and the substrate.

In other embodiments, primers comprise polyurethane polymers. Such polyurethane containing primers ("polyurethane primers") demonstrate excellent bonding to many substrates including metallic substrates. When employing a polyurethane primer, it is possible to incorporate first particles into the primer and/or the base coat (a base coat of elastomeric binder with or without first particles) for texture development. Thus, in addition to promoting adhesion, the primer can also serve to develop texture with increased surface area for improved adhesion of the base coat comprising an elastomeric binder, develop wear resistance, and develop hydrophobicity/oleophobicity. The HP/OP coatings applied over the elastomeric primers or two part polyurethane primers described herein display essentially equal resistance to the loss of hydrophobicity in Taber Abraser wear/abrasion resistance tests (as measured by Taber Abraser cycles) when abrasive (CS-10) and soft (CS-0) wheels are employed.

5.0 Coating Application Method:

The coatings described herein (including any underlying primer) can be applied to surfaces using any means known in the art including, but not limited to, brushing, painting, printing, stamping, rolling, dipping, spin-coating, spraying, or electrostatic spraying. In one embodiment, one or more of a primer, base coat and/or top coat are applied by spraying. In another embodiment, each of a primer (if present), base coat and top coat are applied by spraying.

In one embodiment the first and second coating compositions described herein are separately prepackaged in a delivery system/apparatus for spray applications, such as aerosol canisters (e.g., pre-pressurized aerosol cans). In such an embodiment, the first component and second component can be packaged in separate delivery systems/apparatus. A propellant is added to the system/apparatus that serves to drive the components out of their canisters for delivery. Propellants will typically be a gas at 25° C. and 1 atmosphere, but may be in a different phase (liquid) under pressure, such as in a pressurized aerosol delivery system. The propellant may be a gas (e.g., air or nitrogen) or a liquefiable gas having a vapor pressure sufficient to propel and aerosolize the first and/or second components as they exit their delivery system/apparatus). Some exemplary propellants include: liquefied petroleum gases, ethers (e.g., dimethyl ether (DME) and diethyl ether); C1-C4 saturated hydrocarbons (e.g., methane, ethane, propane, n-butane, and isobutene); hydrofluorocarbons (HFC) (e.g., 1,1,1,2-tetrafluoroethane (HFC-134a), 1,1,1,2,3,3,3,-heptafluoropropane (HFC-227HFC), difluoromethane (HFC-32), 1,1,1-trifluoroethane (HFC-143a), 1,1,2,2-tetrafluoroethane (HFC-134), and 1,1-difluoroethane (HFC-152a)), and mixtures comprising any two, three or more of the foregoing. In another embodiment, the propellant is a blend of n-butane and propane.

Generally, the surfaces will be rigid or semi-rigid, but the surfaces can also be flexible, for example in the instance of wires, tapes, rubberized materials, gaskets, and ribbons.

The coatings described herein can be applied to virtually any substrate to provide HP/OP properties. The choice of coatings and coating processes that will be used may be affected by the compatibility of the substrate and its surface to the coating process and the component of the coating compositions. Among the considerations are the compatibility of the substrate and its surface with any solvents that may be employed in the application of the coatings and the ability of a desired coating to adhere to the substrate's surface.

Coatings may take any desired shape or form, limited only by the manner and patterns in which they can be applied. In some embodiments, the coating will completely cover a surface. In other embodiments the coating will cover only a portion of a surface, such as one or more of a top, side or bottom of an object. In one embodiment, a coating is applied as a line or strip on a substantially flat or planar surface. In such an embodiment the line or strip may form a spill-resistant border.

The shape, dimensions and placement of HP/OP coatings on surfaces can be controlled by a variety of means including the use of masks, which can control not only the portions of a surface that will receive a coating, but also the portions of a surface that may receive prior treatments such as the application of a primer layer or cleaning by abrasion or solvents. For example, where sandblasting or a chemical treatment is used to prepare a portion of a surface for coating, a mask resistant to those treatments would be selected (e.g., a mask such as a rigid or flexible plastic, resin, or rubber/rubberized material). Masking may be attached to the surface through the use of adhesives, which may be applied to the mask agent, the surface, or both.

In another embodiment HP/OP coatings are applied to a ribbon, tape or sheet that may then be applied to a substrate by any suitable means including adhesive applied to the substrate, the ribbon or tape, or both. Ribbons, tapes and sheets bearing a superhydrophobic coating may be employed in a variety of applications, including forming spill proof barriers on surfaces. Ribbons, tapes, and sheets are generally formed of a substantially flat (planar) flexible material where one side (the top) is made hydrophobic or superhydrophobic. This includes metal sheets, ribbons, and tapes such as aluminum tape or other tapes (e.g., metal adhesive tape, plastic adhesive tape, paper adhesive tape, fiberglass adhesive tape), wherein one side is coated with an HP/OP coating and adhesive is applied to the other side. Once such HP/OP ribbons, tapes, and sheets are prepared, they can be applied to any type of surface including metal, ceramic, glass, plastic, or wood surfaces, for a variety of purposes.

In one embodiment, HP/OP coatings are applied to the surface of an object by a method comprising:

(a) applying a first component to all or part of the surface of an object; followed by (b) applying a second component to all or the part of the surface of said object to which said first component was applied.

In another embodiment, HP/OP coatings are applied by a coating method comprising:

(a) applying a first component of a two-component coating composition to all or part of the surface of an object; followed by (b) applying a second component of the two-component coating composition to all or the part of the surface of said object to which said first component was applied.

In such an embodiment, the first component and second component may be applied using one or more methods selected independently from brushing, painting, printing, stamping, rolling, dipping, spin-coating, or spraying. Such a process is at least a two-step process, but may include additional steps, such as a second application of the second component making it a three or more step process.

In an embodiment, one or both of the first and second components are applied to a surface by spraying in a method comprising:

(a) spraying a first component of a two-component coating composition (e.g., an elastomeric binder and first particles) on all or part of the surface of an object; followed by (b) spraying a second component of said two-component coating composition (e.g., second particles and optionally a solvent) on all or part of the surface of an object to which said first component was applied. In one embodiment, the spraying may be conducted using first, second, or both components packaged in aerosol spray canisters.

In an embodiment of the above-described coating process, a base coat of elastomeric polymer binder and first particles (e.g., EXPANCEL particles) is applied as the first component. Once the base coat loses sufficient solvent so that it: does not run when a second component is applied; is close to being dry to touch (e.g., is tacky); becomes dry to touch; or is dry, a second coating component (e.g., second particles and an optional dispersant such as acetone) is applied. The solvent in the dispersant helps attach the functional second particles to the binder of the base coat. Other than allowing any solvent used as a dispersant to evaporate no additional curing cycle is needed.

The coating obtained is durable and delivers HP/OP behavior and can be applied to a variety of substrates including metals, ceramics, polymerics and fabrics and in a number of specific applications as set forth below.

6.0 Applications:

The elastomeric coating described herein may be employed in a variety of applications including, but not limited to, coatings for all or part of:

1) electronic equipment and their electronic components or subassemblies (e.g., circuit boards), including, but not limited to: cell phones, laptop computers, electronic tablets (e.g., iPads), cameras, video games, Global Positioning System (GPS) devices, radios, MP3 and electronic music players, watches, video equipment, security systems, satellite dishes and other portable electronics;

2) shoes (e.g., athletic shoes, casual shoes, dress shoes) and apparel for medical and recreational use;

3) toys such as toy vehicles (e.g., trucks, cars), bikes, scooters, playground equipment (e.g., swings, slides, teeter-totters), water toys, and toys for use in bathtubs;

4) cleaning products—toilet brushes, toilet plungers, mops, dust mops and cloths;

5) furniture and cooking preparation and serving surfaces including both indoor and outdoor furniture (e.g., lawn/patio furniture and park furniture such as tables, chairs and benches) or employed as spill resistant borders on surfaces that are substantially horizontal.

6) pet products (e.g., litter boxes, litter scoopers, drinking and food bowls, collars, litter particles, animal beds);

7) farm tools and home and garden tools including shovels, spades, and rakes;

8) outdoor and exercise equipment (e.g., skis, snow boards), balls, in-line skates, roller skates);

9) appliances—portions or entire refrigerator plates (e.g., spill proof borders), freezer liners, parts in washing machines, dishwashers, dehumidifiers, humidifiers, and dryers;

11) baby/toddler products (e.g., car seats, potty seats, bibs, silverware (made from plastics), cups, plates and diapers (or parts thereof);

12) food and beverage containers (e.g., bottles and containers for beverages, water, food);

13) sports equipment including balls (e.g., baseballs, tennis balls, footballs, soccer balls), gloves, backpacks, and tents;

14) bedding (sheets, mattresses, pillows, blankets);

15) food processing equipment and kitchen equipment including coatings and/or spill resistant borders for counters, backsplashes, the walls behind counters where food is prepared, and abattoirs (e.g., wall coatings and/or curtains used to section off a slaughter floor);

16) superhydrophobic body spray;

17) automotive parts (e.g., bumpers, internal plastic parts, engine parts, structural parts, fender well (wheel well) liners, and car seats, particularly for convertibles);

18) protective equipment (e.g., helmets, pads, and uniforms);

19) building products (e.g., rain spouts, doors, counters (polymer), flooring, ceilings, screens, and roofing);

20) laboratory equipment (e.g., trays, storage bins, tools, petri dishes, funnels, tubing and animal cages);

21) electrical equipment (e.g., electrical housings, electrical wiring, motors, switches, insulators, and circuit boards);

22) communications equipment (e.g., satellite dishes, antennas, and communications towers);

23) plastic and/or metal tubing and piping (e.g., PVC piping, copper piping, plastic and steel piping);

24) lavatory/bathroom equipment and fixtures (e.g., urinals, toilets, toilet seats, air and/or heat hand drying equipment, potty seat bowls, counters, sinks, and soap dispensers);

25) medical products including: beds and bed parts, bed pans, tubing, tubular products, catheters, stents, surgical tools and operating room equipment (such as robotic surgical tools), operating room equipment (e.g., tables, light fixtures), walls, floors, sinks, imaging equipment/machinery, laboratory testing equipment/machinery, and medical instruments (e.g., medical instruments used in surgical and nonsurgical applications);

26) wound care products, spray-on bandages, regular bandages, and body affecting products (e.g., skin and/or hair spray; and
27) aviation and boating equipment (e.g., airplane fuselage, wings and instrumentation), and boat bottoms, decks, and other places throughout a boat.

Use of the coating can be facilitated by providing the first and second components for preparing the coatings described herein in a form that permits facile application. In one embodiment the first and/or second components are prepackaged in solvent or propellant delivery systems such as aerosol canisters (e.g., aerosol cans).

7.0 Coating Evaluation

Figure 4:
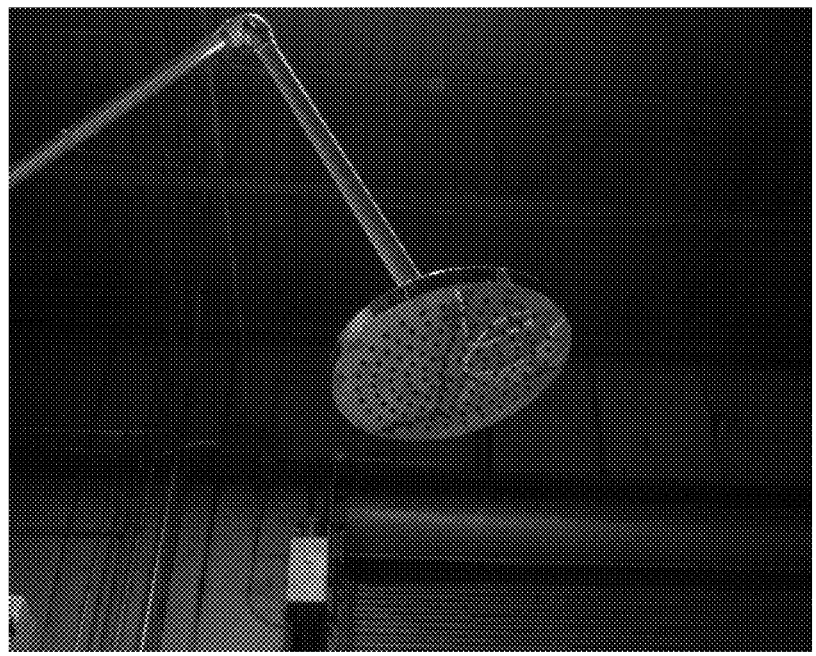
FIG. 4 depicts a shower test apparatus. The upper panel shows the showerhead with 70 nozzles with a 1 mm diameter orifice arranged in 5 spokes of 5 nozzles and 15 spokes of 3 nozzles about a central point on a circular showerhead. For testing the showerhead delivers approximately 6 liters of potable tap water per minute using about 137900 Pa (Pascals) to 310275 Pa. The lower panel depicts a sample, which is placed about 1.5 meters below the showerhead and subject to the shower.
Figure 4:
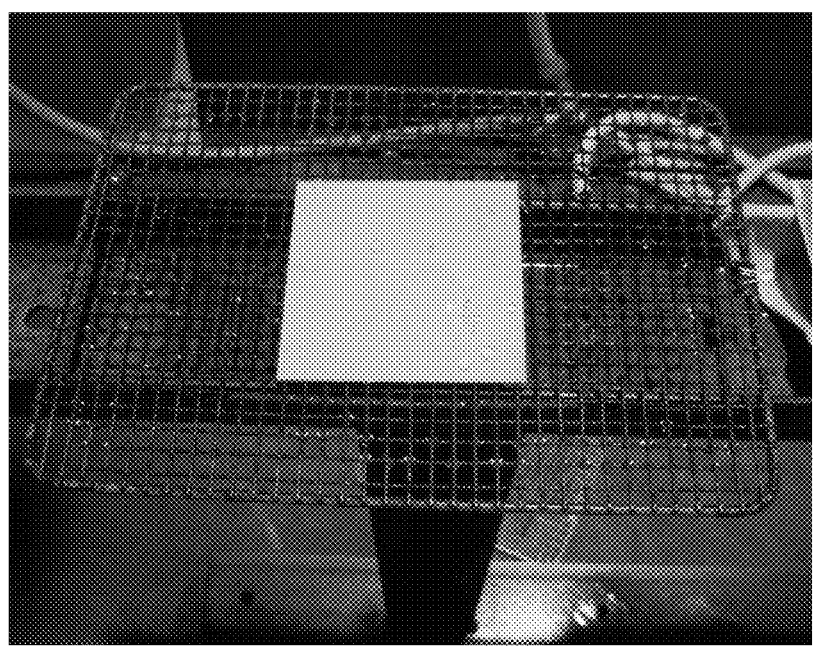

Coatings prepared using the elastomeric binder first component and second coating composition described herein can be evaluated using one or more criteria including, but not limited to:
1. transparency and appearance, which are evaluated both quantitatively and qualitatively;
2. durability of the SH/OP behavior (wear resistance of the coating) to an applied force using:
   2a. semi-quantitative glove rub test in which the thumb of a latex rubber gloved hand is stroked by hand over the surface of the coating that has been applied to a substantially planar surface until the coating no longer shows superhydrophobic behavior. This test is a proxy for the ability of the surface to be handled and retain its HP/OP properties. During the test, the area of the surface contacted with the rubber glove is approximately 25 mm×25 mm and the force applied approximately 300 g (or about 0.5 g/square mm). The end of superhydrophobic behavior is judged by the failure of more than half of the water droplets applied (typically 20) to the tested surface to run (roll) off when the surface is inclined at 5 degrees from horizontal. FIG. 4 shows an exemplary testing apparatus used to determine the end of SH/OP,
   2b. loss of superhydrophobic behavior can also be judged after the surface is subject to the action of a cylindrical rubber finger moved across the surface. The finger is rubbed across the surface using a motorized American Association of Textile Chemists and Colorists (AATCC) CM-5 Crockmeter fitted with a 14/20 white rubber septum (outside diameter of 13 mm and inside diameter of 7 mm with a contact surface area of 94 mm$^2$) to contact the coating with a force of 9N (Ace Glass, Inc., Vineland, N.J., Catalog No. 9096-244). The end of superhydrophobic behavior is judged by the failure of more than half of the water droplets applied to the tested surface (typically 20 droplets) to run (roll) off when the surface is inclined at 5 degrees from horizontal,
   2c. loss of superhydrophobic behavior when the samples are subject to Taber Abraser testing using CS-10 (abrasive) and/or CS-0 (non-abrasive) wheels at the indicated loads and speeds to determine the point at which the surfaces lose superhydrophobicity. Unless indicated otherwise, a load of 1,000 g is employed. All Taber tests were conducted at a speed of 95 rpm unless stated otherwise. The end of superhydrophobic behavior is judged by the failure of more than half of the water droplets applied to the tested surface (typically 20) to run (roll) off when the surface is inclined at 5 degrees from horizontal,
   2d. time to the loss of superhydrophobicity under a shower of water. Water is applied from a showerhead placed 152.4 cm (60 inches) above a substantially planar test surface inclined at 5 degrees from the horizontal, the showerhead having 70 nozzles with a 1 mm diameter orifice arranged in 5 spokes of 5 nozzles and 15 spokes of 3 nozzles about a central point on the circular showerhead. The apparatus delivers a shower of 6 liters of water per minute using about 137900 to about 310275 Pa (about 20 to about 45 psi) over an approximately circular area of about 150 cm in diameter at the level of the test surface. The time to loss of superhydrophobic behavior is determined to be the period of time after which water droplets from the shower begin to "stick" to the surface (no longer freely run off the surface) of a sample placed in the shower;
3. coating thickness and/or surface roughness, expressed as the average roughness (Ra) unless stated otherwise. Surface roughness has been found to be an indicator that positively correlates with abrasion resistance (increasing abrasion resistance with increasing roughness);
4. the ability of coated surfaces to resist ice formation in dynamic testing and the adherence of ice to surfaces;
5. electrical properties including resistance and permittivity'
6. oleophobicity, using either the contact angle of light mineral oil with the coating or by assessing the interaction of droplets of various liquid hydrocarbons having different surface tensions employed in the ATCC 118-1997 Oil Repellancy test with the coating surface. For testing, a coating is applied to a 4×4 inch substantially planar plate. After the plate has dried and cured it is placed on a 5±1 degree slope relative to the horizontal and five droplets of a test hydrocarbon are applied beginning with Kaydol™ (available from CBM Group of N.C. Inc., 1308 N. Ellis Ave., Dunn N.C. 28334). When droplets stick to the coating or wet the coating, the Score (Oil Repellency Grade Number) is assigned. Thus, Kaydol™ droplets rolling off earns a value of 1 or greater, 65:35 Kaydol™: n-hexadecane droplets rolling off earns a value of 2 or greater, and so on. All test are conducted at room temperature.

| Score (Oil Repellency Grade Number) | hydrocarbon |
|---|---|
| 0 | None (Fails Kaydol ™) |
| 1 | Kaydol ™ (mineral oil) |
| 2 | 65:35 Kaydol ™:n-hexadecane |
| 3 | n-hexadecane |
| 4 | n-tetradecane |
| 6 | n-dodecane |
| 6 | n-decane |
| 7 | n-octane |
| 8 | n-heptane |

The oleophobicity of first or second particles (e.g., fumed silica treated with a silane, silazane, silanol, siloxane, fluorinated versions thereof, etc.) can be tested in the same manner. In such tests the first and/or second particles are applied to a clean 4×4 inch aluminum plate by spraying a suspension containing 2% particles 98% acetone by weight to form a coating of particles that cover the aluminum plate. After the plate has dried, the above-listed hydrocarbon liquids are tested on the particle coatings in the same manner as they would be on an elastomeric coating, and the particles scored in the same manner.

8.0 Certain Embodiments

Embodiment 1, has is divided into two sub-embodiments, that are recited below as embodiments 1.1. and 1.2. In embodiment 1.1 the second component comprises second particles and one or more solvents, but does not require a fluoropolymer. In contrast, the second component of sub-embodiment 1.2 requires not only second particles, but also a fluorinated polyolefin and/or a Fluoroethylene-Alkyl Vinyl Ether (FEVE) copolymer, and one or more solvents. In subsequent embodiments, any reference to embodiment 1 refers to either embodiment 1.1 and/or 1.2.

Embodiment 1.1 A combination of components for forming a coating comprising:
- A) a first component which comprises:
  - i) an elastomeric binder comprising one or more styrenic block copolymers, wherein said elastomeric binder comprises from about 1% to about 30% of said one or more styrenic block copolymers by weight (e.g., about 1% to about 5%, about 5% to about 10%, about 10% to about 15%, about 15% to about 25%, or about 25% to about 30% of said one or more styrenic block copolymers);
  - ii) optionally, one or more independently selected first particles having a size of about 30 microns to about 225 microns, wherein, when said first particles are present, the first component comprises from about 0.01% to about 5% of said first particles by weight (e.g., about 0.01% to about 5%, about 0.03% to about 1%, about 0.05% to about 0.15%, about 0.1% to about 2.5%, or about 0.2% to about 5% of said first particles by weight); and
  - iii) one or more independently selected solvents; and
- B) a second component which comprises:
  - i) one or more independently selected second particles having a size of about 1 nanometer to about 25 microns, wherein said second particles comprise one or more independently selected alkyl, haloalkyl, or perfluoroalkyl moieties bound, either directly or indirectly, to said second particles; and
  - ii) optionally, one or more independently selected solvents, wherein when said one or more solvents are present, said second particles may be present in a weight percent range selected from (0.1-1, 1.0-2.0, 0.2-2.0, 0.5-1.5, 0.5-2.0, 0.75-2.5, 1.5-2.0, 1.5-2.5, 2.0-3.0, 2.0-3.5, or 2.5-3.5) based on the weight of the one or more solvents and second particles.

Embodiment 1.2 A combination of components for forming a coating comprising:
- A) a first component which comprises:
  - i) an elastomeric binder comprising one or more styrenic block copolymers, wherein said elastomeric binder comprises from about 1% to about 30% of said one or more styrenic block copolymers by weight (e.g., about 1% to about 5%, about 5% to about 10%, about 10% to about 15%, about 15% to about 25%, or about 25% to about 30% of said one or more styrenic block copolymers);
  - ii) optionally, one or more independently selected first particles having a size of about 30 microns to about 225 microns, wherein, when said first particles are present, the first component comprises from about 0.01% to about 5% of said first particles by weight (e.g., about 0.01% to about 5%, about 0.03% to about 1%, about 0.05% to about 0.15%, about 0.1% to about 2.5%, or about 0.2% to about 5% of said first particles by weight); and
  - iii) one or more independently selected solvents; and
- B) a second component which comprises per 100 parts by weight:
  - i) 0.1 to 3.5 parts by weight (e.g., 0.1-1, 1.0-2.0, 0.2-2.0, 0.5-1.5, 0.5-2.0, 0.75-2.5, 1.5-2.0, 1.5-2.5, 2.0-3.0, 2.0-3.5, or 2.5-3.5) of one or more independently selected second particles having a size of about 1 nanometer to about 25 microns, wherein said second particles comprise one or more independently selected alkyl, haloalkyl, or perfluoroalkyl moieties bound, either directly or indirectly, to said second particles, or one or more siloxanes or silazanes associated with said second particles;
  - ii) 0.1 to 1.0 parts by weight (e.g., 0.1-0.5, 0.5-1.0, or 0.3-0.7 parts) of a fluorinated polyolefin, (e.g., a polymer of tetrafluoroethylene, hexafluoropropylene and vinylidene fluoride, such as Dyneon™ THV); and/or
    0.06 to 0.6 parts by weight (e.g., 0.06-0.0.1, 0.1-0.2, 0.2-0.4, or 0.4-0.6 parts) of a Fluoroethylene-Alkyl Vinyl Ether (FEVE) copolymer, having an average molecular weight of about 1,000 to 3,000 (e.g., about 1,000-2,000, 2,000-3,000, 1,500-2,500, or about 1,000, 1,500, 2,000, 2,500, or 3,000 Da); and
  - iii) one or more independently selected solvents for a the remainder of a total of 100 parts by weight.

2. The combination of embodiment 1, wherein one or more of the styrenic block copolymers has a rubber phase crosslinked to the polystyrene phase.

3. The combination according to any of embodiments 1 to 2, wherein one or more of the styrenic block copolymers has a rubber phase comprising polybutadiene, polyisoprene, polyolefin or a mixture of any of those rubber phase components (e.g., linear triblock copolymers of styrene and ethylene/butylene with a polystyrene content of about 8% to about 36% by weight (e.g., about 8% to about 12%, about 12% to about 18%, about 18% to about 24%, about 24% to about 30%, about 30% to about 36%, about 10% to about 20%, or about 8%, about 9%, about 10%, about 11%, about 12%, about 13%, about 14%, about 15%, about 17%, about 19%, about 20%, about 22%, about 24%, about 26%, about 28%, about 30%, about 32%, about 34%, about 36%) or mixtures of any two or more, three or more, or four or more of such triblock copolymers, any one or more of which may optionally comprise 1% to 3% or 1.4% to 2.0% maleic anhydride).

4. The combination according to any of embodiments 2 to 3, wherein said rubber component comprises 60%-98%, 60%-70%, 70%-80%, 60%-90%, 80%-90%, 83%-93%, 85%-95%, or 89%-98%, of the elastomer by weight (based on the dry weight of the elastomer present in the first component not including any contribution by the first particles or other materials present in that component).

5. The combination according to any of embodiments 1 to 4, wherein said first component further comprises one or more colorants, UV stabilizers, antioxidants, rheological agents, and/or fillers.

6. The combination according to any of embodiments 1 to 5, wherein said first component further comprises up to 30% by weight of one or more tackifiers (e.g., 1%-5%, 2%-8%, 5%-10%, 10%-15%, 15%-20%, 20%-25%, or 25%-30%).

7. The combination of embodiment 6, wherein said one or more styrenic block copolymers and said one or more tackifiers together comprise up to about 30% by weight of said first component (e.g., up to about 10, 15, 20, 25, or 30%).

8. The combination according to any of embodiments 1 to 7, wherein said elastomeric binder comprises one, two, three, or more triblock copolymers.

9. The combination according to any of embodiments 1 to 8, wherein said elastomeric binder comprises one or more styrenic block copolymers of styrene and ethylene/butylene with a polystyrene content of about 8% to about 36% by weight (e.g., about 8% to about 14%, about 12% to about 20%, about 18% to about 28%, about 22% to about 32%, about 26% to about 36%, about 8%, about 9%, about 10%, about 11%, about 12%, about 13%, about 14%, about 16%, about 18%, about 19%, about 20%, about 22%, about 24%, about 26%, about 28%, about 30%, about 32%, about 34%, about 36%), or mixtures of any two or more, three or more, or four or more of such triblock copolymers.
10. The combination according to any of embodiments 1 to 9, wherein one or more of said styrenic block copolymers present in the elastomeric binder comprise maleic anhydride (e.g., maleated copolymers having 1% to 3%, 1.4% to 2.0%, 1% to 1.4%, 1.6% to 3%, or 2% to 3% maleic anhydride based on the weight of the copolymer).
11. The combination according to any of embodiments 1 to 10, wherein at least one, or at least two, of said one or more styrenic block copolymers is a linear copolymer or a branched copolymer (e.g., a dendrimer or arborol).
12. The combination according to any of embodiments 1 to 11, wherein the elastomeric binder comprises a first and a second maleated triblock copolymer of styrene and ethylene/butylene wherein:
said first maleated triblock copolymer of styrene and ethylene/butylene has a polystyrene content from about 8% to about 14%, with 0.4% to 1.6% (e.g., 0.5% to 1.5%, 0.6% to 1.4%, or 0.7% to 1.3%) substitution (content by weight) of maleic anhydride by weight of the first triblock copolymer (and optionally less than 0.3% maleic anhydride free); and
said second maleated triblock copolymer of styrene and ethylene/butylene has a polystyrene content of about 22% to about 32%, with 1.1% to 2.5% (e.g., 1.3% to 2.3% or 1.4% to 2.4%) substitution of maleic anhydride by weight of the second triblock copolymer.
13. The combination of embodiment 12, wherein said first and/or second triblock copolymers are independently selected linear or branched (e.g., arborols or dendrimers) copolymers.
14. The combination according to any of embodiments 12 to 13, wherein said first and second triblock copolymers may be present in a weight ratio from about 4:1 to about 6.5:1 (e.g., the first copolymer to second copolymer ratio is:about 4:1 to about 5.5:1; about 5:1 to about 6:1; or about 5.5:1 to about 6.5:1).
15. The combination according to any of embodiments 1-14, wherein said first particles are selected from the group consisting of: glass, ceramic, rubber, plastic, thermoplastic, wood, cellulose, metal oxides, silicon dioxide, silicates, tectosilicates, germanium dioxide, plastic particles, carbide particles, nitride particles, boride particles (e.g., zirconium or titanium boride), spinel particles, diamond particles, fly ash particles, fibers and hollow glass spheres, hollow glass particles or hollow plastic particles (e.g., glass, polymer, plastic or thermoplastic particles, spheres, or microspheres), wherein said first particles optionally comprise a colorant (e.g., colored or pigmented glass particles, plastic particles, rubber particles, hollow glass or hollow plastic particles).
16. The combination according to any of embodiments 1 to 15, wherein said first particles comprise hollow glass or plastic particles (e.g., glass, polymer, plastic or thermoplastic particles or microspheres), and wherein said first particles optionally comprise a colorant.
17. The combination according to embodiment 16, wherein said hollow glass or hollow plastic particles have a size (average diameter) in a range selected from the group consisting of 5 to 50 microns, 6 to 45 microns, 5 to 20 microns, 20 to 35 microns, and 35 to 50 microns.
18. The combination according to any of embodiments 15 to 17, wherein said hollow plastic particles have a density selected from the group consisting of less than 60 $kg/m^3$, less than 50 $kg/m^3$, less than 40 $kg/m^3$, less than 30 $kg/m^3$, or less than 25 $kg/m^3$, and wherein said hollow glass particles have a density selected from the group consisting of less than 125 $kg/m^3$, less than 150 $kg/m^3$, less than 200 $kg/m^3$, less than 250 $kg/m^3$, less than 300 $kg/m^3$, less than 350 $kg/m^3$, less than 400 $kg/m^3$, less than 450 $kg/m^3$, less than 500 $kg/m^3$, less than 550 $kg/m^3$, less than 600 $kg/m^3$, or 600 $kg/m^3$.
19. The combination according to any of embodiments 1 to 18, wherein the second particles have an average size in a range selected from the group consisting of from: about 1 nm to about 100 nm; about 10 nm to about 200 nm; about 20 nm to about 400 nm; about 10 nm to 500 nm; about 40 nm to about 800 nm; about 100 nm to about 1 micron; about 200 nm to about 1.5 microns; about 500 nm to about 2 microns; about 500 nm to about 2.5 microns; about 1 micron to about 10 microns; about 2 microns to about 20 microns; about 2.5 microns to about 25 microns; about 500 nm to about 25 microns; about 400 nm to about 20 microns; and about 100 nm to about 15 microns.
20. The combination according to any of embodiments 1 to 19, wherein said second particles comprise a metal oxide, an oxide of a metalloid (e.g., silica), a silicate, or a glass.
21. The combination according to any of embodiments 1 to 20, wherein said second particles are comprised of silica and have an average size in a range selected from: about 1 nm to about 50 nm; about 1 nm to about 100 nm; about 1 nm to about 400 nm; about 1 nm to about 500 nm; about 2 nm to about 120 nm; about 5 nm to about 150 nm; about 5 nm to about 400 nm; about 10 nm to about 300 nm; or about 20 nm to 400 nm.
22. The combination according to any of embodiments 1 to 21, wherein said second particles have an average size in the range of from 1 nm to 100 nm or from 2 nm to 200 nm.
23. The combination according to any of embodiments 1 to 22, wherein said second particles comprise one or more hydrophobic and/or oleophobic moieties.
24. The combination according to any of embodiments 1 to 23, wherein said second particles comprise one or more alkyl, fluoroalkyl, and/or perfluoroalkyl moieties that are covalently bound to the second particles directly, or bound indirectly through one or more atoms bound to the second particles.
25. The combination according to any of embodiments 1 to 24, wherein said one or more hydrophobic or oleophobic moieties result from contacting the second particles with one or more silanizing agents of formula (I):

$$R_{4-n}Si-X_n \qquad (I)$$

where n is an integer from 1 to 3;
each R is independently selected from
(i) alkyl or cycloalkyl group optionally substituted with one or more fluorine atoms,
(ii) $C_{1\ to\ 20}$ alkyl optionally substituted with one or more substituents independently selected from fluorine atoms and $C_{6\ to\ 14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents, (iii) $C_{2\text{ to }8}$ or $C_{6\text{ to }20}$ alkyl ether optionally substituted with one or more substituents independently selected from fluorine and $C_{6\text{ to }14}$ aryl groups, which aryl groups are optionally substituted with one or more independently selected halo, $C_{1\text{ to }10}$ alkyl, $C_{1\text{ to }10}$ haloalkyl, $C_{1\text{ to }10}$ alkoxy, or $C_{1\text{ to }10}$ haloalkoxy substituents, (iv) $C_{6\text{ to }14}$ aryl, optionally substituted with one or more substituents independently selected from halo or alkoxy, and haloalkoxy substituents, (v) $C_{4\text{ to }20}$ alkenyl or $C_{4\text{ to }20}$ alkynyl, optionally substituted with one or more substituents independently selected from halo, alkoxy, or haloalkoxy, and (vi) —Z—$((CF_2)_q(CF_3))_r$, wherein Z is a $C_{1\text{ to }12}$ or a $C_{2\text{ to }8}$ divalent alkane radical or a $C_{2\text{ to }12}$ divalent alkene or alkyne radical, q is an integer from 1 to 12, and r is an integer from 1 to 4;

each X is independently selected from —H, —Cl, —I, —Br, —OH, —OR², —NHR³, or —N(R³)₂ group;

each R² is an independently selected $C_{1\text{ to }4}$ alkyl or haloalkyl group; and each R³ is an independently selected H, $C_{1\text{ to }4}$ alkyl, or haloalkyl group.

26. The combination according to embodiment 25, wherein each R is selected independently from:
   (a) an alkyl or fluoroalkyl group having from 6 to 20 carbon atoms;
   (b) an alkyl or fluoroalkyl group having from 8 to 20 carbon atoms;
   (c) an alkyl or fluoroalkyl group having from 10 to 20 carbon atoms;
   (d) an alkyl or fluoroalkyl group having from 6 to 20 carbon atoms when n is 2 or 3;
   (e) an alkyl or fluoroalkyl group having from 8 to 20 carbon atoms when n is 2 or 3; and
   (f) an alkyl or fluoroalkyl group having from 10 to 20 carbon atoms when n is 2 or 3.

27. The combination according to any of embodiments 25 to 26, wherein R is —Z—$((CF_2)_q(CF_3))_r$, wherein Z is a $C_{1\text{ to }12}$ divalent alkane radical or a $C_{2\text{ to }12}$ divalent alkene or alkyne radical, q is an integer from 1 to 12, and r is an integer from 1 to 4.

28. The combination according to any of embodiments 25 to 27, wherein n is 1, 2, or 3.

29. The combination according to any of embodiments 25 to 28, wherein all halogen atoms present in any one or more R groups are fluorine atoms.

30. The combination according to any of embodiments 25 to 29, wherein each X is independently selected from —H, —Cl, —OR₂, —NHR³, and —N(R³)₂.

31. The combination according to any of embodiments 25 to 30, wherein each X is independently selected from —Cl, —OR₂, —NHR³, and —N(R³)₂.

32. The combination according to any of embodiments 25 to 31, wherein each X is independently selected from —Cl, —NHR³, and —N(R³)₂.

33. The combination according to any of embodiments 1 to 32, wherein two, three, four, or more than four compounds of formula (I) are employed alone or in combination to modify at least one second particle; or wherein said second particles incorporated into said second component have an Oil Repellancy Grade Number greater than or equal to about 1, 2, 3, 4, 5, 6, 7, or 8 when measured as a coating applied to a metal plate in the absence of a binder.

34. The combination according to any of embodiments 1 to 33, wherein said second particles are treated with a silanizing agent selected from the group consisting of: tridecafluoro-1,1,2,2-tetrahydrooctyl)silane; (tridecafluoro-1,1,2,2-tetrahydrooctyl)trichlorosilane; (tridecafluoro-1,1,2,2-tetrahydrooctyl)triethoxysilane; (tridecafluoro-1,1,2,2-tetrahydrooctyl)trimethoxysilane; (heptadecafluoro-1,1,2,2-tetrahydrodecyl)dimethyl(dimethylamino)silane; (heptadecafluoro-1,1,2,2-tetrahydrodecyl)tris(dimethylamino)silane; n-octadecyltrimethoxysilane; n-octyltriethoxysilane; and nonafluorohexyldimethyl(dimethylamino)silane.

35. The combination according to any of embodiments 1 to 34, wherein said second particles are treated with a silanizing agent selected from the group consisting of dimethyldichlorosilane, hexamethyldisilazane, octyltrimethoxysilane, polydimethylsiloxane, and (tridecafluoro-1,1,2,2-tetrahydrooctyl)trichlorosilane.

36. The combination according to any of embodiments 1 to 35, wherein said first component and/or said second component further comprise an independently selected solvent and/or propellant.

37. The combination of embodiment 36, wherein said solvent is an organic solvent or a mixture of two or more organic solvents, and wherein either said organic solvent or said mixture of two or more organic solvents comprises less than 10%, 5%, 2%, or 1% of water by weight.

38. The combination of embodiment 36 or 37, wherein said solvent or propellant comprises greater than 1%, greater than 2%, greater than 5%, up to 10%, up to 20%, or greater than 20% by weight of any one, two, three or more of each of air, nitrogen, an inert gas, an alkane, a ketone, an ether, a halogenated alkane, a halogenated alkene, an aromatic hydrocarbon, an alcohol, methane, ethane, propane, butane, pentane, hexane, heptane, ethylene, propene, acetone, methyl isobutyl ketone (MIKB), methyl ethyl ketone (MEK), dimethylether (DME), diethylether, methyl ethyl ether, methyl tert-butyl ether, chloromethane, dichloromethane, carbontetrachloride, trichlorofluoromethane, dichlorodifluoromethane, methanol, ethanol, propanol, butanol, benzene, toluene, xylene, 1-chloro-4-(trifluoromethyl)-benzene, carbon disulfide, and isomers of any of the foregoing, based upon the total weight of solvent or propellant present in the composition.

39. The combination according to any of embodiments 1 to 38, wherein either the first component and/or second component further comprise a colorant or pigment.

40. The combination according to any of embodiments 1 to 39, wherein said elastomeric binder has an ultimate strength greater than about 20, 21, 22, 23, 24, 26, 28, 30, 32, or 34 Mega Pascals (MPa) (e.g., greater than about 2,500, 2,750, 2,800, 2,900, 3,000, 3,200, 3,500, 3,750, 4,000, 4,250, 4,500, 4,750, or 4,900 psi) according to ASTM D412.

41. A method of forming a hydrophobic coating on a portion of a surface comprising the following steps:
   (a) applying a first component according to any of embodiments 1 to 40 to at least a portion of the surface, wherein the portion of the surface has optionally been treated with a primer (e.g, an elastomeric primer) on all or part of the surface to which said first component is to be applied; and
   (b) applying a second component according to any of embodiments 1 (i.e., 1.1 or 1.2) to 40 to all or a portion of the portion coated in step (a),
   wherein said coating has either hydrophobic or superhydrophobic properties, and optionally is also oleophobic or superoleophobic.

42. The method of embodiment 41, wherein said steps of applying said first component and applying said second component are conducted by methods selected independently from painting, printing, stamping, rolling, dipping, spin-coating, spraying, and electrostatic spraying.

43. A coating prepared by the method according to any of embodiments 41 to 42.

44. The coating of embodiment 43, wherein said coating is superhydrophobic and/or superoleophobic.

45. The coating according to any of embodiments 43 to 44, wherein said coating has an ultimate strength greater than about 20, 21, 22, 23, 24, or 26 mega Pascals (MPa) (e.g., greater than about 2,500, 2,750, 2,800, 2,900, 3,000, 3,200, 3,500, or 3,750 psi) according to ASTM D412.

46. The coating according to any of embodiments 43 to 45, wherein said coating has a modulus at 100% elongation of greater than 10, 11, 12, or 13 mega Pascals (MPa) (e.g., greater than about 1,700, about 1,750, about 1,800, or about 1,850 psi) according to ASTM D412.

47. The coating according to any of embodiments 43 to 46, having an elongation at break of greater than about 100%, 110%, 120%, 140%, 160%, 180%, 200%, 250%, 300%, 350%, 400%, or 420%.

48. The coating according to any of embodiments 43 to 47, having a relative electrical permittivity at 100 MHz from about 0.2 to about 4 at about 22° C. (e.g., a relative electrical permittivity from about 0.2 to about 1, from about 1 to about 2, from about 2 to about 3, or from about 3 to about 4) as measured by ASTM D150 using a 0.11 mm thick film.

49. The coating according to any of embodiments 43 to 48, having a Total Luminous Transmittance of about 75% to about 85% and a haze of about 85% to about 90% as measure by ASTM D1003-11 on a film about 25 microns thick.

50. The coating according to any of embodiments 43-49, wherein said coating is superhydrophobic and retains its superhydrophobicity after being subjected to greater than 20, 25, 30, 40, 50, 60, 70, 80, 90, or 100 cycles on a Taber Abraser using CS-0 or CS-10 wheels and a 250 gram load at 95 rpm at room temperature, wherein the end of superhydrophobicity is determined to be the point when more than half of the water droplets applied to the portion of the surface subject to the action of the wheels do not roll off the surface when the surface is inclined at a 5 degree angle at room temperature.

51. The coating according to embodiment 50, wherein said coating retains its superhydrophobicity after being subjected to greater than 20, 25, 30, 40, 50, 60, 70, 80, 90, or 100 cycles on a Taber Abraser using CS-0 or CS-10 wheels and a 1,000 gram load at 95 rpm at 20° C.-25° C., wherein the end of superhydrophobicity is determined to be the point when more than half of the water droplets applied to the portion of the surface subject to the action of the wheels do not roll off the surface when the surface is inclined at a 5 degree angle at room temperature.

52. The coating according to any of embodiments 43 to 51, wherein said coating is superhydrophobic and when said coating is applied to a planar surface, it continues to display superhydrophobic behavior after being subjected to a continuous shower test of about six liters of water per minute at about 20° C.-25° C. for greater than 0.3, 0.5, 0.6, 1, 2, 3, or 3.5 hours, wherein the duration of superhydrophobic behavior is determined to be the time when more than half of the water droplets applied to a portion of the surface subject to said shower do not roll off the surface when it is inclined at a 5 degree angle at room temperature, wherein the shower test is conducted using a showerhead with 70 nozzles with a 1 mm diameter orifice arranged in 5 spokes of 5 nozzles and 15 spokes of 3 nozzles about a central point on a circular showerhead, and wherein the showerhead delivers approximately 6 liters of potable tap water per minute using about 137900 Pa (Pascals) to 310275 Pa (20-45 psi cycle over 5 minutes), and wherein the coating placed about 1.5 meters below the showerhead.

53. The coating of embodiment 52, wherein, when said coating is subjected to said continuous shower test for a period of time sufficient to lose superhydrophobic behavior, the coating regains superhydrophobic behavior following drying at 20° C. to 25° C. and one atmosphere of pressure, said shower testing and drying collectively comprising a single test cycle.

54. The coating of embodiment 53, wherein said coating regains superhydrophobic behavior following more than 5, 10, 15, 20, 30, 40, 50, 75, 100, 150, or 200 of said test cycles.

55. A method according to embodiment 41 or 42, wherein applying according to step (b) is repeated to at least a portion of the coated surface if that portion of the coated surface loses said hydrophobic, superhydrophobic, oleophobic and/or superoleophobic properties, and wherein following the repetition of step (b), the coated portion regains hydrophobic, superhydrophobic, oleophobic and/or superoleophobic properties.

56. A method according to embodiment 41 or 42, wherein both steps (a) and (b) are repeated on at least a portion of the coated surface if that portion of the coated surface loses said hydrophobic, superhydrophobic, oleophobic and/or superoleophobic properties, and wherein following the repetition of steps (a) and (b), the coated portion regains hydrophobic, superhydrophobic, oleophobic and/or superoleophobic properties.

57. A coated surface, or a portion thereof, resulting from the process of embodiment 55 or 56.

58. A product comprising an aerosol spray container (e.g., a metal canister) containing a first component according to any of embodiments 1 to 40 and a propellant.

59. The product of embodiment 58, wherein the aerosol spray container comprises a valve assembly, a dip tube, and an actuator.

60. A product comprising an aerosol spray container (e.g., a metal canister) containing a second component according to any of embodiments 1 to 40 and a propellant.

61. The product of embodiment 60, wherein the aerosol spray container comprises a valve assembly, a dip tube, and an actuator.

62. A product comprising an aerosol spray container according to embodiment 58 or 59, and a second aerosol spray container according to embodiment 60 or 61.

9.0 EXAMPLES

Example 1

An HP/OP Elastomeric Coating

One part by weight of elastomeric coating (24% by weight of solids) supplied as clear liquid from PLASTI DIP™ International, Inc. (Blaine, Minn.) is combined with two parts by weight of xylene and mixed. The mixture of elastomer and xylene is divided into six aliquots and the indicated amounts of EXPANCEL 461 DET d25 (0.01% to 0.5% by weight based on the total weight of the elastomer and xylene mixture)

is added to separate aliquots. The aliquots are mixed to form first component compositions. The first component compositions are sprayed onto individual aluminum plates to form a base coat. The base coated aluminum plates are then top coated with a second component consisting of a 2% (w/w) dispersion in acetone of fumed silica particles modified to render them hydrophobic by reacting them with tridecafluoro tetrahydroctyl trichloro silane (fumed silica to silane ration is 2:1 by weight). Test data for plates is summarized in the table below and the data is plotted in FIG. 5. Coatings formed from PLASTI DIP™ elastomer have a tensile strength of 3,740 psi (ASTM D-638), salt spray resistance greater than 1,000 hours (ASTM B-117) and elongation at break of 430% (ASTM D-638) without added first or second particles.

Data on HP/OP Elastomeric Coatings from Example 1

| EXPANCEL wt % | Glove Rubs | Approximate Taber Abraser Cycles to loss of SH behavior CS-0 wheel CS-10 wheel ( ) | Shower (hr)* |
|---|---|---|---|
| 0.01% | 100 | 22 (13) | |
| 0.03% | 325 | 72 (43) | 1 |
| 0.06% | 700 | 156 (93) | 2 |
| 0.10% | 750 | 167 (100) | 3.5 |
| 0.30% | 500 | 111 (67) | 3.5 |
| 0.50% | 400 | 89 (53) | 3.5 |

Taber cycles estimated based upon a value of 4.5 glove rubs per Taber cycle using CS-0 wheels and 7.5 glove rubs per Taber cycle (sample rotation) using CS-10 wheels. The number in parentheses is for the CS-10 data estimate. Taber load was 250 g.
*Shower test was terminated at 3.5 hours.

Figure 5:
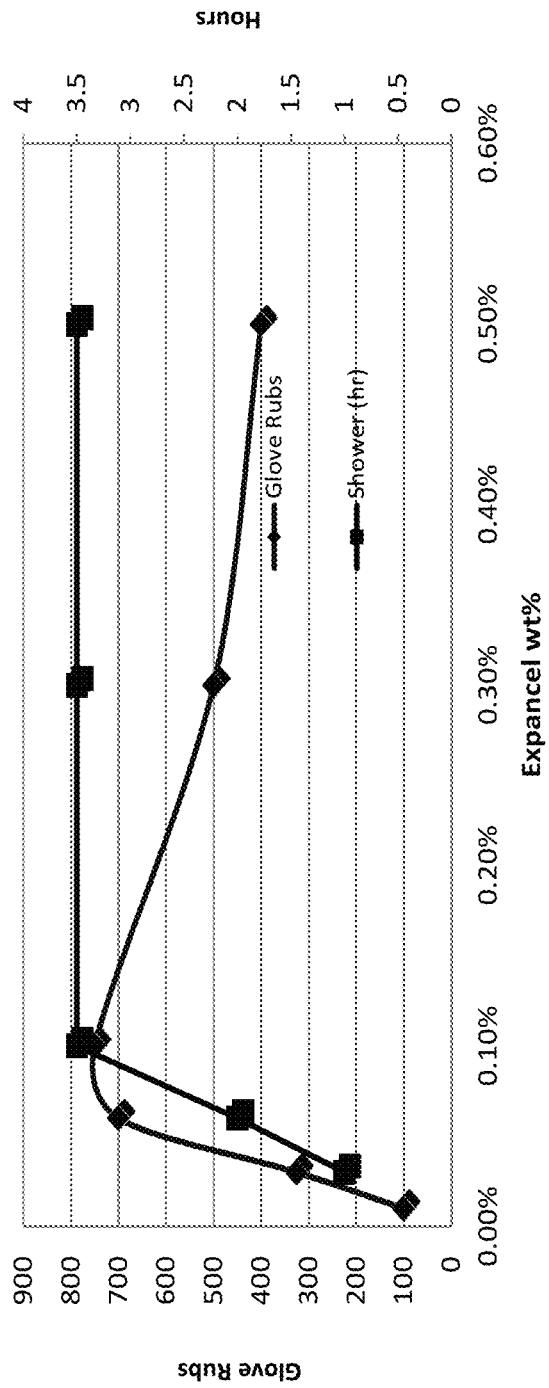
FIG. 5 shows a plot of "glove rubs," which are an estimate of the surface resistance to the loss of either or both of HP or OP properties as a function of percentage of EXPANCEL first particles employed in a nearly transparent coating prepared without colorants. The glove rub estimates tend to trend in the same direction as loss of HP or OP properties due to handling, abrasion resistance, and/or the shower time. The weight percent of EXPANCEL particles is given as the percentage of the base coat formulation weight as opposed to a dry weight basis (see Example 1).

Data in the table above and FIG. 5 show that the abrasion resistance (glove rub performance and estimated Taber cycles) reaches a maximum when about 0.1% of EXPANCEL particles are incorporated into the base coat. Shower time to loss of superhydrophobicity also increases with increasing amounts of EXPANCEL particles incorporated in the base coat. Shower time to loss of superhydrophobic behavior saturates beyond 0.1% addition.

Example 2

Six first component mixtures are prepared as in Example 1 using 0.1% of five different types of EXPANCEL particles (duplicate samples containing EXPANCEL 031 DU 400), and the first components are each applied to a different aluminum plate by spraying to form a base coat. The base coating on each plate is then top coated with a second component comprising a 2% (w/w) dispersion of fumed silica particles treated with tridecafluoro tetrahydroctyl trichlorosilane suspended in acetone. For samples containing EXPANCEL 031 DU 400) the aluminum plates were heated to 80° C. for 2-3 minutes either before or after the application of the second component to expand the EXPANCEL particles. Test data for the plates are summarized in the table of performance data, below, and plotted in FIG. 6.

Performance Data by Using 0.1% by Weight of Different EXPANCEL Particles in Elastomeric Coating

| EXPANCEL type | Glove Rubs | Taber Abraser Cycles to loss of SH behavior | Shower (hr) |
|---|---|---|---|
| 461 DET d25 | 800 | 178 (106) | 4 |
| 461 DE 40 d25 | 500 | 111 (67) | 2.5 |
| 461 DET 40 d25 | 650 | 144 (87) | 4 |
| 920 DE 80 d30 | 400 | 89 (53) | 2.5 |
| 031 DU 40 (heated before top coating) | 75 | 17 (10) | 0.5 |
| 031 DU 40 (heated after top coating) | 75 | 17 (10) | 0.5 |

Taber cycles estimated based upon a value of 4.5 glove rubs per Taber cycle using a 250 g load, CS-0 wheels and 7.5 glove rubs per Taber cycle (sample rotation) using CS-10 wheels. The number in parentheses is for the CS-10 data estimate.

Figure 6:
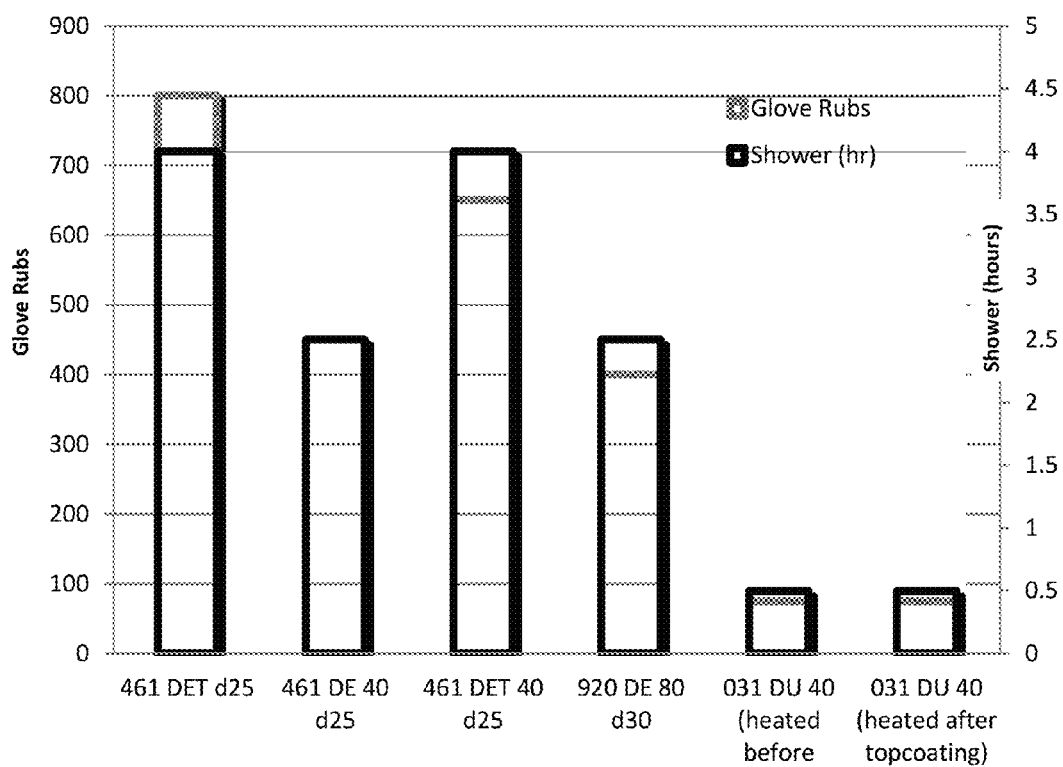
FIG. 6 shows the variation in the resistance to the loss of superhydrophobic behavior of an elastomeric binder system due to wear based on "glove rubs" and exposure to a shower of water using five different types of EXPANCEL particles. Duplicate samples containing EXPANCEL 031 DU 400 heated before or after the second component (referred to as "top coat") comprising hydrophobic fumed silica in acetone is applied. See Example 2 for details.

Data in the table above and FIG. 6 show that incorporation of EXPANCEL 461 DET d25 and EXPANCEL 461 DET 40 d25 produces a combination of resistance to the loss of HP/OP when being handled ("handleability" assessed by glove rubs and resistance to Taber abrasion testing), and shower time to loss of superhydrophobicity. Unexpanded EXPANCELs 031 DU 40 did not show good performance. The shower times track closely and positively correlate with glove rubs and Taber cycles (higher glove rubs correspond to higher shower time).

Example 3

Scaled Preparation of Fumed Silica Second Particles

A series of aluminum plates primed with PLASTI DIP™ primer for metals according to the manufacturer's instructions are base coated as in Example 1, with 0.1% EXPANCEL 461 DET d25 particles added to the first component, which is applied by spraying. After the base coat has dried at room temperature, one set of plates is treated with a second component as in Example 1. The second component comprises 20 g of 20-80 nm fumed silica particles having a surface area of about 200m²/g (Evonik Industries, Horsham PA), treated in an Osterizer kitchen blender for 10minutes at room temperature with 10 g of tridecafluoro tetrahydroctyl trichloro silane. A second set of plates is also treated with a second component as in Example 1, using silica from the same supplier prepared in a larger batch using 5,000 g of the silica reacted with tridecafluoro tetrahydroctyl trichloro silane 2,500 g in a 10 kg reactor system at room temperature for 2-3 hours. In this example, after top coats are applied the plates are dried for 15 minutes at 170° F. (77° C.). Two plates treated with fumed silica prepared in the blender and two plates treated with fumed silica prepared in the reactor are subjected to thickness and surface roughness measurements. The point at which the plates lose superhydrophobic behavior is also determined using Taber Abraser equipped with CS-0 wheels at a 1,000 g load and using glove rub testing. Loss of superhydrophobic behavior is deemed to be the point at which more than half of the water droplets applied to the tested portion of a substantially planar surface inclined at 5 degrees from the horizontal do not roll off the plate.

Data on plates coated with fumed silica particles prepared in the blender is summarized in Table 7, and data on plates treated with fumed silica prepared in the reactor is shown in Table 8.

TABLE 7

Blender Grade NPT 74

| | Coating Thickness (mils) Sample #1 | Ra Sample #1 | Coating Thickness (mils) Sample #2 | Ra Sample #2 |
|---|---|---|---|---|
| | 0.73 | 2.61 | 1.1 | 3.267 |
| | 0.67 | 2.66 | 1.01 | 3.337 |
| | 0.49 | | 0.82 | |
| | 0.76 | | 1.08 | |
| Avg | 0.6625 | 2.635 | 1.0025 | 3.302 |
| Glove Rubs | 600 | | | |
| Taber Abraser cycles to loss of SH | | | 50 | |

TABLE 8

Reactor Grade NPT 74

| | Coating Thickness (mils) Sample #1 | Ra Sample #1 | Coating Thickness (mils) Sample #2 | Ra Sample #2 |
|---|---|---|---|---|
| | 0.92 | 3.246 | 1.07 | 3.027 |
| | 1.35 | 3.259 | 0.94 | 2.35 |
| | 0.88 | | 0.86 | |
| | 1.01 | | 0.88 | |
| Avg | 1.04 | 3.2525 | 0.9375 | 2.6885 |
| Glove Rubs | 900 | | | |
| Taber Abraser cycles to loss of SH | | | 30 | |

The data in Tables 7 and 8 indicate that superhydrophobic coatings prepared with fumed silicas produced in reactors on different scales display similar properties.

Example 4

Transparency and Haze

Glass plates are coated with a near transparent coating based on elastomeric binder systems as in Example 1 with the exception that the plate marked P does not include first particles (EXPANCEL particles) in the base coat (first component). The plate marked SE-1 contains 0.1% of EXPANCEL particles in the first component. Samples are tested for Haze value and Total Luminous Transmittance (TLT) values using the method described in ASTM D1003. The instrument is calibrated without a sample present using air as a standard. Calibration values are TLT=100 and Haze=0. Clear, clean, uncoated glass plates have average readings of TLT=90.6 and a haze reading of 0.18. Plates lacking first particles (P-coat) have about the same transparency as clear clean glass. The presence of EXPANCEL particles in the base coat reduces the transparency by about 10%. The coating haze increases from about 0.18 for glass to about 61% for coatings without first particles and to about 90% for coatings including EXPANCEL particles in the base coating. See Table 9.

TABLE 9

| | Reading 1 | Reading 2 | Reading 3 | Average Readings |
|---|---|---|---|---|
| P-Coat Sample (no first particles) | | | | |
| Transmittance | 90.50 | 90.30 | 90.40 | 90.4 |
| Haze | 60.70 | 62.40 | 60.80 | 61.30 |
| SE-1 Sample (first particles included in the base coat) | | | | |
| Transmittance | 80.00 | 79.10 | 80.10 | 79.73 |
| Haze | 88.60 | 90.80 | 89.30 | 89.57 |

Example 5

Effect of Coating Thickness

Figure 7:
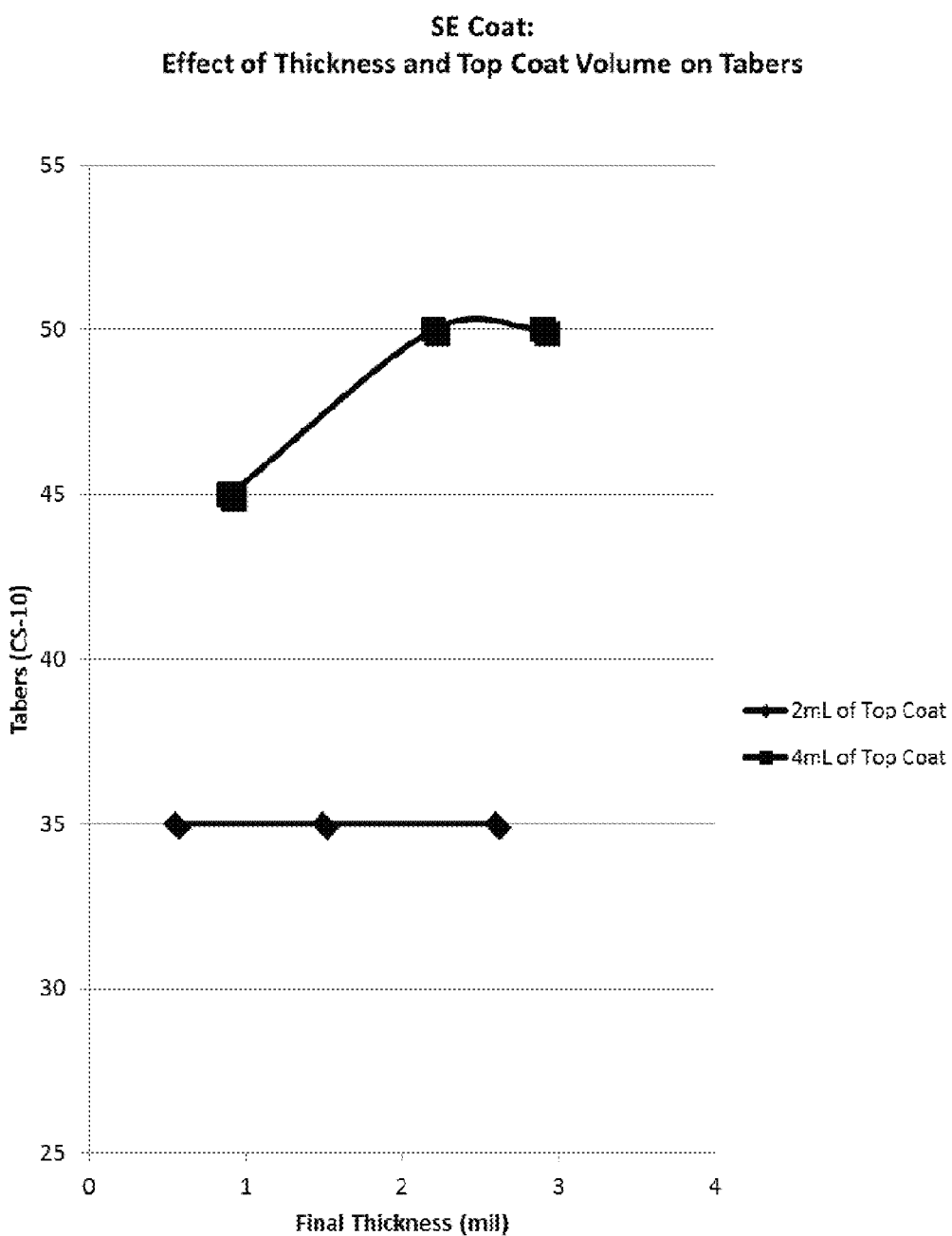
FIG. 7 shows the effect of coating thickness on coating resistance to the loss of superhydrophobic behavior due to wear based on Taber Abraser testing using a 1,000 g load and CS-10 wheels on 10×10 cm plates treated with 2 or 4 ml of top coat (second component) applied over the base coating. See Example 5 for details.
Figure 8:
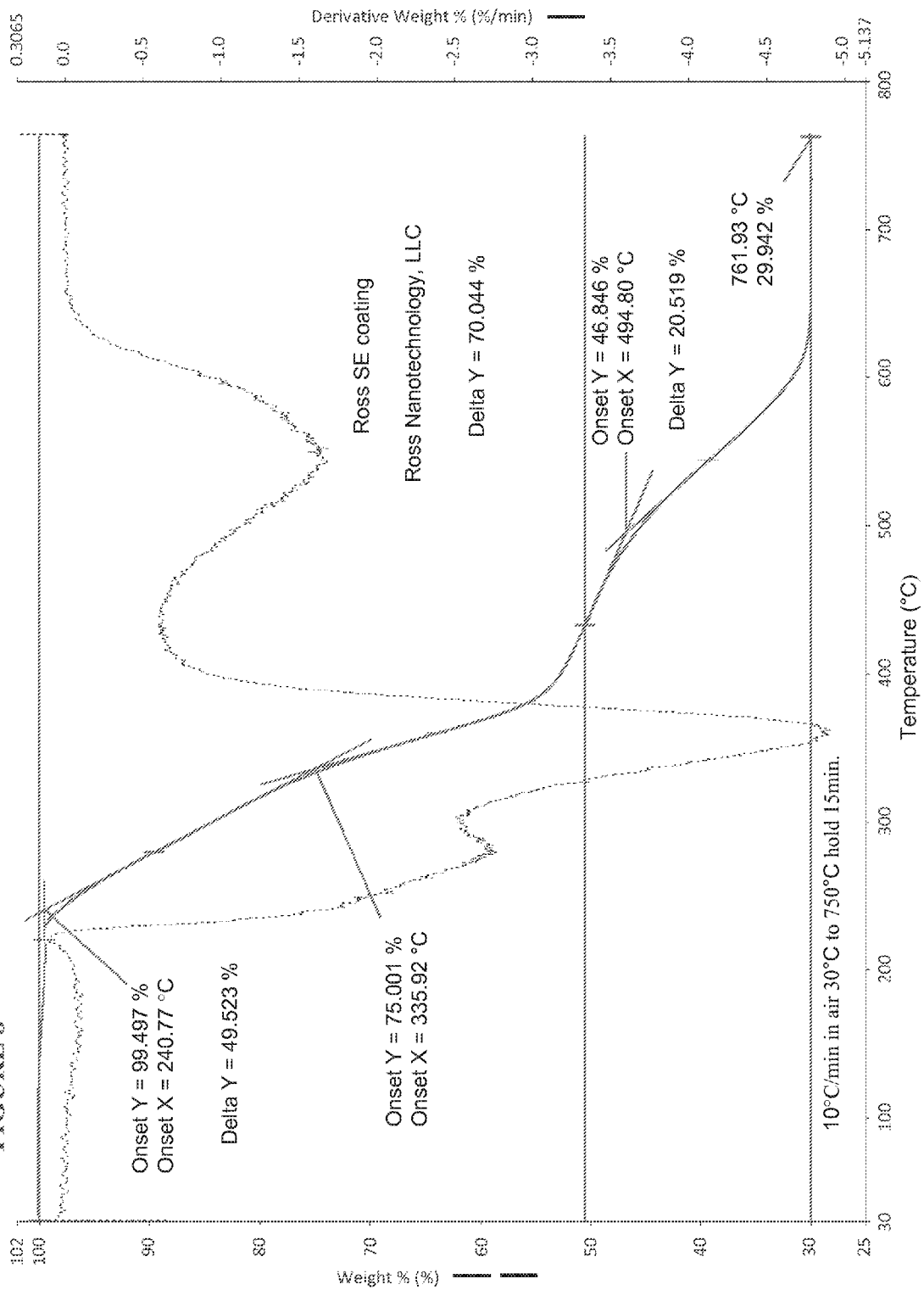
FIG. 8 shows Thermogravimetric Analysis (TGA) data for a nearly transparent elastomeric coating incorporating EXPANCEL461 EXPANCEL DE 40 D 25 microspheres.
Figure 9:
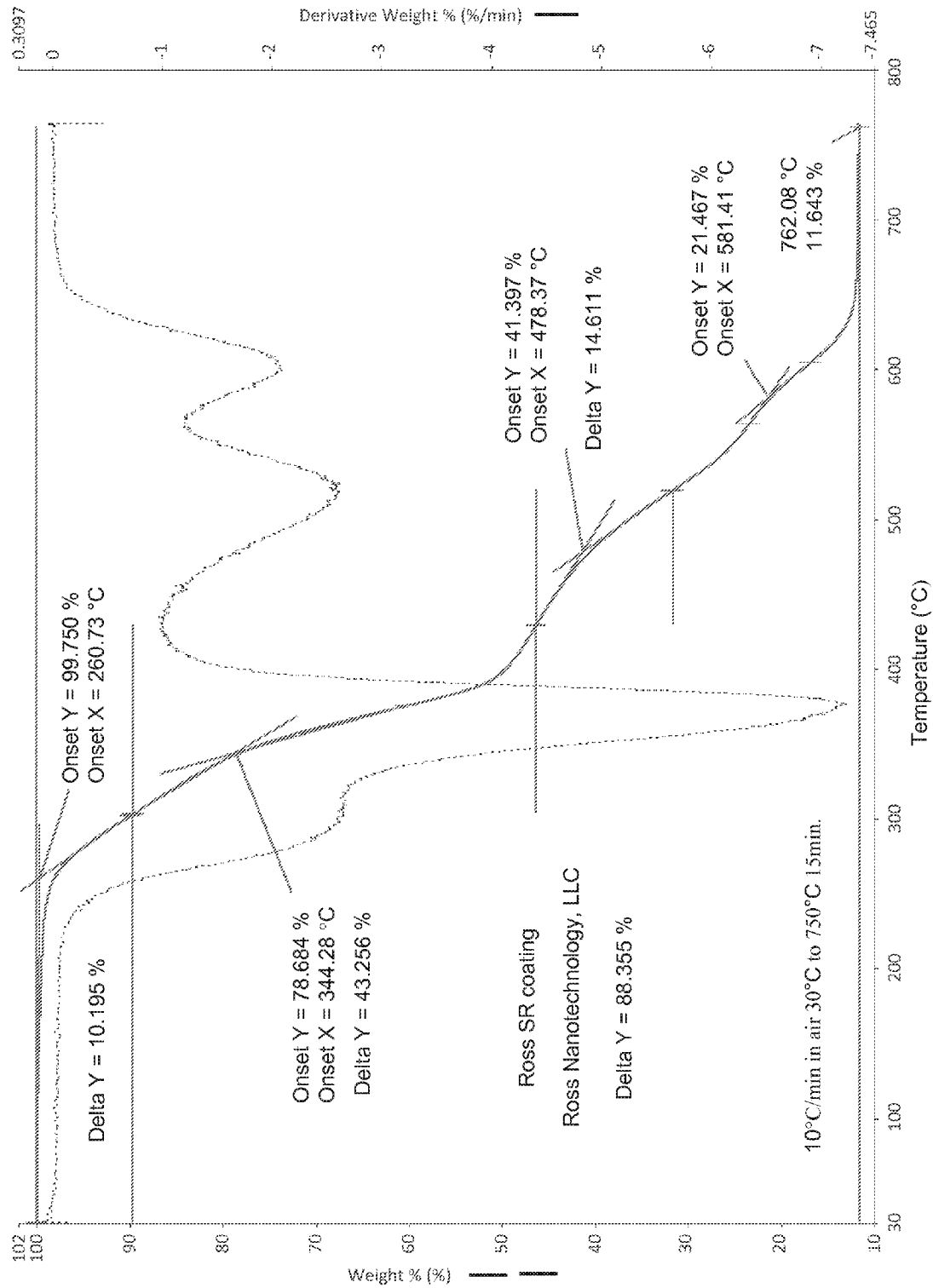
FIG. 9 shows TGA data for an embodiment of a non-transparent HP/OP elastomeric coating incorporating Soft-Sand™ rubber particles.

Six aluminum plates (10 cm×10 cm) are primed with PLASTI DIP™ primer for metal (product f938 hp). Pairs of the primed plates are spray coated with first component as in Example 1 (0.1% EXPANCELs) to achieve a base coat thicknesses of about 1, 1.5, or 2.6 ml respectively. One plate at each coating thickness is top coated with 2 ml of the second component as described in Example 1, and the second plate at each coating thickness is top coated with 4 ml of second component. Coating thicknesses, which include the primer thickness, and Taber Abraser data are summarized in Table 10A and data is plotted in FIG. 7.

TABLE 10A

Data summary for plates made with varying coating thicknesses

| Sample | Volume of Topcoat (mL) | Passes of Base Coat | Final Thickness (mil) | Tabers (CS-10) to end of super-hydrophobicity | Notes |
|---|---|---|---|---|---|
| 1.1 | 2 | 1 | 0.55 | 35 | some tearing |
| 2.1 | 2 | 3 | 1.5 | 35 | no tearing |
| 3.1 | 2 | 5 | 2.6 | 35 | no tearing |
| 1.2 | 4 | 1 | 0.9 | 45 | some tearing |
| 2.2 | 4 | 3 | 2.2 | 50 | no tearing |
| 3.2 | 4 | 5 | 2.9 | 50 | no tearing |

Based on the data above, 2 ml of top coat (0.02 ml/cm$^2$) produces no benefits in performance improvement at any thickness. However, when the top coat is increased to 4 ml (0.04 ml/cm$^2$), it provides an adequate performance that increases with coating thickness. While not wishing to be bound by any theory, it appears that at the higher application rate the top coat penetrates to some depth into the base coat. When only 2 ml (0.02 ml/cm$^2$) is applied the coating may be sufficient to just cover the base coat, but not enough to permit the second particles to penetrate at any significant level that will increase the durability of SH performance. In addition, when the base coat is very thin, tearing becomes the failure mode.

Example 6

Effect of Priming with Polyurethane Primer

Aluminum plates are primed with a two-part polyurethane coating (DESMOPHEN 670BA with DESMODUR N75 BA-XBMS, Bayer Material Science) prepared and applied per manufacturer's instructions. An elastomeric coating as described in Example 1 (0.1% of EXPANCEL 461 DET d25) is employed in the first component. Coated plates are measured for coating thickness (including primer thickness) and their ability to resist the loss of superhydrophobic behavior using a Taber Abraser fitted with CS-10 (abrasive) wheels and CS-0 (soft rubber) wheels at a 1,000 g load is recorded. All end points for loss for superhydrophobic behavior are measured for water droplet roll off with the plates inclined at 5 degrees from the horizontal (5 degree tilt angle). Test data is summarized in Table 10B.

TABLE 10B

Summary of data on Al plates primed with two-part polyurethane as primer

|  | Sample | | |
| --- | --- | --- | --- |
|  | 1 | 2 | 3 |
|  | Total Coating and Primer Thickness (mils) | Total Coating and Primer Thickness (mils) | Total Coating and Primer Thickness (mils) |
|  | 3.25 | 3.13 | 4.7 |
|  | 3.13 | 3.06 | 4.9 |
|  | 3 | 3.1 | 4.16 |
|  | 3.32 | 3.45 | 4.24 |
|  | 4.15 | 4.01 | 4.47 |
| Avg Thickness | 3.37 | 3.35 | 4.494 |
|  | CS-10 Wheel | CS-0 Wheel | Glove Rubs |
| Tabers CS-10 | 40 | | |
| Tabers CS-0 | | 40 | |
| Glove Rubs | | | >1000 |

Example 7

Nearly Transparent HP/OP Elastomeric Coating with Various First Particles

Elastomeric coatings are prepared on aluminum test plates as described in Example 1, with the exception that the first component contains first particles as indicated in Table 11. The test plates are assessed for loss of superhydrophobic behavior using glove rubs as a rapid test for assessment of handleability and abrasion resistance/durability. Test data for all coated plates are summarized in Table 11.

TABLE 11

Summary of data for non near transparent elastomeric binder system based coatings

| Particle Designation | Particle Type | Particle Size (micron) | Amount weight (%) | Glove Rubs (#s) | Taber Abraser Predicted cycles with CS-0 wheel* |
| --- | --- | --- | --- | --- | --- |
| EXPANCEL DET | Thermo-plastic Encapsulated with gas | 10-40 | 0.01 | 100 | 22 |
| EXPANCEL DET | Thermo-plastic Encapsulated with gas | 10-40 | 0.1 | 750 | 167 |
| EXPANCEL DET | Thermo-plastic Encapsulated with gas | 10-40 | 0.5 | 400 | 89 |
| Hollow Glass Spheres K25 | Hollow glass spheres | 25-90 | 0.5 | 800 | 178 |
| Hollow Glass Spheres K46 | Hollow glass spheres | 15-70 | 0.5 | >400 | >89 |

*Projected based on GR/CS-0 = 4.5

Thermoplastic particles and hollow glass particles yield similar performance in increasing coating durability.

Example 8

Non-Transparent Elastomeric Coatings Prepared with Micronized Rubber First Particles PLASTI DIP™ (24% solids by weight) elastomeric coating (5 parts by weight of the liquid as provided by the supplier) is combined with seven parts by weight of xylene and mixed. To the resulting mixture of elastomer and xylene, micronized rubber particles (Lehigh Technology, Tucker, Ga.) about 4% or about 7.7% by weight are added to separate aliquots (based on the weight of the elastomer and xylene combined). The particles are mixed into each aliquot to form first component compositions. The first component compositions are applied to separate aluminum plates to form base coats, and the base coats are top coated with a second component as described in Example 1.

Test data showing resistance to the loss of superhydrophobicity based on glove rub testing and Taber testing for the coatings incorporating rubber particles is provided in Table 12. That data shows the incorporation of elastomeric binder used in this example with micronized rubber particles produces highly durable surfaces that show increasing resistance to the loss of hydrophobicity with increasing amounts of rubber first particles incorporated into the binder up to at least 7.69%.

TABLE 12

Summary of data on non near transparent elastomeric binder based coatings

| Particle Designation | Particle Type | Particle Size (μm) | Amount weight (%) | Glove Rubs (#s) | Taber Abraser cycles with CS-0* |
| --- | --- | --- | --- | --- | --- |
| Micronized Rubber | Ground Rubber particles | 70 | 4 | 1450 | 191 |
| Micronized Rubber | Ground Rubber particles | 70 | 7.69 | 1800 | 237 |

*Projected based on GR/CS-0 wheel ratio of 7.6 for a 250 g load at 95 rpm.

Example 9

Non-Transparent Elastomeric Coating with Micronized Rubber Particles with and without Primer Elastomeric coatings are prepared as in Example 8 employing 7.69% of micronized rubber by weight in the first component. The coatings are applied to clean but unprimed aluminum plates or aluminum plates that have been treated with an elastomeric metal primer (PLASTI DIP™ metal primer) per the manufacturer's instructions. All plates are substantially planar. The top coating step is the same as in Example 8 and Example 1. The coated plates are assessed for resistance to the loss of SH behavior using a Taber Abraser fitted with CS-0 wheels or CS-10 wheels (as indicated) using 1,000 g loads at 95 rpm, resistance to the loss of SH behavior using glove rubs, and coating thickness, which is measured including primer where present. The appearance of coating failures is also recorded for each plate and the data set forth in Table 13.

TABLE 13

Observations from Taber Abraser Testing of Plates With and Without Primer

Coating Without Primer

| without primer | | Coating Thickness (mil) | Comments |
| --- | --- | --- | --- |
| Taber CS-0 | 6 cycles | 1.5 | Rips and Tears |
| Taber CS-10 | 10 cycles | 1.5 | Rips and Tears |
| Glove Rubs | 1200 | 1.5 | No Rips or Tears |
| With primer | | | |

Coating With Elastomeric Primer

| | with elastomeric primer | Coating Thickness (mil) | Comments |
| --- | --- | --- | --- |
| Taber CS-0 | 50 cycles | 1.75 | No Rips or Tears |
| Taber CS-10 | 40 cycles | 1.65 | No Rips or Tears |
| Glove Rubs | 1600 | 1.75 | No Rips or Tears |

The data indicates that samples with and without primer resist the loss of superhydrophobicity with a very large number of glove rubs. Taber Abraser testing results in a loss of that property due to ripping and/or tearing of the coating in the absence of primer. Loss of superhydrophobic behavior is assessed using the above-described droplet run off test with plates inclined at 5 degrees from the horizontal. Priming of the metal surfaces increases the number of Taber cycles the test samples can withstand without losing superhydrophobic behavior by about 4 to about 8 fold, regardless of whether non-abrasive rubber (CS-0) or abrasive (CS-10) wheels are employed.

Example 10

Thermal Stability of Elastomeric Coatings

Elastomeric coatings incorporating EXPANCELs as in Example 1, or micronized rubber as in Example 8, are scraped from their plates and used for thermogravimetric analysis (TGA). TGA data for the coatings is plotted in FIGS. 10 and 11, respectively. Details of the test conditions are listed inside each of the graphs. Data from these charts show the following:

1. The coating containing EXPANCEL is stable up to 241° C. (465° F.)
2. The coating containing micronized rubber is stable up to 261° C. (502° F.)

Based upon the data presented above the coatings may be used up to temperatures of 200° C. or 400° F.

Example 11

HP/OP Coatings Employing Varying Proportions of a Styrenic Block Copolymer and Tackifier Three styrenic block copolymers (SBCs), FG 1901, FG 1924 and RP 6670, each obtained from KRATON®, are dissolved in xylene at 20% by weight. Regalrez™ 1094 tackifier, obtained from Eastman Chemical Company, is dissolved in xylene at 20% by weight. Varying ratios of SBCs and tackifier solutions are mixed and UV stabilizers and antioxidants, 0.1% Irganox® 1520L, 0.056% Tinuvin® 328, and 0.056% Tinuvin® 770DF (% by weight), are added.

Each of the mixtures of SBCs and tackifier formed is used as a first component and HP/OP coatings are prepared as in Example 1, using 0.1% EXPANCEL particles as first particles. The HP/OP coatings were tested for durability using a Taber Abraser equipped with CS-10 wheels and a 1,000 g load. The results are shown in Table 14.

TABLE 14

| FG 1901/ Regalrez 1094 | | | FG 1924/ Regalrez 1094 | | | RP 6670/ Regalrez 1094 | | |
| --- | --- | --- | --- | --- | --- | --- | --- | --- |
| Ratio | Glove Rubs | Taber cycles | Ratio | Glove Rubs | Taber cycles | Ratio | Glove Rubs | Taber cycles |
| 43/57 | 300 | 35 | 25/75 | 300 | 30 | 25/75 | 500 | 30 |
| 50/50 | 400 | 40 | 50/50 | 750 | 35 | 33/66 | 500 | 40 |
| 57/43 | 550 | 45 | 66/33* | 800 | 20 | 50/50 | 750 | 45 |
| 66/33 | 1000 | 60 | | | | 66/33 | 1500 | 50 |
| 75/25* | 350 | 35 | | | | 75/25* | 1000 | 50 |
| 90/10* | 600 | 25 | | | | | | |
| 100/0* | 600 | 25 | | | | | | |

*Taber testing induced tearing.

Example 12

HP/OP Coatings Employing Maleated Styrene-Ethylene/Butylene-Styrene (SEBS) Block Copolymers Coatings were prepared using first components comprising maleated SBCs (e.g., maleated SEBS block copolymers)

TABLE 15

| Base Coat Component | Total Component Parts by Weight (Total of 100 parts) | Exemplary Composition Components (By weight where given) |
|---|---|---|
| Maleated SBC | 7 to 9 | One or more maleated Styrene-Ethylene/Butylene-Styrene (SEBS) Block Copolymers (e.g., Kraton FG 1901, FG 1924 and/or RP 6670♦) |
| Tackifier | 3.5 to 7 | Nonpolar hydrogenated hydrocarbon resin (e.g., produced by polymerization and hydrogenation of monomeric hydrocarbons) or esterified hydrogenated rosin. e.g., Eastman Regalrez ™ 1094 or Foral ™ 105E |
| Antioxidant(s) | 0.05 to 0.2 | Antioxidant(s) (e.g., phenolic or hindered phenolic antioxidants e.g., Irganox 1520L |
| First Particles | 0.05 to 20 | Expancel 461 DET 40 d25 (0.05-0.2%) SoftSand 5-15% Glass bubbles (e.g., K1, S22, or A16/500) 1%-10% |
| UV stabilizer(s) | 0.05 to 0.5 | e.g., Tinuvin ® 328 and/or 770DF |
| Solvent | Bring to 100 parts total including all other components | xylene (or mixed xylenes), acetone, n-hexane (or mixed hexanes), 1-chloro-4-(trifluoromethyl)-benzene or mixtures thereof |
| Top Coat Component | Parts by weight | Source |
| Reactor Grade NPT 74 | 0.05 to 6.0 (e.g., 2%) | Ross Technology -- see Example 3 |
| Solvent | Bring to 100 parts by weight total including all other components | xylene (including mixed xylenes or technical grade), acetone, n-hexane (or mixed hexanes), 1-chloro-4-(trifluoromethyl)-benzene or mixtures thereof |

♦RP 6670 is a maleated form of KRATON series A polymers, which are hydrogenated block copolymers having styrene copolymerized with ethylene/butylene in the midblock (S-(EB/S)-S). Styrenic block copolymers (SBCs FG 1901, FG 1924 and RP 6670, each obtained from KRATON ®), tackifier (Regalrez ™ 1094 or FORAL ™ 105E obtained from Eastman Chemical Company), UV stabilizers (e.g., Tinuvin ® 328 and/or 770DF from BASF), antioxidants (e.g., Irganox ® 1520L) and first particles are dissolved/suspended in solvent using solvent to adjust the total components by weight to 100 parts.

The HP/OP coatings were tested for durability using a Taber Abraser equipped with CS-10 wheels and a 1,000 g load. The results are shown in Table 14.

The invention claimed is:

1. A system for forming a coating comprising:
A) a first component which comprises
   i) an elastomeric binder comprising one or more styrenic block copolymers, wherein said elastomeric binder comprises from about 1% to about 30% of said one or more styrenic block copolymers by weight;
   ii) one or more independently selected first particles having a size of about 30 microns to about 225 microns, wherein the first component comprises from about 0.01% to about 5% of said first particles by weight; and
   iii) one or more solvents; and
B) a second component which either comprises
   i) one or more independently selected second particles having a size of about 1 nanometer to about 25 microns, wherein said second particles comprise one or more independently selected alkyl, haloalkyl, or perfluoroalkyl moieties bound, either directly or indirectly, to said second particles, and
   ii) optionally, one or more solvents;
or comprises per 100 parts by weight:
   i) 0.1 to 3.5 parts by weight of one or more independently selected second particles having a size of about 1 nanometer to about 25 microns, wherein said second particles either comprise one or more independently selected alkyl, haloalkyl, or perfluoroalkyl moieties bound directly or indirectly to said second particles, or comprise one or more siloxanes or silazanes associated with said second particles;
   ii) 0.1 to 1.0 parts by weight of a fluorinated polyolefin; or
   0.06 to 0.6 parts by weight of a Fluoroethylene-Alkyl Vinyl Ether (FEVE) copolymer; and
   iii) one or more solvents for a total of 100 parts by weight;
wherein a coating formed by
(a) applying the first component to at least a portion of a surface, wherein the portion of the surface has optionally been treated with a primer on all or part of the surface to which said first component is to be applied; and
(b) applying the second component to all or a portion of the surface coated with the first component in step (a),
results in a coating that has an elongation at break greater than about 200%, an arithmetical mean roughness value from about 3 microns to about 20 microns, or a ten point mean roughness from about 7 microns to about 100 microns, and a total luminous transmittance of about 75% to about 85% as measured by ASTM D1003-11 for a coating about 25 microns thick without added colorants; and
wherein said coating has either hydrophobic or superhydrophobic properties, and optionally is oleophobic or superoleophobic.

2. The system for forming a coating according to claim 1 comprising: an aerosol spray container containing the first component and a propellant and/or an aerosol spray containing the second component and a propellant.

3. A method of forming a hydrophobic coating on a portion of a surface comprising the steps:
(a) applying a first component to at least a portion of the surface, wherein the portion of the surface has optionally been treated with a primer on all or part of the surface to which said first component is to be applied; and
(b) applying a second component to all or a portion of the surface coated with the first component in step (a),
wherein the first component comprises
   i) an elastomeric binder comprising one or more styrenic block copolymers, wherein said elastomeric binder comprises from about 1% to about 30% of said one or more styrenic block copolymers by weight;
   ii) one or more independently selected first particles having a size of about 30 microns to about 225microns, wherein the first component comprises from about 0.2% to about 5% of said first particles by weight; and
   iii) one or more solvents;
wherein the second component either comprises:
   i) one or more independently selected second particles having a size of about 1 nanometer to about 25 microns, wherein said second particles comprise one or more independently selected alkyl, haloalkyl, or perfluoroalkyl moieties bound, either directly or indirectly, to said second particles, and
   ii) one or more solvents;
or comprises per 100parts by weight:
   i) 0.1to 3.5parts by weight of one or more independently selected second particles having a size of about 1 nanometer to about 25 microns, wherein said second particles either comprise one or more independently selected alkyl, haloalkyl, or perfluoroalkyl moieties bound, directly or indirectly to said second particles, or comprise one or more siloxanes or silazanes associated with said second particles;

ii) 0.1 to 1.0 parts by weight of a fluorinated polyolefin; or 0.06 to 0.6 parts by weight of a Fluoroethylene-Alkyl Vinyl Ether (FEVE) copolymer; and iii) one or more solvents for a total of 100 parts by weight;

wherein said coating has either hydrophobic or superhydrophobic properties, and optionally is oleophobic or superoleophobic; and wherein the coating formed by said method has an elongation at break greater than about 200%, an arithmetical mean roughness value from about 3 microns to about 20 microns, or a ten point mean roughness from about 7 microns to about 100 microns, and a total luminous transmittance of about 75% to about 85% as measured by ASTM D1003-11 for a coating about 25 microns thick without added colorants.

4. The method of claim 3, wherein one or more of the styrenic block copolymers has a rubber phase crosslinked to a polystyrene phase.

5. The method of claim 4, wherein said rubber phase comprises 60%-80% of the styrenic block copolymers in the elastomeric binder by weight, based on the dry weight of the styrenic block copolymers present in the first component not including any contribution by the first particles or other materials present in the first component.

6. The method of claim 3, wherein one or more of the styrenic block copolymers has a rubber phase comprising polybutadiene, polyisoprene, polyolefin or a mixture of any of those rubber phase components, any one or more of which may optionally comprise 1% to 3% of maleic anhydride.

7. The method of claim 3, wherein said first component further comprises one or more colorants, UV stabilizers, antioxidants, rheological agents, and/or fillers.

8. The method of claim 3, wherein said first component further comprises up to 30% by weight of one or more tackifiers, wherein said one or more styrenic block copolymers and said one or more tackifiers together comprise up to about 30% by weight of said first component.

9. The method of claim 3, wherein said elastomeric binder comprises one or more triblock copolymers.

10. The method of claim 3, wherein said elastomeric binder comprises one or more styrenic block copolymers of styrene and ethylene/butylene with a polystyrene content of about 8% to about 36% by weight, or mixtures of any two or more of such triblock copolymers.

11. The method of claim 3, wherein one or more of said styrenic block copolymers present in the elastomeric binder comprise maleic anhydride or a first and a second maleated triblock copolymer of styrene and ethylene/butylene wherein:

said first maleated triblock copolymer of styrene and ethylene/butylene has a polystyrene content from about 8% to about 14%, with 0.4% to 1.6% substitution of maleic anhydride by weight of the first triblock copolymer; and said second maleated triblock copolymer of styrene and ethylene/butylene has a polystyrene content of about 22% to about 32%, with 1.1% to 2.5% substitution of maleic anhydride by weight of the second triblock copolymer.

12. The method of claim 3, wherein said first particles are selected from the group consisting of: glass, ceramic, rubber, plastic, thermoplastic, wood, cellulose, metal oxides, silicon dioxide, silicates, tectosilicates, germanium dioxide, plastic particles, carbide particles, nitride particles, boride particles, spinel particles, diamond particles, fly ash particles, fibers, hollow glass spheres, hollow glass particles, and hollow plastic particles, wherein said first particles optionally comprise a colorant.

13. The method of claim 3, wherein said second particles comprise a metal oxide, an oxide of a metalloid, a silicate, or a glass, wherein said second particles have an average size in the range of from 1 nm to 100 nm or from 2 nm to 200 nm.

14. The method of claim 3, wherein said one or more moieties result from contacting the second particles with one or more silanizing agents of formula (I):

$$R_{4-n}Si-X_n \qquad (I)$$

where n is an integer from 1 to 3;

each R is independently selected from (i) alkyl or cycloalkyl group optionally substituted with one or more fluorine atoms, (ii) $C_{1\ to\ 20}$ alkyl optionally substituted with one or more substituents independently selected from fluorine atoms and $C_{6\ to\ 14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents, (iii) $C_{2\ to\ 8}$ or $C_{6\ to\ 20}$ alkyl ether optionally substituted with one or more substituents independently selected from fluorine and $C_{6\ to\ 14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents, (iv) $C_{6\ to\ 14}$ aryl, optionally substituted with one or more substituents independently selected from halo, alkoxy, and haloalkoxy substituents, (v) $C_{4\ to\ 20}$ alkenyl or $C_{4\ to\ 20}$ alkynyl, optionally substituted with one or more substituents independently selected from halo, alkoxy, or haloalkoxy, or (vi) $-Z-((CF_2)_q(CF_3))_r$, wherein Z is a $C_{1\ to\ 12}$ or a $C_{2\ to\ 8}$ divalent alkane radical or a $C_{2\ to\ 12}$ divalent alkene or alkyne radical, q is an integer from 1 to 12, and r is an integer from 1 to 4;

each X is independently selected from $-H$, $-Cl$, $-I$, $-Br$, $-OH$, $-OR^2$, $-NHR^3$, or $-N(R^3)_2$ group;

each $R^2$ is an independently selected $C_{1\ to\ 4}$ alkyl or haloalkyl group; and each $R^3$ is an independently selected H, $C_{1\ to\ 4}$ alkyl, or haloalkyl group.

15. The method of claim 14, wherein R is $-Z-((CF_2)_q(CF_3))_r$, wherein Z is a $C_{1\ to\ 12}$ divalent alkane radical or a $C_{2\ to\ 12}$ divalent alkene or alkyne radical, q is an integer from 1 to 12, and r is an integer from 1 to 4.

16. The method of claim 14, wherein n is 3.

17. The method of claim 3, wherein said second particles are treated with an agent selected from the group consisting of: (tridecafluoro-1,1,2,2-tetrahydrooctyl) trichlorosilane; (tridecafluoro-1,1,2,2-tetrahydrooctyl)triethoxysilane; (tridecafluoro-1,1,2,2-tetrahydrooctyl)trimethoxysilane; (heptadecafluoro-1,1,2,2-tetrahydrodecyl)dimethyl(dimethylamino)silane; (heptadecafluoro-1,1,2,2-tetrahydrodecyl)tris(dimethylamino)silane; n-octadecyltrimethoxysilane; n-octyltriethoxysilane; nonafluorohexyldimethyl(dimethylamino)silane; dimethyl dichlorosilane; hexamethyldisilazane; octyltrimethoxysilane, and polydimethylsiloxane.

18. The method of claim 3, wherein said first component and said second component each further comprises an independently selected solvent and/or propellant.

19. The method of claim 3, wherein said elastomeric binder has an ultimate strength greater than about 20 Mega Pascals (MPa) according to ASTM D412.

20. The method according to claim 3, wherein applying according to step (b) is repeated to a portion of the coated surface if that portion of the coated surface loses said hydrophobic, superhydrophobic, oleophobic and/or superoleophobic properties, and wherein following the repetition of step (b), the coated surface regains hydrophobic, superhydrophobic, oleophobic and/or superoleophobic properties.

21. The method according to claim 3, wherein both steps (a) and (b) are repeated on a portion of the coated surface if that portion of the coated surface loses said hydrophobic, superhydrophobic, oleophobic and/or superoleophobic properties, and wherein following the repetition of steps (a) and (b), the coated surface regains hydrophobic, superhydrophobic, oleophobic and/or superoleophobic properties.

22. A hydrophobic coating prepared by the method according to claim 3.

23. The hydrophobic coating of claim 22, wherein said coating is superhydrophobic or superhydrophobic and superoleophobic.

24. The hydrophobic coating according to claim 22, wherein said coating has an ultimate strength greater than about 20 mega Pascals (MPa) according to ASTM D412.

25. The hydrophobic coating according to claim 22, wherein said coating has a modulus at 100% elongation of greater than 10 mega Pascals (MPa) according to ASTM D412.

26. The hydrophobic coating according to claim 22, having an elongation at break of greater than about 300%.

27. The hydrophobic coating according to claim 22, having a total luminous transmittance of about 75% to about 85% and a haze of about 85% to about 90% as measured by ASTM D1003-11 for a coating about 25 microns thick without added colorants.

28. The hydrophobic coating according to claim 22, wherein said coating is superhydrophobic and retains its superhydrophobicity after being subjected to greater than 20 cycles on a Taber Abraser using CS-0 or CS-10 wheels and a 250 gram load at room temperature, wherein the end of superhydrophobicity is determined to be the point when more than half of the water droplets applied to the portion of the surface subject to the action of the wheels do not roll off the surface when the surface is inclined at a 5 degree angle at room temperature.

29. The hydrophobic coating according to claim 22, wherein said coating is superhydrophobic and when said coating is applied to a planar surface, it continues to display superhydrophobic behavior after being subjected to a continuous shower test of about six liters of water per minute at about 20° C.-25° C. for greater than 0.3 hours, wherein the end of superhydrophobic behavior is determined to be the time when more than half of the water droplets applied to a portion of the surface subject to said shower do not roll off the surface when it is inclined at a 5 degree angle at room temperature, wherein the shower test is conducted using a showerhead with 70 nozzles with a 1 mm diameter orifice arranged in 5 spokes of 5 nozzles and 15 spokes of 3 nozzles about a central point on a circular showerhead, and wherein the showerhead delivers approximately 6 liters of potable tap water per minute using about 137900 Pa (Pascals) to 310275 Pa, and wherein the coating is placed about 1.5 meters below the showerhead.

* * * * *